United States Patent
Kimura

(10) Patent No.: US 12,207,078 B2
(45) Date of Patent: Jan. 21, 2025

(54) INFORMATION PROCESSING DEVICE, MOBILE BODY DEVICE, AND INFORMATION PROCESSING METHOD

(71) Applicant: SONY GROUP CORPORATION, Tokyo (JP)

(72) Inventor: Ryota Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 551 days.

(21) Appl. No.: 17/310,484

(22) PCT Filed: Feb. 5, 2020

(86) PCT No.: PCT/JP2020/004439
§ 371 (c)(1),
(2) Date: Aug. 5, 2021

(87) PCT Pub. No.: WO2020/166461
PCT Pub. Date: Aug. 20, 2020

(65) Prior Publication Data
US 2022/0124576 A1  Apr. 21, 2022

(30) Foreign Application Priority Data
Feb. 15, 2019 (JP) ................. 2019-026094

(51) Int. Cl.
H04W 36/00 (2009.01)
H04W 36/08 (2009.01)
(Continued)

(52) U.S. Cl.
CPC ...... *H04W 36/00835* (2018.08); *H04W 36/08* (2013.01); *H04W 36/302* (2023.05); *H04W 36/324* (2023.05)

(58) Field of Classification Search
CPC .......... H04W 36/00835; H04W 36/08; H04W 36/30; H04W 36/32; H04W 88/02;
(Continued)

(56) References Cited

U.S. PATENT DOCUMENTS 11,039,365 B2 * 6/2021 Sakai ................. H04W 12/033
2009/0253434 A1   10/2009 Hayashi et al.
(Continued)

FOREIGN PATENT DOCUMENTS

CN   101513099 A   8/2009
CN   102511184 A   6/2012
(Continued)

OTHER PUBLICATIONS

International Search Report and Written Opinion of PCT Application No. PCT/JP2020/004439, issued on Apr. 28, 2020, 10 pages of ISRWO.

(Continued)

*Primary Examiner* — Hardikkumar D Patel
(74) *Attorney, Agent, or Firm* — CHIP LAW GROUP

(57) ABSTRACT

An information processing device includes a network communication unit connected to a predetermined network to which at least one processing device that provides a function of an application process for a mobile body device via wireless communication is connected, and a handover processing unit that executes a process of a first handover for transferring the application process executed by a predetermined processing device connected to the predetermined network or by the information processing device itself to a different processing device connected to the predetermined network.

20 Claims, 31 Drawing Sheets

(51) Int. Cl.
*H04W 36/30* (2009.01)
*H04W 36/32* (2009.01)

(58) Field of Classification Search
CPC .......... H04W 92/20; H04W 4/44; G06F 9/50; G06F 13/00
See application file for complete search history.

(56) References Cited

U.S. PATENT DOCUMENTS

| | | | |
|---|---|---|---|
| 2012/0008535 A1* | 1/2012 | Kuehnel | H04W 8/18 370/331 |
| 2016/0345220 A1 | 11/2016 | Brisebois | |
| 2016/0345520 A1* | 12/2016 | Gilsinger | C12N 15/8286 |
| 2019/0174369 A1* | 6/2019 | Tomikawa | H04W 36/08 |
| 2022/0124593 A1* | 4/2022 | Mátray | H04W 36/322 |

FOREIGN PATENT DOCUMENTS

| | | |
|---|---|---|
| CN | 106797590 A | 5/2017 |
| CN | 107431946 A | 12/2017 |
| CN | 108476412 A | 8/2018 |
| JP | 2008-015847 A | 1/2008 |
| JP | 2008219656 A | 9/2008 |
| JP | 2014-192619 A | 10/2014 |
| JP | 2015-220696 A | 12/2015 |
| WO | 2008/114449 A1 | 9/2008 |
| WO | WO-2009157171 A1 | 12/2009 |
| WO | 2018/042572 A1 | 3/2018 |
| WO | WO-2018096839 A1 | 5/2018 |
| WO | 2019/011408 A1 | 1/2019 |

OTHER PUBLICATIONS

Extended European Search Report of EP Application No. 20755554.1, issued on Mar. 10, 2022, 10 pages.
Intel; "SAND: Overview of Features in ISO/IEC 23009-5"; $4-160378; 3GPP TSG-SA4 Meeting #88; Apr. 18, 2016; full text; 3GPP tsg_sa WG4_CODEC.

* cited by examiner

FIG.10

| BASE STATION DEVICE ID | BASE STATION DEVICE HOST NAME | BASE STATION DEVICE ADDRESS | BASE STATION DEVICE POSITION INFORMATION | PRESENCE/ ABSENCE OF EDGE FUNCTION | NUMBER OF APPLICATIONS PROVIDED BY EDGE FUNCTION | APPLICATION ID | NUMBER OF CELLS PROVIDED BY BASE STATION DEVICE | CELL ID |
|---|---|---|---|---|---|---|---|---|
| 1 | AAA.zzz.com | aaa.aaa.aaa.aaa | Xa,Ya,Za | Yes | 1 | 1 | 3 | 1,2,3 |
| 2 | BBB.zzz.com | bbb.bbb.bbb.bbb | Xb,Yb,Zb | Yes | 2 | 1,2 | 6 | 4,5,6,7,8,9 |
| 3 | CCC.zzz.com | ccc.ccc.ccc.ccc | Xc,Yc,Zc | Yes | 3 | 3,4,5 | 3 | 10,11,123 |
| 4 | DDD.zzz.com | ddd.ddd.ddd.ddd | Xd,Yd,Zd | No | 0 | --- | 1 | 13 |
| ⋮ | ⋮ | ⋮ | ⋮ | ⋮ | ⋮ | ⋮ | ⋮ | ⋮ |

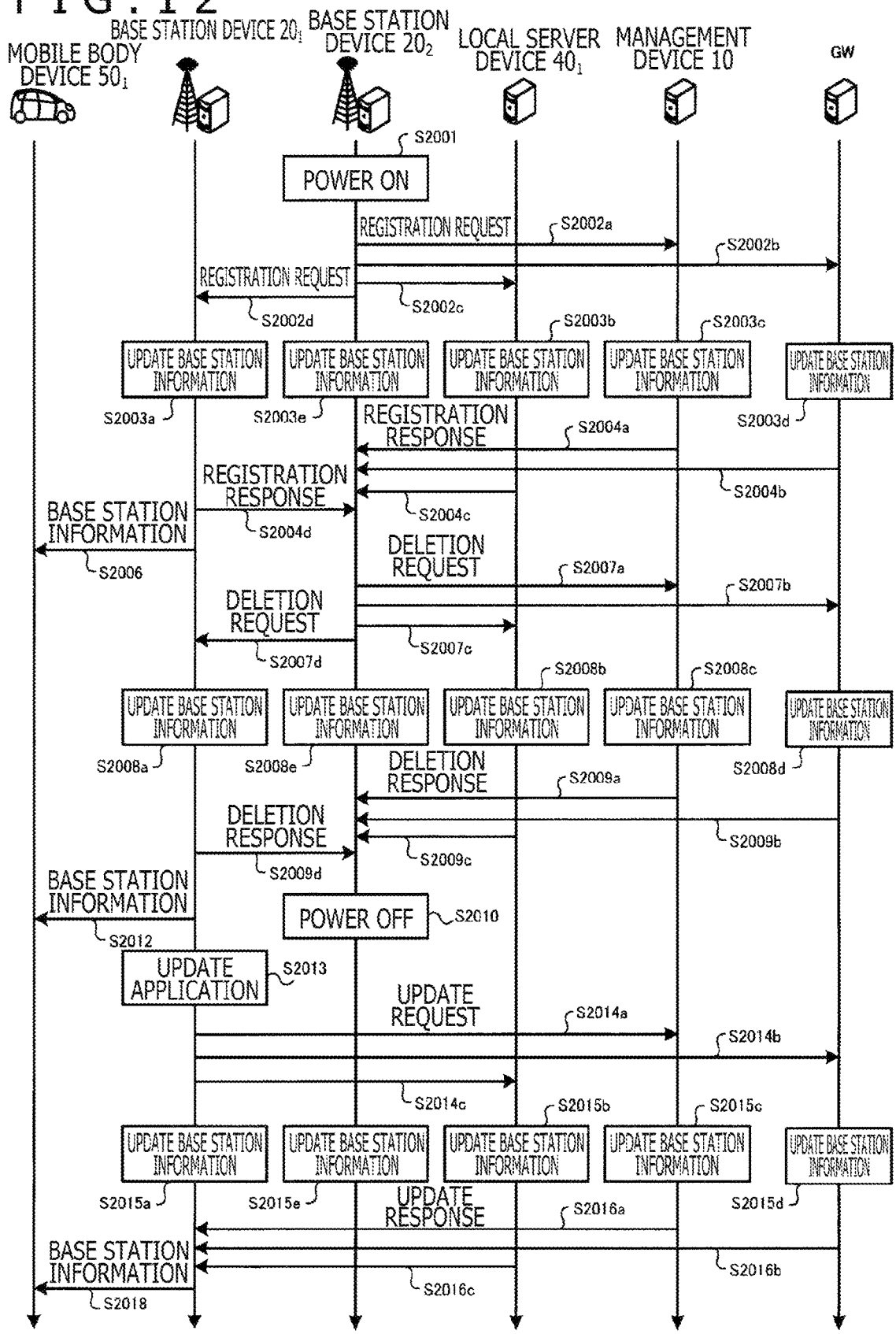

FIG.13

| EXAMPLE | CRITERION FOR WIRELESS HANDOVER | CRITERION FOR APPLICATION HANDOVER |
|---|---|---|
| 1 | WIRELESS SIGNAL QUALITY (OR WIRELESS COMMUNICATION QUALITY) | MOVING STATE OF MOBILE BODY DEVICE |
| 2 | WIRELESS SIGNAL QUALITY (OR WIRELESS COMMUNICATION QUALITY) | WIRELESS SIGNAL QUALITY (OR WIRELESS COMMUNICATION QUALITY) |
| 3 | MOVING STATE OF MOBILE BODY DEVICE | MOVING STATE OF MOBILE BODY DEVICE |
| 4 | MOVING STATE OF MOBILE BODY DEVICE | WIRELESS SIGNAL QUALITY (OR WIRELESS COMMUNICATION QUALITY) |

INFORMATION PROCESSING DEVICE, MOBILE BODY DEVICE, AND INFORMATION PROCESSING METHOD

CROSS REFERENCE TO RELATED APPLICATIONS

This application is a U.S. National Phase of International Patent Application No. PCT/JP2020/004439 filed on Feb. 5, 2020 which claims priority benefit of Japanese Patent Application No. JP 2019-026094 filed in the Japan Patent Office on Feb. 15, 2019. Each of the above-referenced applications is hereby incorporated herein by reference in its entirety.

TECHNICAL FIELD

The present disclosure relates to an information processing device, a mobile body device, an information processing method, and an information processing program.

BACKGROUND ART

The number of applications processed by a processing device on a network (e.g., server device) and a user terminal in cooperation with each other has been increasing. In a case where the processing device on the network performs a part of an application process, a processing delay is inevitably produced by the necessity of information exchange between the user terminal and the processing device on the network. However, a long processing delay may be impermissible for some use purposes of applications. Recently, there has been gradually known edge computing as a technology achieving short-delay processing by using a processing device provided on a network and located near a device executing an application to perform the processing.

CITATION LIST

Patent Literature

[PTL 1]
Japanese Patent Laid-open No. 2008-15847

SUMMARY

Technical Problem

However, delay reduction may be difficult to achieve only by using a processing device located nearby for processing. For example, suppose that a device executing an application is a movable device such as a car and a portable terminal (hereinafter referred to as a mobile body device). In this case, a distance between the mobile body device and a processing device on a network changes according to movement of the mobile body device, in which condition delay reduction may be difficult to achieve.

Accordingly, the present disclosure proposes an information processing device, a mobile body device, an information processing method, and an information processing program each capable of achieving short-delay processing.

Solution to Problem

In order to solve the above problem, an information processing device according to one aspect of the present disclosure includes a network communication unit connected to a predetermined network to which at least one processing device that provides a function of an application process for a mobile body device via wireless communication is connected, and a handover processing unit that executes a process of a first handover for transferring the application process executed by a predetermined processing device connected to the predetermined network or by the information processing device itself to a different processing device connected to the predetermined network.

BRIEF DESCRIPTION OF DRAWINGS

FIG. 10 depicts an example of an information list possessed by the base station device and associated with other base station devices.

FIG. 12 is a sequence diagram presenting an example of decentralized management of the information list associated with the base station device within the network N1.

FIG. 13 is a diagram presenting examples of a combination of starting criteria of a wireless handover and an application handover.

DESCRIPTION OF EMBODIMENTS

Figure 1:
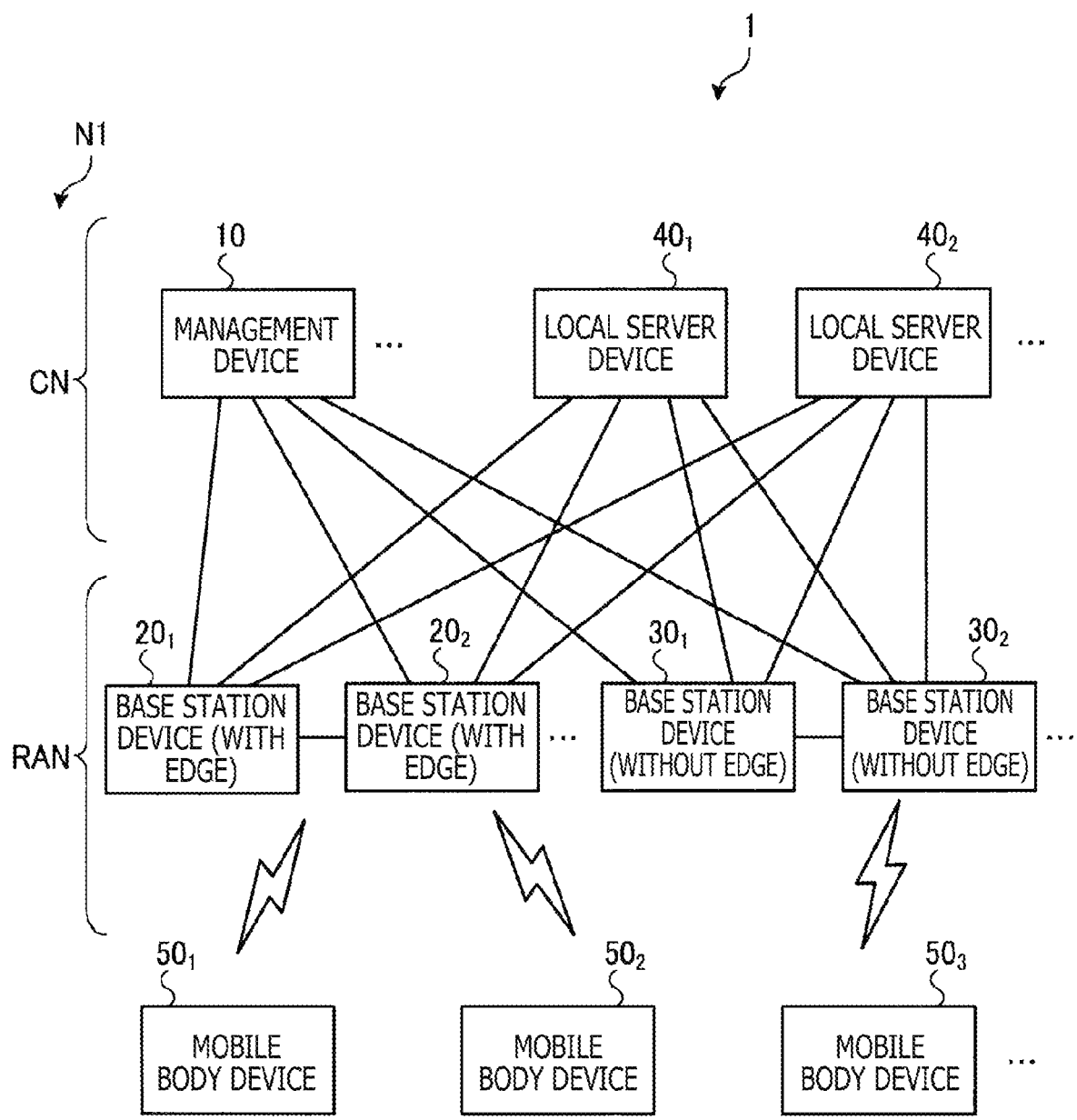
FIG. 1 is a diagram depicting a configuration example of an information processing system according to an embodiment of the present disclosure.

Embodiments according to the present disclosure will be hereinafter described in detail with reference to the drawings. Note that identical parts are given identical reference numbers in the respective embodiments described below to omit repetitive description.

Moreover, for distinction between a plurality of constituent elements having substantially identical functional configurations, these constituent elements may be given different numerals after identical reference numbers in the present description and the drawings. For example, a plurality of configurations having substantially identical functional configurations is distinguished from each other, such as base station devices $20_1$ and $20_2$ as necessary. However, in a case where distinctions between a plurality of constituent elements having substantially identical functional configurations are not particularly needed, these constituent elements are given only identical reference numbers. For example, in a case where no distinction between the base station devices $20_1$ and $20_2$ is particularly needed, these base station devices are simply referred to as base station devices 20.

In addition, the present disclosure will be described in the following item order.
1. Introduction
2. Configuration of information processing system
    2-1. Overall configuration of information processing system
    2-2. Configuration of management device
    2-3. Configuration of base station device (with edge function)
    2-4. Configuration of base station device (without edge function)
    2-5. Configuration of local server device
    2-6. Configuration of mobile body device
3. Management of information list
    3-1. Information list
    3-2. Management method of information list (centralized management)
    3-3. Management method of information list (decentralized management)
4. Application handover
5. Handover process (case where both have edge function
    5-1. Handover procedure
    5-2. Operation example of base station device
    5-3. Operation example of mobile body device
    5-4. Handover destination selection process
    5-5. Application configuration change process
6. Handover process (case where both have edge function (2))
    6-1. Handover procedure
    6-2. Operation example of base station device
    6-3. Operation example of mobile body device
    6-4. Difference information transmission process
7. Handover process (case where base station device not having edge function is included)
    7-1. Case where handover source does not have edge function
    7-2. Case where handover destination does not have edge function
    7-3. Case where neither has edge function
8. Modifications
    8-1. Modification of handover process procedure
    8-2. Application handover for each application
    8-3. Specific examples of application
    8-4. Other modifications
9. Conclusion

1. INTRODUCTION

A conventional mobile body communication system is a system which provides a communication function for a mobile terminal such as a cellular phone and a smartphone. According to a recent mobile body communication system, however, the importance of support for communication directed at a mobile body of a type different from a mobile terminal such as a car, a drone, a robot, or the like, has been also gradually increasing.

For example, a recent mobile body communication system is required to support V2X (Vehicle-to-Everything) such as V2V (Vehicle-to-Vehicle), V2I (Vehicle-to-Infrastructure), and V2N (Vehicle-to-Network), and V2P (Vehicle-to-Pedestrian), as car-directed communication. Moreover, the recent mobile body communication system is required to support road-to-vehicle communication achieved by an intelligent transportation system (ITS) or the like as car-directed communication.

Communication directed at these mobile bodies is assumed to be used for various use purposes and applications. For example, this type of communication is assumed to be used for purposes of operation control of mobile bodies (e.g., autonomous driving, remote control, and group control).

For various purposes of use such as operation control of a mobile body, not only an increase in a communication throughput but also reduction of a communication delay is assumed to become more important. For achieving reduction of a communication delay, it is important to improve each of (1) a time required for communication between devices (including not only wireless communication but also wired communication), and (2) a time required for signal processing and application processing by a device. For solving a part of the problem (1) described above, delay reduction has been promoted using 5G or the like. However, for communication delay reduction including a part of the problem (1) and the problem (2), there still remain a large number of matters to be solved.

An information processing device according to the present embodiment (e.g., base station device) is connected to a wireless network such as a cellular communication network, and provides a function of executing an application process (e.g., edge function) for a mobile body device via wireless communication. The information processing device executes an application handover for transferring the application process provided for the mobile body device to a different processing device connected to a wireless network and having a function of executing the application process.

In this manner, the application process is sequentially transferred to processing devices existing near the mobile body device on the network. This transfer of the application process reduces a large increase in a distance between the processing device which executes the application process and the mobile body device on the network according to movement of the mobile body device. As a result, the application process is executed at a position near the mobile body device on the network in many cases. Accordingly, short-delay processing is achievable.

Note that the "information processing device" and the "processing device" are identical to each other in meaning. According to the present embodiment, however, a device corresponding to an execution entity of the above process (the application handover for transferring an application process to a different processing device) will be referred to as an "information processing device," and a device corresponding to a different information processing device as viewed from the execution entity will be referred to as a "processing device" to make a distinction between these.

2. CONFIGURATION OF INFORMATION PROCESSING SYSTEM

An information processing system 1 according to the embodiment of the present disclosure will be hereinafter described. The information processing system 1 is a mobile body communication system which includes a plurality of base station devices each having a function of providing application process services (e.g., edge function). The information processing system 1 provides predetermined wireless services for mobile body devices operated by users (e.g., cars and portable terminals) via wireless communication. For example, the information processing system 1 provides, for a mobile body device in which a predetermined application program has been installed, a service for executing an information process (hereinafter referred to as application process) requested by this application program via wireless communication.

For example, the application process performed by each of the base station devices herein is information processing at an application layer level performed in response to a request from a program (e.g., application) included in the mobile body device, such as a process for recognizing an object within an image, or performed in cooperation with the program. For example, the application process performed by the base station device is a process called an edge process in edge computing. Note that the application process is different from processes at levels of a physical layer, a datalink layer, a network layer, a transport layer, a session layer, and a presentation layer referred to for OSI reference models. However, the application process may supplementally include the processes at the levels from the physical layer to the presentation layer as long as a process at the application layer level, such as an image recognition process, is included.

In the following description, information processing at the application layer level performed by a device (e.g., base station device and server device) on a network in response to a request from the program included in the mobile body device, or information processing at the application layer level performed by a device on a network in cooperation with the program included in the mobile body device will be referred to as an "application process." Moreover, in the following description, providing processed data of the "application process" for the mobile body device by the device on the network, or providing a processing function (or processing service) of the "application process" for the mobile body device by the device on the network will be referred to as "providing the application process" in some cases.

The information processing system 1 is a wireless communication system which uses a predetermined wireless access technology (RAT: Radio Access Technology). For example, the information processing system 1 is a cellular communication system which uses a wireless access technology such as W-CDMA (Wideband Code Division Multiple Access), cdma 2000 (Code Division Multiple Access 2000), LTE (Long Term Evolution), and NR (New Radio). In this case, the cellular communication system is not limited to a cellular phone communication system, but may be intelligent transport systems (ITS), for example. Note that the information processing system 1 is not limited to a cellular communication system, but may be other wireless communication systems such as wireless LAN (Local Area Network) system, an aeronautical radio system, and a space radio communication system.

The information processing system 1 provides a function of executing an application process (e.g., edge function) for the mobile body device via a wireless network using a wireless access technology such as LTE and NR. Each of LTE and NR is a type of cellular communication technology. A plurality of pieces of LTE or NR is arranged in a cellular shape throughout an area covered by the base station device to achieve mobile communication of the mobile body device.

Note that "LTE" in the following description is assumed to include LTE-A (LTE-Advanced), LTE-A Pro (LTE-Advanced Pro), and EUTRA (Evolved Universal Terrestrial Radio Access). Moreover, NR is assumed to include NRAT (New Radio Access Technology) and FEUTRA (Further EUTRA). Note that a single base station may manage a plurality of cells. A cell corresponding to LTE is called an LTE cell in some cases. In addition, a cell corresponding to NR is called an NR cell in some cases.

NR is a wireless access technology (RAT) in a generation (fifth generation) next to LTE. NR is a wireless access technology capable of handling various types of use case including eMBB (Enhanced Mobile Broadband), mMTC (Massive Machine Type Communications), and URLLC (Ultra-Reliable and Low Latency Communications). NR has been studied with an aim of providing a technology framework corresponding to use scenarios, required conditions, arrangement scenarios, and the like for these use cases.

Note that a base station using LTE is called eNodeB (Evolved Node B) or eNB in some cases. Moreover, a base station using NR is called gNodeB or gNB in some cases. Furthermore, a mobile body device in LTE and NR is called UE (User Equipment) in some cases.

<2-1. Overall Configuration of Information Processing System>

Figure 2:
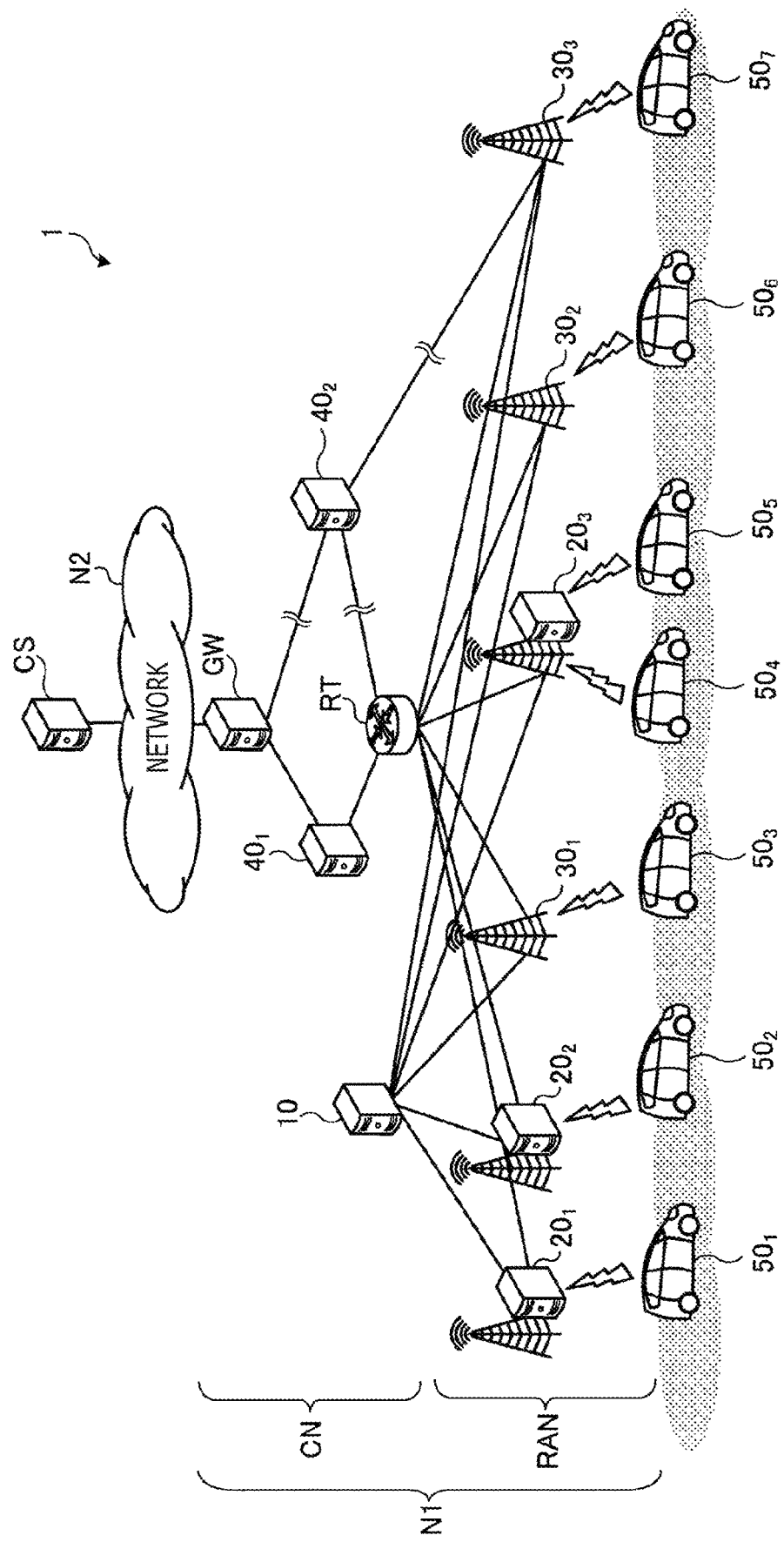
FIG. 2 is a diagram depicting a specific configuration example of the information processing system.

FIG. 1 is a diagram depicting a configuration example of the information processing system 1 according to the embodiment of the present disclosure. The information processing system 1 includes a management device 10, base station devices 20, base station devices 30, local server devices 40, and mobile body devices 50. In addition, FIG. 2 is a diagram depicting a specific configuration example of the information processing system 1. The information processing system 1 may include a router device RT and a gateway device GW in addition to the above configuration. Moreover, the information processing system 1 may include a cloud server device CS.

The plurality of devices constituting the information processing system 1 forms a network N1. For example, the network N1 is a wireless network. For example, the network N1 is a mobile body communication network configured using a wireless access technology such as LTE and NR. The network N1 is constituted by a wireless access network RAN and a core network CN.

Note that the devices in the figure may be considered as devices in a logical sense. Specifically, a part of each of the devices in the figure may be implemented by a virtual machine (VM), a container, a docker, or the like physically mounted on identical hardware.

(Gateway Device)

The gateway device is a device which plays a role of a gateway connecting the network N1 and a network (e.g., network N2) different from the network N1. For example, the gateway device GW is S-GW (Serving Gateway), P-GW (Packet Data Network Gateway), or Home-Gateway. A plurality of devices connected to the network N1 is connectable to a device outside the network N1 via the gateway device GW and the network N2. In the example of FIG. 2, the plurality of devices connected to the network N1 is connected to the cloud server device CS via the gateway device GW and the network N2. For example, the network N2 herein is a communication network such as the Internet, a regional IP (Internet Protocol) network, and a telephone network (e.g., fixed telephone network and cellular phone network).

(Cloud Server Device)

The cloud server device CS is a processing device (e.g., server device) outside the network N1. For example, the cloud server device CS is a server host computer which processes a request from a client computer (e.g., mobile body device 50). The cloud server device CS may be a PC server, a midrange server, or a mainframe server. The cloud server device CS has a function of executing an application process, and provides the application process for the mobile body devices 50. The cloud server device may be translated into a server device, or a processing device (or information processing device).

(Router Device)

The router device RT is a device for relaying data between networks. The router device RT relays data received from the base station devices 20 and 30 to the local server devices 40 and the like. Note that solid lines in FIG. 2 are preferably connections by wired lines. Moreover, the respective devices are not required to be directly connected to each other, but may be connected via routers, switches, or the like.

(Management Device)

The management device 10 is a device for managing a wireless network. For example, the management device 10 is a device which functions as MME (Mobility Management Entity) or AMF (Access and Mobility Management Function). The management device 10 constitutes a part of the core network CN in cooperation with the gateway device GW. The core network CN is a network owned by a predetermined entity such as a mobile body communication operator. For example, the core network CN is EPC (Evolved Packet Core), or 5GC (5G Core network). Note that the predetermined entity may be either identical to or different from an entity which uses, operates, and/or manages the base station devices 20 and 30.

Note that the management device 10 may have a gateway function. For example, the management device 10 may have a function as S-GW or P-GW if the core network is EPC. Moreover, the management device 10 may have a function as UPF (User Plane Function) if the core network is 5GC. Note that the management device 10 is not necessarily required to be constituted by a device forming the core network CN. For example, suppose that the core network CN is a core network using W-CDMA (Wideband Code Division Multiple Access) or cdma 2000 (Code Division Multiple Access 2000). In this case, the management device 10 may be a device functioning as RNC (Radio Network Controller).

The management device 10 is connected to each of the plurality of base station devices 20 and the plurality of base station devices 30. The management device 10 manages communication performed by the base station devices 20 and the base station devices 30. For example, the management device 10 recognizes and manages to which base station device (or cell) each of the mobile body devices 50 within the network N1 is connected, in which base station (or cell) each of the mobile body devices 50 exists within a communication area, and the like for each of the mobile body devices 50. For example, each of cells is a pCell (Primary Cell) or a sCell (Secondary Cell). The cells may be configured such that wireless resources available by the mobile body devices 50 (e.g., frequency channels and component carriers) differ for each cell. Moreover, the one base station device may provide a plurality of cells.

(Base Station Device)

Each of the base station devices 20 is a wireless communication device wirelessly communicating with the mobile body devices 50. Each of the base station devices 20 is a type of communication device. For example, each of the base station devices 20 is a device corresponding to a wireless base station (e.g., Base Station, Node B, eNB, and gNB), or a wireless access point. Each of the base station devices 20 may be a wireless relay station. Each of the base station devices 20 may be a road base station device such as an RSU (Road Side Unit). Moreover, each of the base station devices 20 may be an optical extension device called RRH (Remote Radio Head). According to the present embodiment, each of the base stations of the wireless communication system is referred to as a base station device in some cases. Each of the base station devices 20 may be configured to be wirelessly communicable with the other base station devices 20 and the base station devices 30. Note that a wireless access technology used by the base station devices 20 may be a cellular communication technology or a wireless LAN technology. Needless to say, the wireless access technology used by the base station devices 20 is not limited to these technologies, but may be other wireless access technologies.

Each of the base station devices 20 may be configured to be wirelessly communicable with the other base station devices 20 and the base station devices 30. Each of the base station devices 20 has a function of executing an application process. For example, the function of executing the application process is an edge function. Examples of the edge function include edge computing, MEC (Mobile Edge Computing), fog computing, and cache. According to the present embodiment, the edge function refers to a function of performing processes necessary for an application desired by each of the mobile body devices 50. Particularly, the edge function refers to a function of performing an arithmetic process originally performed by the cloud server device CS (or a part of the arithmetic process performed by the cloud server device CS), or a process associated with a certain application and processed while shared by the cloud server device CS. Moreover, the edge function according to the present embodiment may include a function of retaining a cache for data associated with an application.

Each of the base station devices 30 is a wireless communication device wirelessly communicating with the corresponding mobile body device 50. The base station devices 30 are different from the base station devices 20 in a point that a function of executing an application process (e.g., edge function) is eliminated. Each of the base station devices 30 is a type of communication device similarly to the base station devices 20. For example, each of the base station devices 30 is a device corresponding to a wireless base station (e.g., Base Station, Node B, eNB, and gNB), or a wireless access point. Each of the base station devices 30 may be a wireless relay station. Each of the base station devices 30 may be a road base station device such as an RSU (Road Side Unit). Moreover, each of the base station devices 20 may be an optical extension device called RRH (Remote Radio Head). Each of the base station devices 30 may be configured to be wirelessly communicable with the other base station devices 30 and the base station devices 20. Note that the wireless access technology used by the base station devices 30 may be a cellular communication technology or a wireless LAN technology. Needless to say, the wireless access technology used by the base station devices 20 is not limited to these technologies, but may be other wireless access technologies.

Note that the base station devices 20 and 30 may be communicable with each other via an interface between the base station devices and the core network (e.g., S1 Interface). This interface may be either wired or wireless. Moreover, the base station devices may be communicable with each other via an interface between the base station devices (e.g., X2 Interface and S1 Interface). This interface may be either wired or wireless.

The base station devices 20 and 30 can be used, operated, and/or managed by various types of entity. Possible examples of the entity include a mobile body communication operator (MNO: Mobile Network Operator), a virtual mobile body communication operator (MVNO: Mobile Virtual Network Operator), a virtual mobile body communication enabler (MVNE: Mobile Virtual Network Enabler), a neutral host network (NHN) operator, an enterprise, an educational institution (e.g., incorporated educational institution, and respective educational boards of a local government), a real estate (e.g., building and apartment) manager, and a private person. Needless to say, the entity which uses, operates, and/or manages the base station devices 20 and 30 is not limited to these examples. The base station devices 20 and 30 may be installed and/or operated by one operator, or may be installed and/or operated by one private person. Needless to say, the entity which installs and operates the base station devices 20 is not limited to these examples. For example, the base station devices 20 and 30 may be jointly installed and operated by a plurality of operators or a plurality of private persons. Moreover, the base station devices 20 and 30 may be common utilities used by a plurality of operators or a plurality of private persons. In this case, the utilities may be installed and/or operated by a third party different from a user.

Note that the concept of the base station device (also referred to as base station) includes not only a doner base station but also a relay base station (referred to as relay station or relay station device). Moreover, the concept of the base station includes not only a structure having a base station function, but also a device installed on the structure. For example, the structure is a high-rise building, a house, a steel tower, station facilities, airport facilities, port facilities, a stadium, or the like. Note that the concept of the building includes not only a building, but also a structure such as a tunnel, a bridge, a dam, a wall, and an iron pole (non-building structure), and a facility such as a crane, a gate, and a windmill. Moreover, the concept of the structure includes not only a structure on the land (on the ground in a narrow sense) or an underground structure, but also a structure on the water such as a pier and a mega-float, and a structure underwater such as an ocean observation facility. The base station device may be translated into a processing device (or information processing device).

Each of the base station devices 20 and 30 may be either a fixed station, or a base station device configured to be movable (movable station). For example, each of the base station devices 20 and 30 may be a device installed on a mobile body, or a mobile body itself. For example, a relay station device having an ability of movement (Mobility) may be considered as the base station device 20 or 30 which is a movable station. Moreover, a device which originally has an ability of movement, such as a vehicle, a drone, and a smartphone, and having a function of a base station device (at least a part of a function of a base station device) also corresponds to the base station device 20 or 30 as a movable station.

The mobile body herein may be a mobile terminal such as a smartphone and a cellular phone. Moreover, the mobile body may be a mobile body moving on the land (on the ground in a narrow sense) (e.g., a vehicle such as a car, a bicycle, a bus, a truck, a motorcycle, a train, and a linear motor car), or a mobile body (e.g., a subway) moving under the ground (e.g., in a tunnel). Furthermore, the mobile body may be a mobile body moving on the water (e.g., a vessel such as a passenger ship, a cargo ship, and a hovercraft), or may be a mobile body moving under the water (e.g., a submergible vehicle such as a submersible, a submarine, and an unmanned submersible). In addition, the mobile body may be a mobile body moving in the atmosphere (e.g., an aircraft such as an airplane, an airship, and a drone), or may be a mobile body moving outside the atmosphere (e.g., an artificial celestial body such as an artificial satellite, a spaceship, a space station, and a space probe).

Besides, each of the base station devices 20 and 30 may be a ground base station device (ground station device) installed on the ground. For example, each of the base station devices 20 and 30 may be a base station device disposed on a ground structure, or a base station device installed on a mobile body moving on the ground. More specifically, each of the base station devices 20 and 30 may be an antenna installed on a structure such as a building, and a signal processing device connected to the antenna. Needless to say, each of the base station devices 20 and 30 may be a structure or a mobile body itself. The range "on the ground" includes not only the range on the land (on the ground in a narrow sense), but also the range on the ground in a wide sense including the range under the ground, on the water, and under the water. Note that each of the base station devices 20 and 30 is not limited to a ground base station device. Each of the base station devices 20 and 30 may be a non-ground base station device (non-ground station device) capable of floating in the air or in the space. For example, each of the base station devices 20 and 30 may be an aircraft station device or a satellite station device.

The aircraft station device is a wireless communication device capable of floating in the atmosphere, such as an aircraft. The aircraft station device may be either a device mounted on an aircraft or the like, or an aircraft itself. Note that the concept of the aircraft includes not only a heavier-than-air aircraft such as an airplane and a glider, but also a lighter-than-air aircraft such as a balloon and an airship. Moreover, the concept of the aircraft includes not only a heavier-than-air aircraft and a lighter-than-air aircraft, but also a rotorcraft such as a helicopter and an auto-gyro. Note that the aircraft station device (or the aircraft on which the aircraft station device is mounted) may be an unmanned aerial vehicle such as a drone. Note that the concept of the unmanned aerial vehicle includes an unmanned aircraft system (UAS), and a tethered unmanned aircraft system (tethered UAS). Moreover, the concept of the unmanned aerial vehicle includes a lighter-than-air unmanned aircraft system (LTA: Lighter than Air UAS), and a heavier-than air unmanned aircraft system (HTA: Heavier than Air UAS). In addition, the concept of the unmanned aerial vehicle also includes a high altitude unmanned aircraft system platform (HAPs: High Altitude UAS Platforms).

The satellite station device is a wireless communication device capable of floating outside the atmosphere. The satellite station device may be a device mounted on a space mobile body such as an artificial satellite, or a space mobile body itself. A satellite constituting the satellite station device may be any one of a low earth orbiting (LEO) satellite, a medium earth orbiting (MEO) satellite, a geostationary (GEO: Geostationary Earth Orbiting) satellite, and a highly elliptical orbiting (HEO) satellite. Needless to say, the satellite station device may be a device mounted on a low earth orbiting satellite, a medium earth orbiting satellite, a geostationary satellite, or a highly elliptical orbiting satellite.

The size of the coverage by each of the base station devices 20 and 30 may range from a large size such as a macro-cell to a small size such as a picocell. Needless to say, the size of the coverage of each of the base station devices 20 and 30 may be an extremely small size such as a femtocell. Moreover, each of the base station devices 20 and 30 may have an ability of beamforming. In this case, cells and service areas of the base station devices 20 and 30 may be formed for each beam.

(Local Server Device)

Each of the local server devices 40 is a processing device (e.g., server device) connected to the network N1. For example, each of the local server devices 40 is a host computer for server for processing a request from a client computer (e.g., mobile body device 50). Each of the local server devices 40 may be a PC server, a midrange server, or a mainframe server. Each of the local server devices 40 may be translated into a server device, or a processing device (or information processing device).

Each of the local server devices 40 has a function of executing an application process (e.g., edge function). Each of the local server devices 40 is equivalent to the cloud server device CS in a point that the function of executing the application process (application arithmetic processing function) is equipped. However, there exists the following difference. Each of the local server devices 40 is disposed inside the network N1, while the cloud server device CS is disposed outside the network N1. Generally, as viewed from each of the mobile body devices 50, communication with the local server devices 40 produces a short delay, while communication with the cloud server device CS produces a relatively long delay.

(Mobile Body Device)

Each of the mobile body devices 50 is a wireless communication device which is movable and wirelessly communicates with the base station devices 20 or the base station devices 20. For example, each of the mobile body devices 50 is a cellular phone, a smart device (smartphone or tablet), a PDA (Personal Digital Assistant), or a personal computer. Each of the mobile body devices 50 may be an M2M (Machine to Machine) device, or an IoT (Internet of Things) device. Note that each of the mobile body devices 50 may be a wireless communication device installed on a mobile body, or a mobile body itself. For example, each of the mobile body devices 50 may be a vehicle moving on a road, such as a car, a bus, a truck, and a motorcycle, or a wireless communication device mounted on the vehicle. Each of the mobile body devices 50 may be configured to communicate (achieve side-link) with the other mobile body devices 50.

Note that the "mobile body device" is a type of communication device, and is also referred to as a mobile station, a mobile station device, a terminal device, or a terminal. The concept of the "mobile body device" includes not only a communication device configured to be movable, but also a mobile body on which a communication device is provided. In this case, the mobile body may be either a mobile terminal, or a mobile body moving on the land (on the ground in a narrow sense), under the ground, on the water, or under the water. Moreover, the mobile body may be a mobile body moving in the atmosphere, such as a drone and a helicopter, or a mobile body moving outside the atmosphere, such as an artificial satellite.

According to the present embodiment, the concept of the communication device includes not only a portable mobile body device (terminal device) such as a portable terminal, but also a device provided on a structure or a mobile body. Each of the structure and the mobile body may be regarded as a communication device. Moreover, the concept of the communication device includes not only a mobile body device (e.g., a terminal device and a car), but also a base station device (e.g., a doner base station and a relay base station). The communication device is a type of processing device and information processing device.

The mobile body devices 50 and the base station devices 20 and 30 are connected to each other via wireless communication (e.g., radio or optical wireless). In a case of movement from a communication area (or cell) of a certain base station device to a communication area (or cell) of a different base station device, each of the mobile body devices 50 performs handover (or handoff).

Each of the mobile body devices 50 may perform communication while simultaneously connecting with a plurality of base station devices or a plurality of cells. For example, in a case where one base station device supports a communication area via a plurality of cells (e.g., pCells and sCells), this base station device and each of the mobile body devices 50 are allowed to communicate with each other via the plurality of cells bound by using a carrier aggregation (CA) technology, a dual connectivity (DC) technology, or a multi-connectivity (MC) technology. Alternatively, a plurality of different base station devices and each of the mobile body devices 50 are allowed to communicate with each other via cells of these base station devices using a coordinated multi-point transmission and reception (CoMP: Coordinated Multi-Point Transmission and Reception) technology.

Note that each of the mobile body devices 50 is not necessarily required to be constituted by a device used directly by a human. Each of the mobile body devices 50 may be a sensor provided on a machine in a plant, for example, like what is called MTC (Machine Type Communication). Moreover, each of the mobile body devices 50 may be an M2M (Machine to Machine) device, or an IoT (Internet of Things) device. Furthermore, each of the mobile body devices 50 may be a device having a relay communication function, such as a D2D (Device to Device) and a V2X (Vehicle to everything) as typical examples. Besides, each of the mobile body devices 50 may be an apparatus called CPE (Client Premises Equipment) used for a wireless backhaul or the like.

Configurations of the respective devices constituting the information processing system 1 according to the embodiment will be hereinafter specifically described.

<2-2. Configuration of Management Device>

The management device 10 is a device for managing a wireless network. For example, the management device 10 is a device which manages communication performed by the base station devices 20 and 30. If the core network CN is EPC, the management device 10 is a device which has a function as MME, for example. In addition, if the core network CN is 5GC, the management device 10 is a device which has a function as AMF, for example. The management device 10 may have a function of executing an application process (e.g., edge function), and function as the local server device 40.

Figure 3:
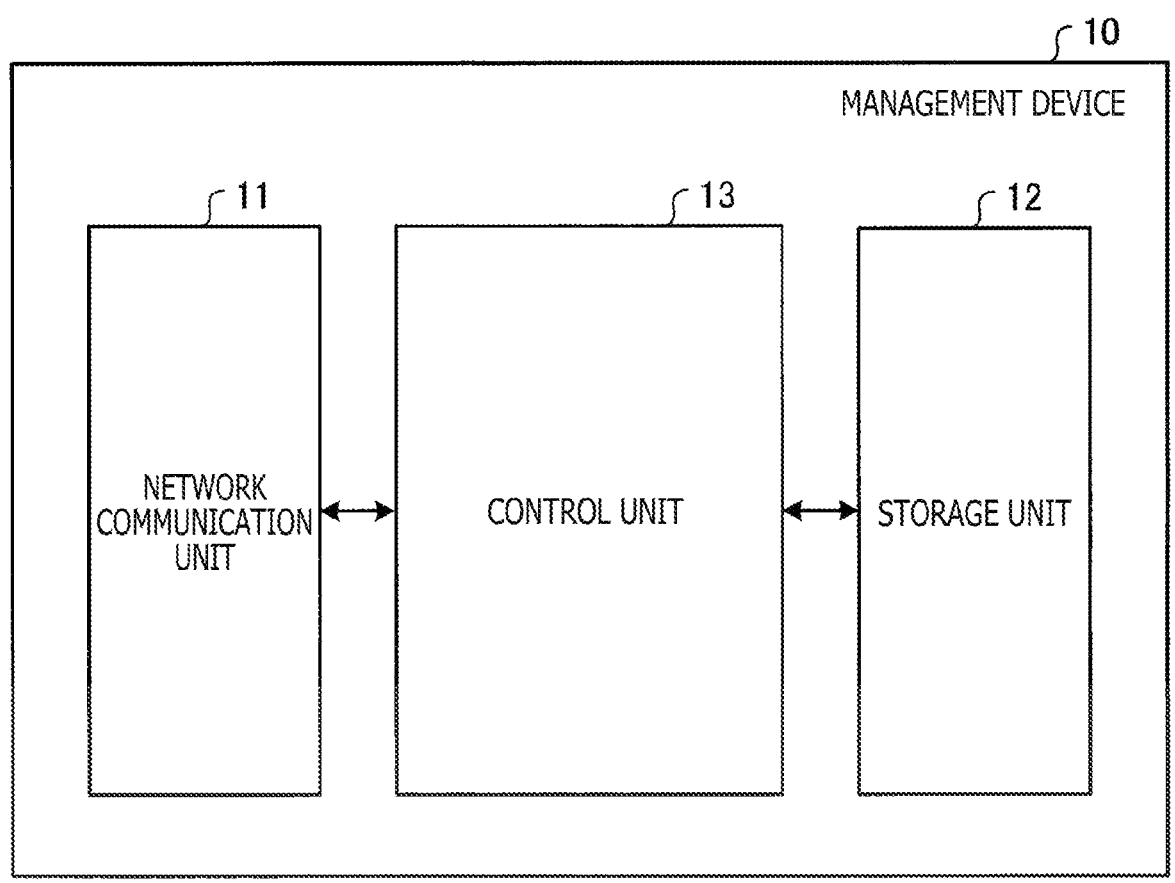
FIG. 3 is a diagram depicting a configuration example of a management device according to the embodiment of the present disclosure.

FIG. 3 is a diagram depicting a configuration example of the management device 10 according to the embodiment of the present disclosure. The management device 10 includes a network communication unit 11, a storage unit 12, and a control unit 13. Note that the configuration depicted in FIG. 3 is a functional structure. A hardware configuration may be different from this configuration. Moreover, the function of the management device 10 may be distributed into a plurality of physically separate configurations and mounted in this form. For example, the management device 10 may be constituted by a plurality of server devices.

The network communication unit 11 is a communication interface which communicates with other devices. The network communication unit 11 may be either a network interface, or an apparatus connection interface. The network communication unit 11 has a function of directly or indirectly connecting to the network N1. For example, the network communication unit 11 may include a LAN (Local Area Network) interface such as an NIC (Network Interface Card), or may include a USB (Universal Serial Bus) interface constituted by a USB host controller, a USB port, or the like. Moreover, the network communication unit 11 may be either a wired interface, or a wireless interface. The network communication unit 11 functions as communication means of the management device 10. The network communication unit 11 communicates with the base station devices 20 and 30 under control by the control unit 13.

The storage unit 12 is a data readable and writable storage device such as a DRAM (Dynamic Random Access Memory), a SRAM (Static Random Access Memory), a flash memory, and a hard disk. The storage unit 12 functions as storage means of the management device 10. For example, the storage unit 12 stores a connection state of each of the mobile body devices 50. For example, the storage unit 12 stores a state of RRC (Radio Resource Control), and a state of ECM (EPS Connection Management) of each of the mobile body devices 50. The storage unit 12 may function as a home memory which stores position information associated with each of the mobile body devices 50.

The control unit 13 is a controller which controls respective units of the management device 10. For example, the control unit 13 is implemented by a processor such as a CPU (Central Processing Unit) and an MPU (Micro Processing Unit). For example, the control unit 13 is implemented under various programs stored in a storage device inside the management device 10 and executed by the processor using a RAM (Random Access Memory) or the like as a work area. Note that the control unit 13 may be implemented by an integrated circuit such as an ASIC (Application Specific Integrated Circuit) and an FPGA (Field Programmable Gate Array). Each of the CPU, the MPU, the ASIC, and the FPGA can be considered as a controller.

<2-3. Configuration of Base Station Device (with Edge Function)>

A configuration of the base station devices 20 will be subsequently described. Each of the base station devices 20 is a wireless communication device wirelessly communicating with the mobile body devices 50. For example, each of the base station devices 20 is a device functioning as a wireless base station, a wireless relay station, a wireless access point, or the like. In this case, each of the base station devices 20 may be a road base station device such as an RSU, or an optical extension device such as an RRH. As described above, each of the base station devices 20 has a function of executing an application function (e.g., edge function), and provides an application process (e.g., edge process) for the mobile body devices 50. The following description is presented on an assumption that the function performed by each of the base station devices 20 for executing an application process is an edge function. However, the function of executing an application process is not limited to the edge function.

Figure 4:
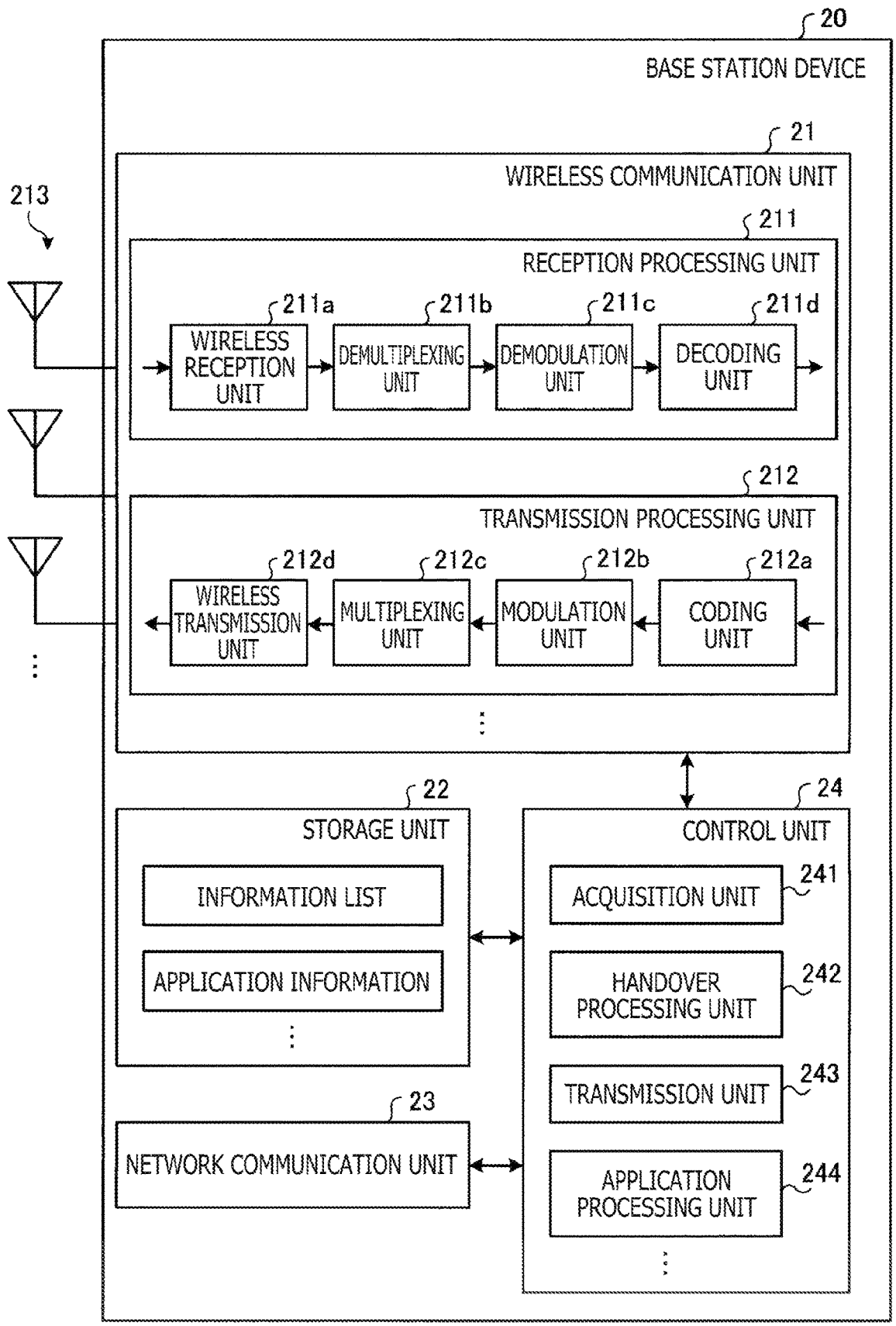
FIG. 4 is a diagram depicting a configuration example of a base station device according to the embodiment of the present disclosure.

FIG. 4 is a diagram depicting a configuration example of the base station device 20 according to the embodiment of the present disclosure. The base station device 20 includes a wireless communication unit 21, a storage unit 22, a network communication unit 23, and a control unit 24. Note that the configuration depicted in FIG. 4 is a functional structure. A hardware configuration may be different from this configuration. Moreover, the function of the base station device 20 may be distributed into a plurality of physically separate configurations and provided in this form.

The wireless communication unit 21 is a wireless communication interface which wirelessly communicates with other wireless communication devices (e.g., mobile body devices 50, base station devices 30, and other base station devices 20). The wireless communication unit 21 operates under control by the control unit 24. Note that the wireless communication unit 21 may handle a plurality of wireless access methods. For example, the wireless communication unit 21 may handle both NR and LTE. The wireless communication unit 21 may handle W-CDMA and cdma 2000 as well as NR and LTE. Needless to say, the wireless communication unit 21 may handle wireless access methods other than NR, LTE, W-CDMA, and cdma 2000.

The wireless communication unit 21 includes a reception processing unit 211, a transmission processing unit 212, and an antenna 213. The wireless communication unit 21 may include a plurality of the reception processing units 211, a plurality of the transmission processing units 212, and a plurality of the antennas 213. Note that each of the units of the wireless communication unit 21 can be individually configured for each wireless access method in a case where the wireless communication unit 21 handles a plurality of wireless access methods. For example, each of the reception processing unit 211 and the transmission processing unit 212 may be individually configured for each of LTE and NR.

The reception processing unit 211 processes uplink signals received via the antenna 213. The reception processing unit 211 includes a wireless reception unit 211a, a demultiplexing unit 211b, a demodulation unit 211c, and a decoding unit 211d.

The wireless reception unit 211a performs down-conversion, removal of unnecessary frequency components, amplification level control, orthogonal demodulation, conversion into digital signals, removal of guard intervals, extraction of frequency domain signals by fast Fourier transform, or the like for uplink signals. The demultiplexing unit 211b separates an uplink channel and an uplink reference signal, such as a PUSCH (Physical Uplink Shared Channel) and a PUCCH (Physical Uplink Control Channel) from signals output from the wireless reception unit 211a. The demodulation unit 211c demodulates reception signals using a modulation method such as BPSK (Binary Phase Shift Keying) and QPSK (Quadrature Phase Shift Keying) for modulated symbols of uplink channels. The modulation method used by the demodulation unit 211c may be 16 QAM (Quadrature Amplitude Modulation), 64 QAM, or 256 QAM. The decoding unit 211d performs a decoding process for coded bits of the demodulated uplink channel. The decoded uplink data and uplink control information are output to the control unit 24.

The transmission processing unit 212 performs a transmission process for transmitting downlink control information and downlink data. The transmission processing unit 212 includes a coding unit 212a, a modulation unit 212b, a multiplexing unit 212c, and a wireless transmission unit 212d.

The coding unit 212a codes the downlink control information and the downlink data input from the control unit 24 using a coding method such as block coding, convolutional coding, and turbo coding. The modulation unit 212b modulates coded bits output from the coding unit 212a using a predetermined modulation method such as BPSK, QPSK, 16 QAM, 64 QAM, and 256 QAM. The multiplexing unit 212c multiplexes modulated symbols of respective channels and downlink reference signals, and arranges the multiplexed symbols and signals in a predetermined resource element. The wireless transmission unit 212d performs various types of signal processing for signals received from the multiplexing unit 212c. For example, the wireless transmission unit 212d performs conversion into a time domain by fast Fourier transform, addition of guard intervals, generation of baseband digital signals, conversion into analog signals, orthogonal modulation, up-conversion, removal of surplus frequency components, power amplification, or the like. Signals generated by the transmission processing unit 212 are transmitted from the antenna 213.

The storage unit 22 is a data readable and writable storage device such as a DRAM, a SRAM, a flash memory, and a hard disk. The storage unit 22 functions as storage means of the base station device 20. The storage unit 22 stores an information list, application information, and the like. The information list is information associated with the other base station devices 20 and 30 existing around the base station device 20 itself. The application information is information necessary for continuing an application process. The information list and the application information will be described in detail below.

The network communication unit 23 is a communication interface for communicating with other devices (e.g., management device 10, other base station devices 20, base station devices 30, local server devices 40, gateway GW, and cloud server CS). The network communication unit 23 has a function of directly or indirectly connecting to the network N1. For example, the network communication unit 23 includes a LAN interface such as an NIC. Moreover, the network communication unit 23 may be either a wired interface, or a wireless interface. The network communication unit 23 functions as network communication means of the base station device 20. The network communication unit 23 communicates with other devices (e.g., management device 10, local server devices 40, gateway GW, and cloud server CS) under control by the control unit 24. The network communication unit 23 may be configured similarly to the network communication unit 11 of the management device 10.

The control unit 24 is a controller which controls respective units of the base station device 20. For example, the control unit 24 is implemented by a processor such as a CPU (Central Processing Unit) and an MPU (Micro Processing Unit). For example, the control unit 24 is implemented under various programs stored in a storage device inside the base station device 20 and executed by the processor using a RAM (Random Access Memory) or the like as a work area. Note that the control unit 24 may be implemented by an integrated circuit such as an ASIC (Application Specific Integrated Circuit) and an FPGA (Field Programmable Gate Array). Each of the CPU, the MPU, the ASIC, and the FPGA can be considered as a controller.

As depicted in FIG. 4, the control unit 24 includes an acquisition unit 241, a handover processing unit 242, a transmission unit 243, and an application processing unit 244. Each of blocks constituting the control unit 24 (acquisition unit 241 to application processing unit 244) is a function block representing a function of the control unit 24. Each of these function blocks may be either a software block or a hardware block. For example, each of the function blocks described above may be one software module implemented by software (including a microprogram), or one circuit block on a semiconductor chip (die). Needless to say, each of the function blocks may be one processor or one integrated circuit. A configuration method of the function blocks may be any method. Note that the control unit 24 may be constituted by a function unit different from the function block described above. Operations of the respective blocks constituting the control unit 24 (acquisition unit 241 to application processing unit 244) will be described below in detail.

<2-4. Configuration of Base Station Device (without Edge Function)>

A configuration of the base station devices 30 will be subsequently described. Each of the base station devices 30 is a wireless communication device wirelessly communicating with the mobile body devices 50. For example, each of the base station devices 30 is a device functioning as a wireless base station, a wireless relay station, a wireless access point, or the like. In this case, each of the base station devices 30 may be a road base station device such as an RSU, or an optical extension device such as an RRH. As described above, the base station devices 30 are different from the base station devices 20 in a point that the function of executing an application process (e.g., edge function) is eliminated.

Figure 5:
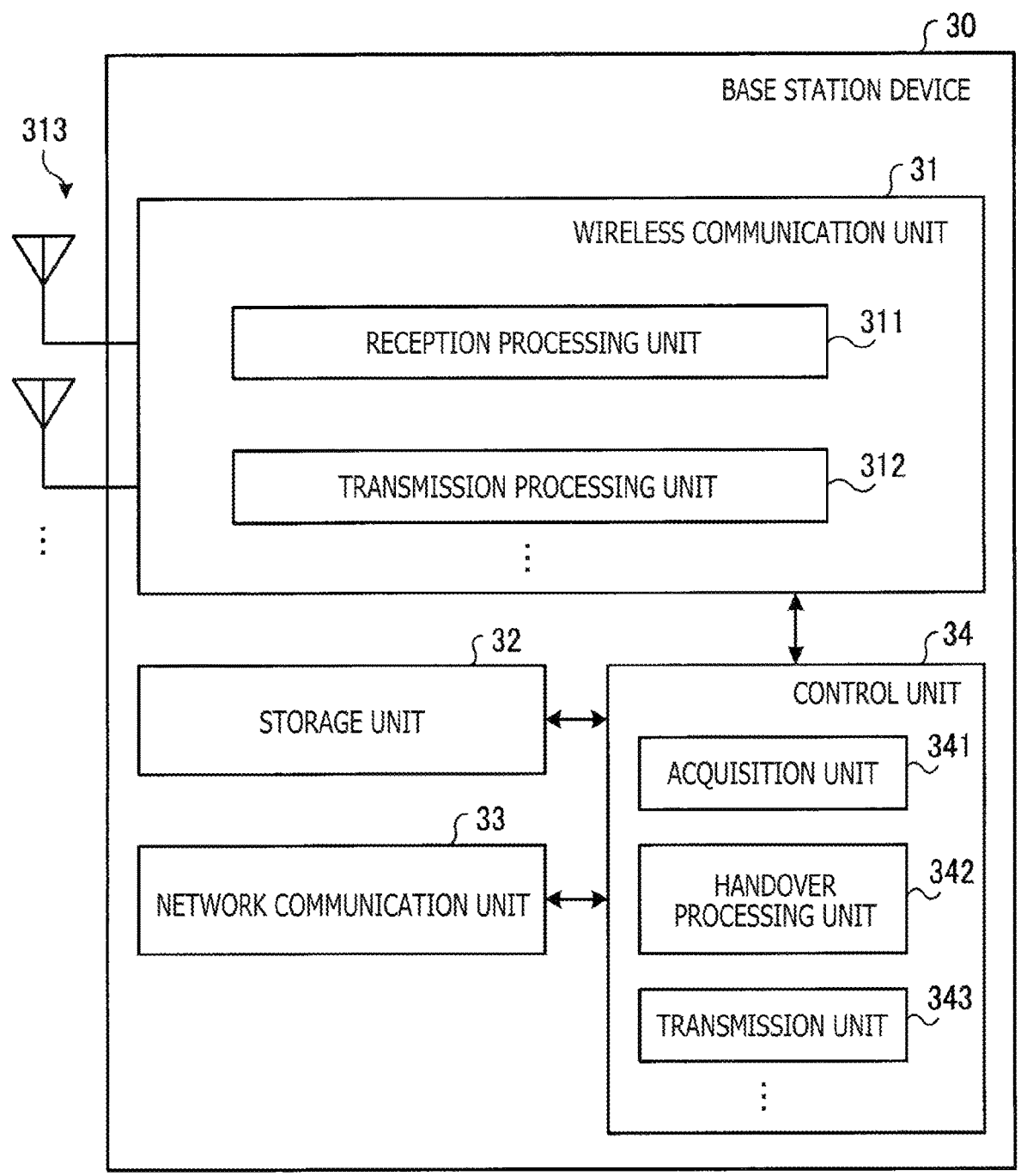
FIG. 5 is a diagram depicting a configuration example of a base station device according to the embodiment of the present disclosure.

FIG. 5 is a diagram depicting a configuration example of the base station device 30 according to the embodiment of the present disclosure. The base station device 30 includes a wireless communication unit 31, a storage unit 32, a network communication unit 33, and a control unit 34. Note that the configuration depicted in FIG. 5 is a functional configuration. A hardware configuration may be different from this configuration. Moreover, the function of the base station device 30 may be distributed into a plurality of physically separate configurations and provided in this form.

The wireless communication unit 31 is a wireless communication interface which wirelessly communicates with other wireless communication devices (e.g., mobile body devices 50, base station devices 20, and other base station devices 30). The wireless communication unit 31 operates under control by the control unit 34. The wireless communication unit 31 includes a reception processing unit 311, a transmission processing unit 312, and an antenna 313. The wireless communication unit 31 (reception processing unit 311, transmission processing unit 312, and antenna 313) is configured similarly to the wireless communication unit 21 of the base station device 20 (reception processing unit 211, transmission processing unit 212, and antenna 213).

The storage unit 32 is a data readable and writable storage device such as a DRAM, a SRAM, a flash memory, and a hard disk. The storage unit 32 functions as storage means of the base station device 30. The storage unit 32 is configured similarly to the storage unit 22 of the base station device 20.

The network communication unit 33 is a communication interface for communicating with other devices (e.g., management device 10, base station devices 20, other base station devices 30, local server devices 40, gateway GW, and cloud server CS). The network communication unit 33 has a function of directly or indirectly connecting to the network N1. For example, the network communication unit 33 includes a LAN interface such as an NIC. Moreover, the network communication unit 33 may be either a wired interface, or a wireless interface. The network communication unit 33 functions as network communication means of the base station device 30. The network communication unit 33 is configured similarly to the network communication unit 23 of the base station device 20.

The control unit 34 is a controller which controls respective units of the base station device 30. For example, the control unit 34 is implemented by a processor such as a CPU and an MPU. For example, the control unit 34 is implemented under various programs stored in a storage device inside the base station device 30 and executed by the processor using a RAM or the like as a work area. Note that the control unit 34 may be implemented by an integrated circuit such as an ASIC and an FPGA. Each of the CPU, the MPU, the ASIC, and the FPGA can be considered as a controller.

As depicted in FIG. 5, the control unit 34 includes an acquisition unit 341, a handover processing unit 342, and a transmission unit 343. Each of blocks constituting the control unit 34 (acquisition unit 341 to transmission unit 343) is a function block representing a function of the control unit 34. Each of these function blocks may be either a software block or a hardware block. For example, each of the function blocks described above may be one software module implemented by software (including a microprogram), or one circuit block on a semiconductor chip (die). Needless to say, each of the function blocks may be one processor or one integrated circuit. A configuration method of the function blocks may be any method. Note that the control unit 34 may be constituted by a function unit different from that of the function blocks described above. Operations of the respective blocks of the control unit 34 may be similar to operations of the respective blocks of the control unit 24 (acquisition unit 241 to transmission unit 243) described below. Explanation of the acquisition unit 241 to the transmission unit 243 appearing in the following description is applicable to explanation of the acquisition unit 341 to the transmission unit 343.

<2-5. Configuration of Local Server Device>

A configuration of the local server devices 40 will be subsequently described. Each of the local server devices 40 is a processing device connected to the network N1. For example, each of the local server devices 40 may be a server device such as a PC server, a midrange server, and a mainframe server. Each of the local server devices 40 has a function of executing application processing (e.g., edge function), and provides an application process (e.g., edge process) for the mobile body devices 50. As described above, the local server devices 40 are different from the cloud server device CS in the point that the local server devices 40 are disposed within the network N1. The management device 10 may function as the local server device 40.

Figure 6:
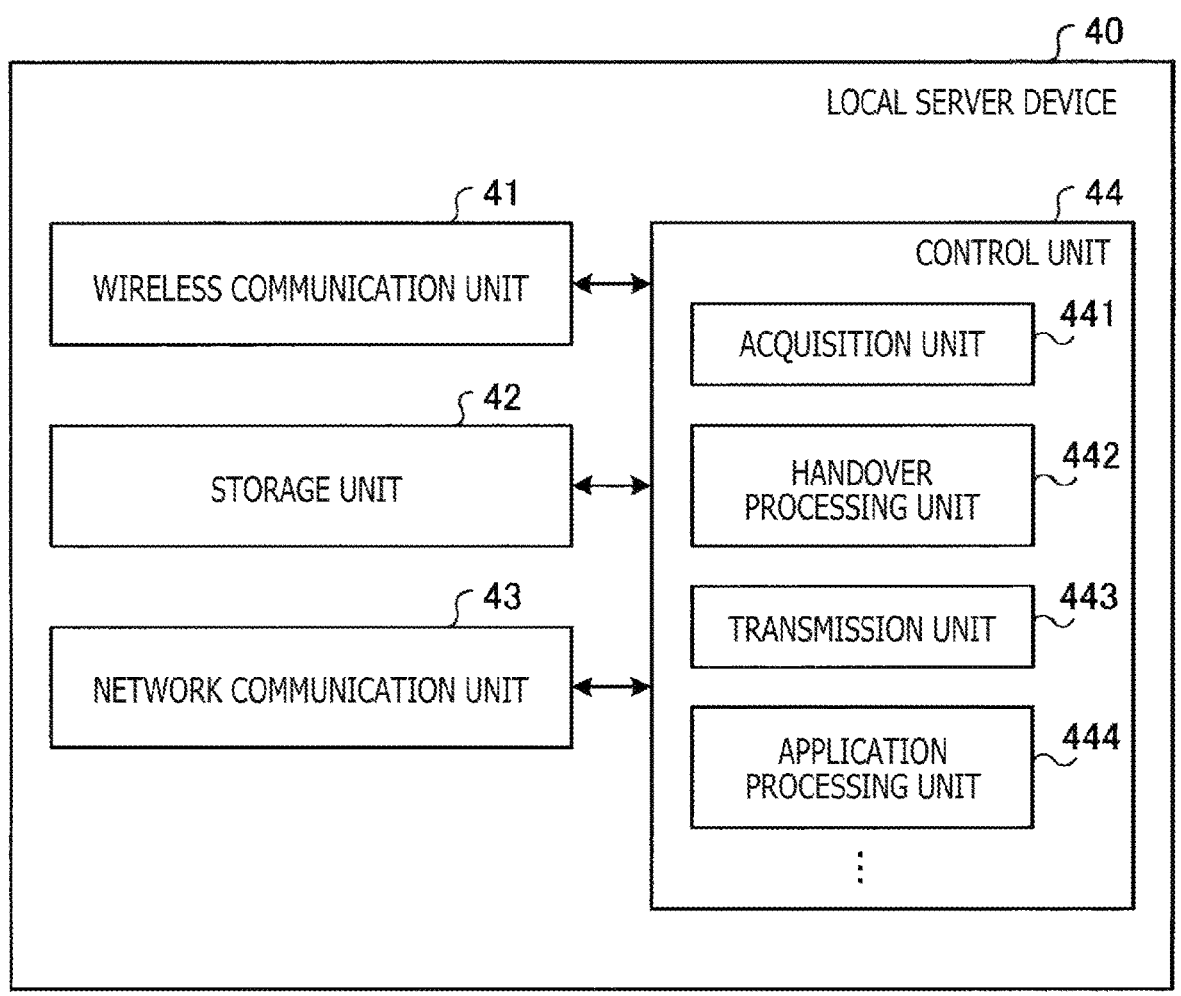
FIG. 6 is a diagram depicting a configuration example of a local server device according to the embodiment of the present disclosure.

FIG. 6 is a diagram depicting a configuration example of the local server device 40 according to the embodiment of the present disclosure. The local server device 40 includes a wireless communication unit 41, a storage unit 42, a network communication unit 43, and a control unit 44. Note that the configuration depicted in FIG. 6 is a functional configuration. A hardware configuration may be different from this configuration. Moreover, the function of the local server device 40 may be distributed into a plurality of physically separate configurations and provided in this form.

The wireless communication unit 41 is a wireless communication interface which wirelessly communicates with other wireless communication devices (e.g., mobile body devices 50, base station devices 20, and base station devices 30). The wireless communication unit 41 operates under control by the control unit 44. The local server device 40 is not necessarily required to include the wireless communication unit 41. The wireless communication unit 41 is configured similarly to the wireless communication unit 21 of the base station device 20.

The storage unit 42 is a data readable and writable storage device such as a DRAM, a SRAM, a flash memory, and a hard disk. The storage unit 42 functions as storage means of the local server device 40. The storage unit 42 is configured similarly to the storage unit 22 of the base station device 20.

The network communication unit 43 is a communication interface for communicating with other devices (e.g., management device 10, base station devices 20, base station devices 30, other local server devices 40, gateway GW, and cloud server CS). The network communication unit 43 has a function of directly or indirectly connecting to the network N1. For example, the network communication unit 43 includes a LAN interface such as an NIC. Moreover, the network communication unit 43 may be either a wired interface, or a wireless interface. The network communication unit 43 functions as network communication means of the local server device 40. The network communication unit 43 is configured similarly to the network communication unit 23 of the base station device 20.

The control unit 44 is a controller which controls respective units of the local server device 40. For example, the control unit 34 is implemented by a processor such as a CPU and an MPU. For example, the control unit 44 is implemented under various programs stored in a storage device inside the local server device 40 and executed by the processor using a RAM or the like as a work area. Note that the control unit 44 may be implemented by an integrated circuit such as an ASIC and an FPGA. Each of the CPU, the MPU, the ASIC, and the FPGA can be considered as a controller.

As depicted in FIG. 6, the control unit 44 includes an acquisition unit 441, a handover processing unit 442, a transmission unit 443, and an application processing unit 444. Each of blocks constituting the control unit 44 (acquisition unit 441 to application processing unit 444) is a function block representing a function of the control unit 44. Each of these function blocks may be either a software block or a hardware block. For example, each of the function blocks described above may be one software module implemented by software (including a microprogram), or one circuit block on a semiconductor chip (die). Needless to say, each of the function blocks may be one processor or one integrated circuit. A configuration method of the function blocks may be any method. Note that the control unit 44 may be constituted by a function unit different from that of the function blocks described above. Operations of the respective blocks constituting the control unit 44 will be described below in detail.

<2-6. Configuration of Mobile Body Device>

A configuration of the mobile body devices 50 will be subsequently described. Each of the mobile body devices 50 is a movable wireless communication device. For example, each of the mobile body devices 50 is a vehicle such as a car, or a wireless communication device mounted on the vehicle. Each of the mobile body devices 50 may be a movable terminal device such as a cellular phone and a smart device. Each of the mobile body devices 50 is wirelessly communicable with the base station devices 20 and the base station devices 30.

Figure 7:
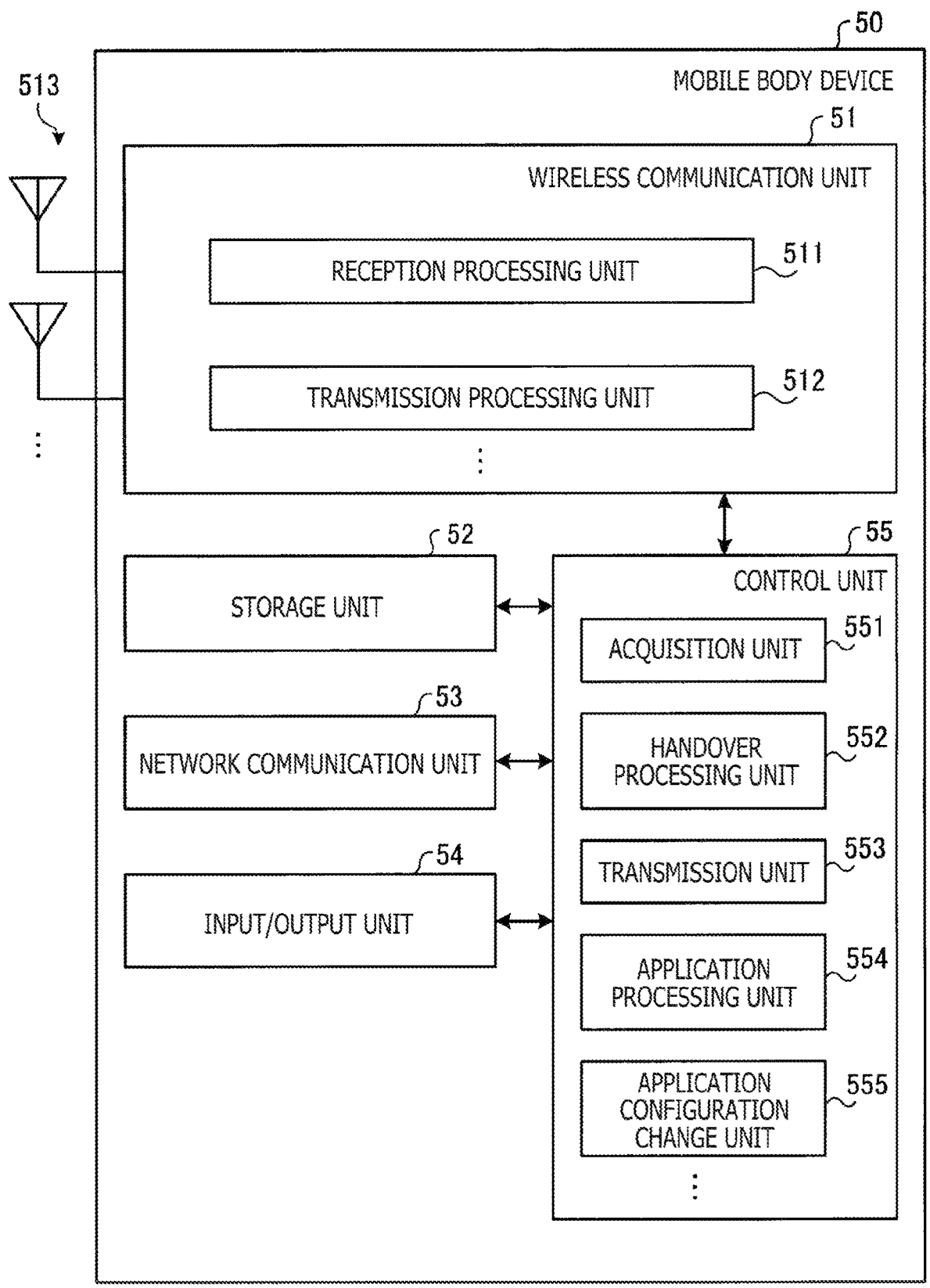
FIG. 7 is a diagram depicting a configuration example of a mobile body device according to the embodiment of the present disclosure.

FIG. 7 is a diagram depicting a configuration example of the mobile body device 50 according to the embodiment of the present disclosure. The mobile body device 50 includes a wireless communication unit 51, a storage unit 52, a network communication unit 53, an input/output unit 54, and a control unit 55. Note that the configuration depicted in FIG. 7 is a functional configuration. A hardware configuration may be different from this configuration. Moreover, the function of the mobile body device 50 may be distributed into a plurality of physically separate configurations and provided in this form.

The wireless communication unit 51 is a wireless communication interface which wirelessly communicates with other wireless communication devices (e.g., base station devices 20 and base station devices 30). The wireless communication unit 51 operates under control by the control unit 55. The wireless communication unit 51 handles one or a plurality of wireless access methods. For example, the wireless communication unit 51 handles both NR and LTE. The wireless communication unit 51 may handle W-CDMA and cdma 2000 in addition to NR and LTE. Moreover, the wireless communication unit 21 handles communication using NOMA. NOMA will be described in detail below.

The wireless communication unit 51 includes a reception processing unit 511, a transmission processing unit 512, and an antenna 513. The wireless communication unit 51 may include a plurality of the reception processing units 511, a plurality of the transmission processing units 512, and a plurality of the antennas 513. Note that each of the units of the wireless communication unit 51 can be individually configured for each wireless access method in a case where the wireless communication unit 51 handles a plurality of wireless access methods. For example, each of the reception processing unit 511 and the transmission processing unit 512 may be individually configured for each of LTE and NR.

The reception processing unit 511 processes downlink signals received via the antenna 513. The reception processing unit 511 includes a wireless reception unit 511a, a demultiplexing unit 511b, a demodulation unit 511c, and a decoding unit 511d.

The wireless reception unit 511a performs down-conversion, removal of unnecessary frequency components, amplification level control, orthogonal demodulation, conversion into digital signals, removal of guard intervals, extraction of frequency domain signals by fast Fourier transform, or the like for downlink signals. The demultiplexing unit 511b separates a downlink channel, a downlink synchronized signal, and a downlink reference signal from signals output from the wireless reception unit 511a. For example, the downlink channel is a channel such as a PBCH (Physical Broadcast Channel), a PDSCH (Physical Downlink Shared Channel), and a PDCCH (Physical Downlink Control Channel). The demodulation unit 211c demodulates reception signals for modulated symbols of the downlink channel using a modulation method such as BPSK, QPSK, 16 QAM, 64 QAM, and 256 QAM. The decoding unit 511d performs a decoding process for coded bits of the demodulated downlink channel. The decoded downlink data and downlink control information are output to the control unit 55.

The transmission processing unit 512 performs a transmission process for uplink control information and uplink data. The transmission processing unit 512 includes a coding unit 512a, a modulation unit 512b, a multiplexing unit 512c, and a wireless transmission unit 512d.

The coding unit 512a codes the uplink control information and the uplink data input from the control unit 55 using a coding method such as block coding, convolutional coding, and turbo coding. The modulation unit 512b modulates coded bits output from the coding unit 512a using a predetermined method such as BPSK, QPSK, 16 QAM, 64 QAM, and 256 QAM. The multiplexing unit 512c multiplexes modulated symbols of respective channels and uplink reference signals, and arranges the multiplexed symbols and signals in a predetermined resource element. The wireless transmission unit 512d performs various types of signal processing for signals received from the multiplexing unit 512c. For example, the wireless transmission unit 512d performs conversion into a time domain by inverse fast Fourier transform, addition of guard intervals, generation of baseband digital signals, conversion into analog signals, orthogonal modulation, up-conversion, removal of surplus frequency components, power amplification, or the like. Signals generated by the transmission processing unit 512 are transmitted from the antenna 513.

The storage unit 52 is a data readable and writable storage device such as a DRAM, a SRAM, a flash memory, and a hard disk. The storage unit 52 functions as storage means of the mobile body device 50.

The network communication unit 53 is a communication interface for communicating with other devices. For example, the network communication unit 53 is a LAN interface such as an NIC. The network communication unit 53 has a function of directly or indirectly connecting to the network N1. The network communication unit 53 may be either a wired interface, or a wireless interface. The network communication unit 53 functions as network communication means of the mobile body device 50. The network communication unit 53 communicates with other devices under control by the control unit 55.

The input/output unit 54 is a user interface provided for information exchange with a user. For example, the input/output unit 54 is an operation device through which the user performs various types of operation, such as a keyboard, a mouse, operation keys, and a touch panel. Alternatively, the input/output unit 54 is a display device such as a liquid crystal display and an organic EL display (Organic Electroluminescence Display). The input/output unit 54 may be an acoustic device such as a speaker and a buzzer. In addition, the input/output unit 54 may be a lighting device such as an LED (Light Emitting Diode) lamp. The input/output unit 54 functions as input/output means (input means, output means, operation means, or notification means) of the mobile body device 50.

The control unit 55 is a controller which controls respective units of the mobile body device 50. For example, the control unit 55 is implemented by a processor such as a CPU and an MPU. For example, the control unit 55 is implemented under various programs stored in a storage device inside the mobile body device 50 and executed by the processor using a RAM or the like as a work area. Note that the control unit 55 may be implemented by an integrated circuit such as an ASIC and an FPGA. Each of the CPU, the MPU, the ASIC, and the FPGA can be considered as a controller.

As depicted in FIG. 7, the control unit 55 includes an acquisition unit 551, a handover processing unit 552, a transmission unit 553, an application processing unit 554, and an application configuration change unit 555. Each of blocks constituting the control unit 55 (acquisition unit 551 to application configuration change unit 555) is a function block representing a function of the control unit 55. Each of these function blocks may be either a software block or a hardware block. For example, each of the function blocks described above may be one software module implemented by software (including a microprogram), or one circuit block on a semiconductor chip (die). Needless to say, each of the function blocks may be one processor or one integrated circuit. A configuration method of the function blocks may be any method. Note that the control unit 55 may be constituted by a function unit different from that of the function blocks described above. Operations of the respective blocks constituting the control unit 44 will be described below in detail.

Figure 8:
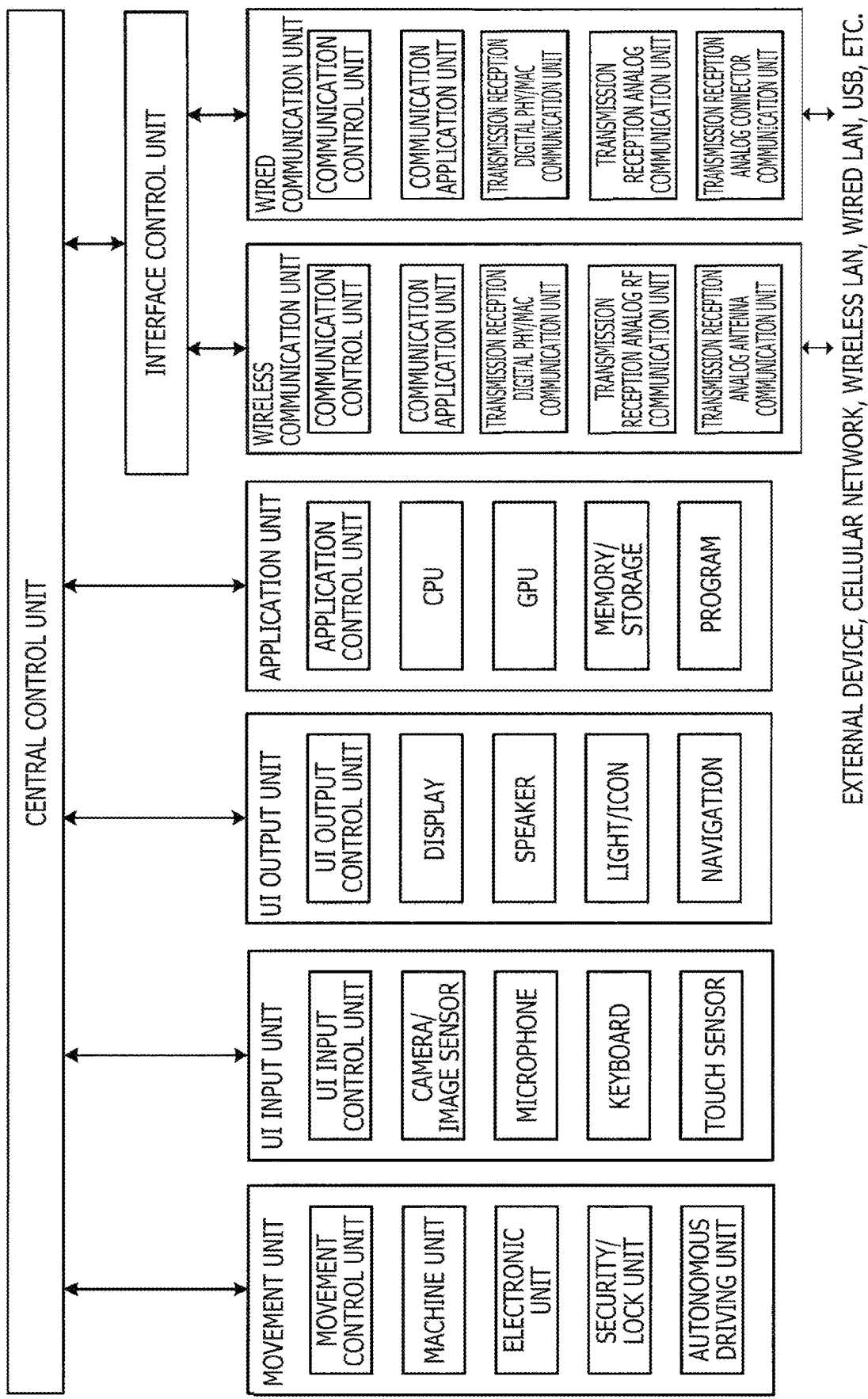
FIG. 8 is a diagram depicting a configuration example of a mobile body device 50 which unifies a moving function, a communication function, and an application function as a device.

Note that the mobile body device 50 may have a moving function. FIG. 8 is a diagram depicting a configuration example of the mobile body device 50 which unifies a moving function, a communication function, and an application function as a device. The mobile body device 50 depicted in FIG. 8 has a moving unit, and is movable by own power. For example, the mobile body device 50 depicted in FIG. 8 corresponds to a case where a communication chip, a CPU, a GPU, or the like is incorporated in a car or the like.

Figure 9:
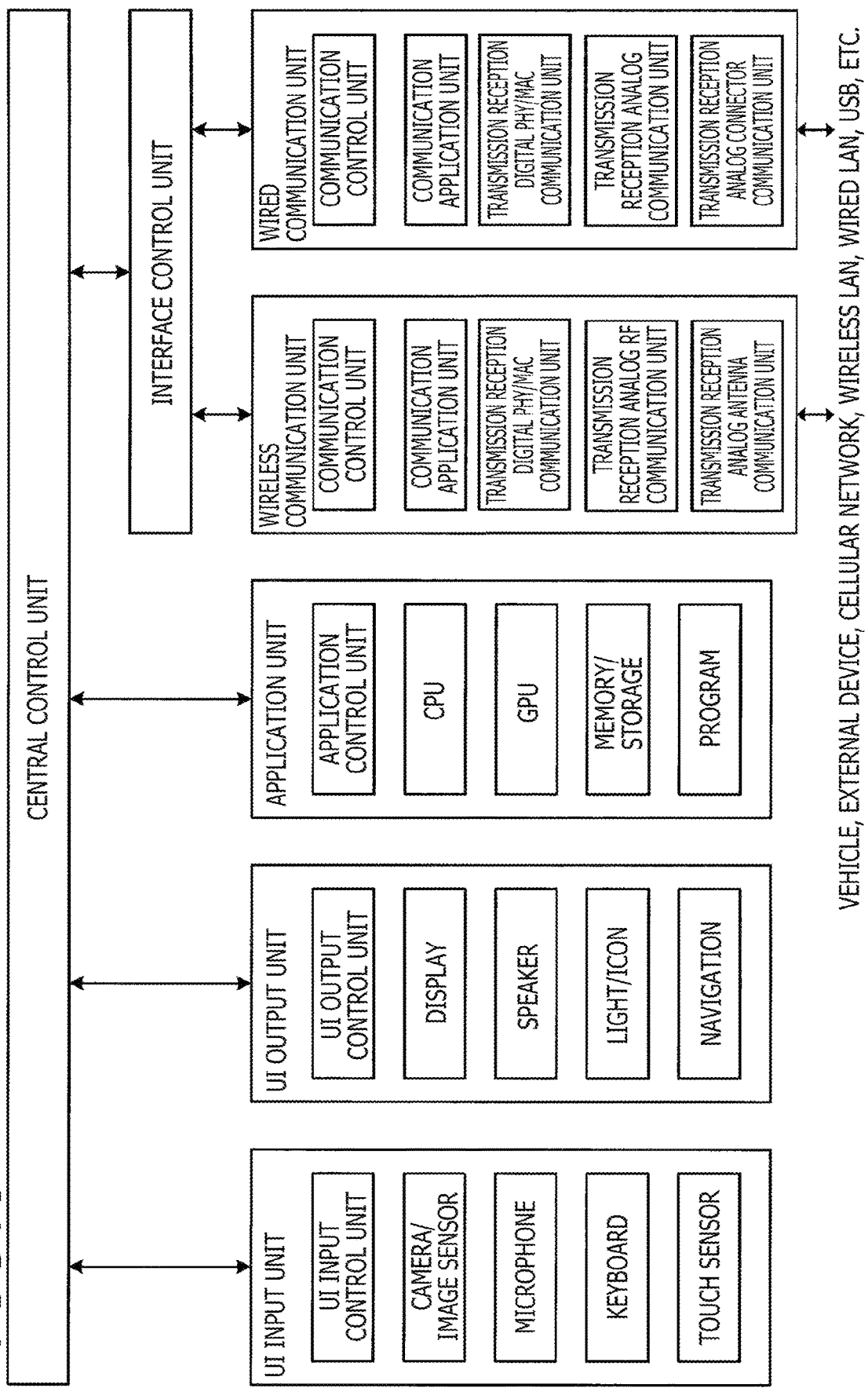
FIG. 9 is a diagram depicting a configuration example of a mobile body device not having a moving function.

Note that the mobile body device 50 is not required to have the moving function. FIG. 9 is a diagram depicting a configuration example of the mobile body device 50 which does not have the moving function. The mobile body device 50 depicted in FIG. 9 does not have the moving unit, and therefore is not movable by own power. The mobile body device 50 depicted in FIG. 9 is an example of a device which has a communication function and an application function externally added (in a retrofitted manner) to a device having a moving function (e.g., a vehicle such as a car). For example, the mobile body device 50 depicted in FIG. 9 corresponds to a case where a device such as a navigation system device, a cellular phone device, and a smartphone device is connected to a car for use.

<<3. Management of Information List>>

As described above, each of the base station devices 20 and 30 has information (information list) associated with other base station devices existing around the corresponding base station device 20 or 30. Management of the information list will be hereinafter described.

<3-1. Information List>

FIG. 10 depicts an example of the information list possessed by the base station devices 20 and 30 and associated with other base station devices. The information list includes items of "base station device ID," "base station host name," "base station device address," "base station device position information," "presence or absence of edge function," "number of applications provided by edge function," "application ID" of an application provided by the edge function, "number of cells provided by base station device," and "cell ID" of cells provided by the base station device are recorded for each of the other base station devices 20 and 30.

The "base station device address" is an address of the base station device on a network. For example, the base station device address is an IPv4 address or an IPv6 address of the corresponding base station device.

The "base station device position information" is information indicating a physical position of the base station device. For example, the base station device position information is information indicating latitude, longitude, and/or altitude of a place where the corresponding base station device (or the antenna of the base station device) is provided. Note that latitude and longitude are preferably essential items of information.

The "presence or absence of edge function" is information indicating whether or not the base station has the edge function. As described above, the information processing system 1 according to the present embodiment allows presence of a mixture of the base station devices 20 having the edge function and the base station devices 30 not having the edge function. Accordingly, a handover operation is appropriately selectable or switchable according to the indication of the presence or absence of the edge function.

For the base station having the edge function, it is preferable to describe the number of applications provided by the edge function, and the application IDs of these applications. The "number of applications provided by edge function" presented in FIG. 10 is the number of application provided by the edge function of the base station device having the edge function. Moreover, the "application ID" presented in FIG. 10 is identification information associated with the applications provided by the edge function. Note that applications to be provided may overlap with each other between different base station devices. Alternatively, a certain application may be provided by edge functions of a plurality of base station devices. Accordingly, duplication of the application ID of this application is allowed.

Moreover, the number of cells provided by the base station device and cell IDs of the cells are preferably described in the information list. The "number of cells provided by base station device" presented in FIG. 10 is the number of cells provided by the base station device. The "cell ID" presented in FIG. 10 is identification information associated with cells provided by the base station device. As for the cell ID, from viewpoints of appropriate control and management of wireless links and communication areas, it is preferable that different base station devices basically have different cell IDs (i.e., no duplication of cell IDs between different base station devices).

Note that the information list presented in FIG. 10 and associated with the base station devices may be possessed by devices other than the base station devices 20 and 30. For example, each of the local server devices 40, the management device 10, the gateway device GW, and the like may possess the information list associated with the base station devices. Moreover, each of the mobile body devices 50 may possess the information list associated with the base station devices.

A centralized management method and a decentralized management method are considered as the method for managing the information list.

<3-2. Management Method of Information List (Centralized Management)>

The centralized management method of the information list will be initially described. Note that the information list associated with the base stations, or a part or all information recorded in the information list will be referred to as "base station information" in some cases in the following description.

Figure 11:
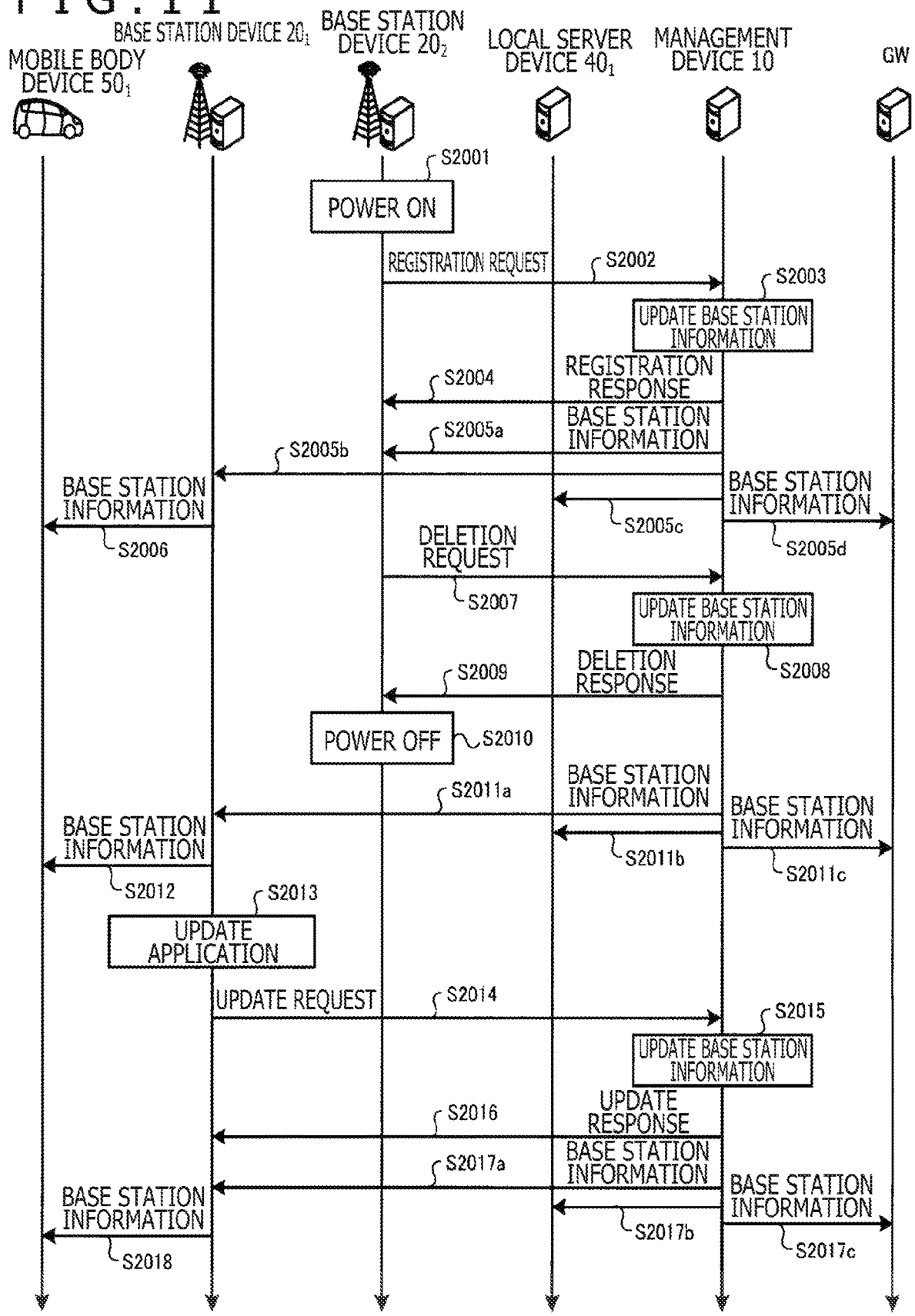
FIG. 11 is a sequence diagram presenting an example of centralized management of the information list associated with the base station devices within a network N1.

FIG. 11 is a sequence diagram presenting an example of centralized management of the information list associated with the base station devices within the network N1. In a case of centralized management of the information list, it is preferable that a device which manages the information list is defined within the network N1. In the example of FIG. 11, the management device 10 provides a function of centralized management of the information list. Needless to say, the device providing the function of centralized management of the information list is not limited to the management device 10. For example, the device providing the function of centralized management of the information list may be any one of the base station devices 20, the base station devices 30, the local server devices 40, and the gateway device GW.

While a local server device 401 is presented as the local server device 40 in the example of FIG. 11, the local server device 40 is not limited to the local server device 401. Moreover, while base station devices $20_1$ and $20_2$ are presented as the base station devices 20 in the example of FIG. 11, the base station devices 20 are not limited to the base station devices $20_1$ and $20_2$. Furthermore, while the base station devices depicted in FIG. 11 are both the base station devices 20, the base station devices may be the base station devices 30. The description of the "base station devices 20" may be replaced with the description of "base station devices 30" as appropriate. Moreover, while a mobile body device 501 is presented as the mobile body device 50 in the example of FIG. 11, the mobile body device 50 is not limited to the mobile body device 501. It is assumed that the mobile body device 501 is connected to the base station device $20_1$ in the following description.

Initially, the base station device 20 transmits a request for registration, deletion, or change of the base station devices to the management device 10 at predetermined timing. Possible examples of the predetermined timing include following (A) to (C).

(A1) After power-on (e.g., an occasion of new installation of the base station device within the network N1, and an occasion of restoration from maintenance)

(A2) Before power-off (e.g., an occasion of removal of the base station device from the network N1, and an occasion of a start of maintenance)

(A3) On an occasion of change of an application process to be provided (e.g., a start of the edge function, an end of the edge function, at the time of an increase in the number of applications processed by the application process to be provided, at the time of a decrease in the number of applications processed by the application process to be provided, and at the time of a change of an application configuration of the provided application process).

(Power-on)

A case of power-on in (A1) will be initially described.

In the example of FIG. 11, the base station device $20_2$ executes power-on (step S2001). Thereafter, the base station device $20_2$ transmits a registration request for registering the base station device $20_2$ to the management device 10 (step S2002). The management device 10 having received the registration request of the base station device $20_2$ updates base station information managed by the management device 10 in accordance with the request (step S2003). The management device 10 having updated the base station information transmits a registration response to the base station device $20_2$ (step S2004). Moreover, the management device 10 provides the updated base station information to different devices within the network N1 (steps S2005a to S2005d). At this time, it is preferable that the mobile body devices 50 are not included in the different devices to which the base station information is transmitted from the management device 10. Provision of the base station information for the mobile body devices 50 will be described below. Note that the management device 10 may individually transmit the base station information to each of a plurality of the different devices (unicast), transmit the base station information for each of predetermined groups each constituted by a plurality of the different devices (multicast), or may simultaneously transmit the base station information to all of the different devices (broadcast).

It is preferable that the base station information for each of the mobile body devices 50 is provided from the base station device 20 or 30 connected to the corresponding mobile body device 50 at that time. According to the example presented in FIG. 11, the base station device $20_1$ provides the base station information for the mobile body device 501 (step S2006). In this case, each of the base station devices 20 and 30 may individually transmit the base station information to the underlying mobile body device 50 by unicast, or transmit the base station information to a group of the underlying mobile body devices 50 by multicast. Alternatively, each of the base station devices 20 and 30 may transmit the base station information to the communication area provided by the corresponding base station device 20 or 30 by broadcast. In addition, each of the base station devices 20 and 30 may provide the base station information for the mobile body devices 50 every time the base station information is provided from the management device 10. Alternatively, the base station devices 20 and 30 may provide base station information for the mobile body devices 50 at predetermined timing (e.g., regularly). In a case where the base station information is regularly provided from the base station devices, the base station devices 20 and 30 may skip information provision for the mobile body devices 50 when the base station information is not updated.

(Power-Off)

A case of power-off in (A2) will be subsequently described. In the example of FIG. 11, the base station device $20_2$ is a base station device which turns off power.

Initially, the base station device $20_2$ transmits a deletion request for deleting the base station device $20_2$ to the management device 10 before power-off (step S2007). The management device 10 having received the deletion request from the base station device $20_2$ updates base station information managed by the management device 10 in accordance with the request (step S2008). The management device 10 having updated the base station information transmits a deletion response to the base station device $20_2$ (step S2009). The base station device $20_2$ having received the deletion response executes power off (step S2010). The management device 10 provides the updated base station information to different devices within the network N1 (steps S2011a to S2011c). The base station device $20_1$ having received the base station information from the management device 10 provides the base station information for the mobile body device 501 (step S2012).

(Application Update)

A case of application update in (A3) will be subsequently described. In the following description, a change such as a change of the number of applications processed by the application process provided by the base station device will be simply referred to as "application update" in some cases.

According to the example of FIG. 11, the base station device $20_1$ updates the application (step S2013). After the application update, the base station device $20_1$ transmits an update request for updating the base station information to the management device 10 (step S2014). The management device 10 having received the update request from the base station device $20_1$ updates base station information managed by the management device 10 in accordance with the request (step S2015). The management device 10 having updated the base station information transmits an update response to the base station device $20_1$ (step S2016). Moreover, the management device 10 provides the updated base station information for different devices within the network N1 (steps S2017a to S2017d). The base station device $20_1$ having received the base station information from the management device 10 provides the base station information for the mobile body device 501 (step S2018).

<3-3. Management Method of Information List (Decentralized Management)>

The decentralized management method of the information list will be subsequently described.

FIG. 12 is a sequence diagram presenting an example of decentralized management of the information list associated with the base station devices within the network N1. In the case of decentralized management, each of the base station devices 20 and 30 manages base station information associated with the corresponding base station device 20 or 30 and different base station devices within the corresponding base station device 20 or 30.

Note that the device desiring to issue a request for registration or deletion of the base station device may issue the request to a plurality of devices rather than to one particular device. The request may be transmitted by broadcast or multicast. The device having received the request executes addition or deletion of the base station device which is a transmitter of the request to and from the base station information managed by the device having received the request. Moreover, the device having received the request may give a response (ACK/NACK) of reception of the request to the base station device which is a transmitter of the request. Note that transmission of the request is not required to be targeted only at the base station devices 20 and 30. Transmission of the request may be targeted at the local server devices 40, the management device 10, the gateway device GW, or the like. According to the example of FIG. 12, the base station information is managed by the local server device 40, the management device 10, and the gateway device GW in addition to the base station devices 20.

While the local server device 401 is presented as the local server device 40 in the example of FIG. 12, the local server device 40 is not limited to the local server device 401. Moreover, while base station devices $20_1$ and $20_2$ are presented as the base station devices 20 in the example of FIG. 11, the base station devices 20 are not limited to the base station devices $20_1$ and $20_2$. Furthermore, while the base station devices depicted in FIG. 12 are both the base station devices 20, the base station devices may be the base station devices 30. The "base station devices 20" may be replaced with the "base station devices 30" as appropriate. Moreover, while the mobile body device 501 is presented as the mobile body device 50 in the example of FIG. 12, the mobile body device 50 is not limited to the mobile body device 501. It is assumed that the mobile body device 501 is connected to the base station device $20_1$ in the following description.

Initially, the base station device 20 transmits a request for registration, deletion, or change of the base station device to different devices within the network N1 at predetermined timing. Possible examples of the predetermined timing include (A1) to (B3) described above.

(Power-on)

A case of power-on in (A1) will be initially described. In the example of FIG. 11, the base station device $20_2$ executes power-on (step S2001). Thereafter, the base station device $20_2$ transmits a registration request for registering the base station device $20_2$ to each of different devices (local server device 40, management device 10, gateway device GW, and base station device $20_1$) on the network N1 (steps S2002a to S2002d). Each of the different devices having received the registration request from the base station device $20_2$ updates base station information managed by the corresponding different device in accordance with the request (steps S2003a to S2003d). At this time, the base station device $20_2$ also updates base station information associated with the base station device $20_2$ (step S2003e). Each of the different devices having updated the base station information transmits a registration response to the base station device $20_2$ (steps S2004a to S2004d). The base station device $20_1$ having updated the base station information provides the base station information for the mobile body device 501 (step S2006).

(Power-Off)

A case of power-off in (A2) will be subsequently described. In the example of FIG. 11, the base station device $20_2$ is a base station device which turns off power. Initially, the base station device $20_2$ transmits a deletion request for deleting the base station device $20_2$ to each of different devices on the network N1 before power-off (steps S2007a to S2007d). Each of the different devices having received the deletion request of the base station device $20_2$ updates base station information managed by the corresponding different device in accordance with the request (steps S2008a to S2008d). At this time, the base station device $20_2$ also updates base station information associated with the base station device $20_2$ (step S2008e). Each of the different devices having updated the base station information transmits a deletion response to the base station device $20_2$ (steps S2009a to S2009d). The base station device $20_2$ having received the deletion response executes power-off (step S2010). The base station device $20_1$ having updated the base station information provides the base station information for the mobile body device 501 (step S2012).

(Application Update)

A case of application update in (A3) will be subsequently described. According to the example of FIG. 11, the base station device $20_1$ updates the application (step S2013). After the application update, the base station device $20_1$ transmits an update request for updating the base station information to each of different devices on the network N1 (steps S2014a to S2014d). Each of the different devices having received the update request from the base station device $20_1$ updates base station information managed by the corresponding different device in accordance with the request (steps S2015a to S2015d). At this time, the base station device $20_2$ also updates base station information associated with the base station device $20_2$ (step S2015e). Each of the different devices having updated the base station information transmits an update response to the base station device $20_1$ (steps S2016a to S2016d). The base station device $20_1$ having received and updated the base station information provides the base station information for the mobile body device 501 (step S2018).

4. APPLICATION HANDOVER

Two types of handover will be considered in the present embodiment. One of these is an application handover (first handover), while the other is a wireless handover (second handover).

The wireless handover herein is a handover for maintaining a wireless link connection between the mobile body device 50 and a different base station device.

On the other hand, the application handover is a process for transferring an application process executed by an application processing device connected to a predetermined network (e.g., network N1) to a different application processing device connected to the predetermined network. For example, the application handover is a handover for maintaining an application level connection between the mobile body device 50 and a different application processing device.

The application processing device executing the application process herein may be either the base station device 20 wirelessly connected, or a device not wirelessly connected (e.g., local server device 40 or base station device 20 not wirelessly connected).

Note that the application processing device is a processing device (or information processing device) which provides an application process for the mobile body device 50. For example, the application processing device is a base station device having the edge function, a local server device, or a cloud server device on the Internet. Needless to say, the application processing device is not limited to these examples.

The present embodiment will be described with a particular focus put on the "application handover."

FIG. 13 is a diagram presenting examples of a combination of starting criteria (triggers) of the wireless handover and the application handover. The base station device may determine execution of the wireless handover and the application handover on the basis of different measured values (determination materials). Moreover, the base station device may determine execution of the wireless handover and the application handover on the basis of the same measured value (determination material).

Basically, the wireless handover is determined on the basis of a measured value of wireless signal quality (or wireless communication quality) of each of a plurality of base station devices. Examples of the measured value include reception signal intensity, RSSI (Received Signal Strength Indicator), RSRP (Reference Signal Received Power), RSRQ (Reference Signal Received Quality), a signal-to-noise power ratio (SNR), a signal-to-interference power ratio (SIR), a signal-to-interference-and-noise power ratio (SINR: Signal-to-Interference-and-Noise Power Ratio), channel state information (CSI), CQI (Channel Quality Indicator), a throughput, and a bit rate.

On the other hand, considered for the application handover are a case based on a measured value of signal quality (or communication quality) of each of a plurality of base station devices, and a case based on a measured value of a moving state of the mobile body device 50. Examples of the measured value of the latter case include a moving speed (e.g., an absolute speed, a horizontal speed, and a vertical speed), a moving direction (e.g., a horizontal orientation, an angle, a vertical orientation, and an angle). These are measurable using a gyroscope (gyro-sensor), a three-axis acceleration sensor, or the like attached to the mobile body device 50. Note that the moving state of the mobile body device 50 may include a current position of the mobile body device 50 (e.g., at which position within the cell the mobile body device 50 is located).

5. HANDOVER PROCESS (CASE (1) WHERE BOTH HAVE EDGE FUNCTION)

Subsequently described will be a handover process performed in a case where the mobile body device 50 moves between base station devices each having the edge function. The handover process described herein is an example of an application handover in accordance with a moving state (position information, moving information, or the like) of the mobile body device 50.

<5-1. Handover Procedure>

Figure 14A:
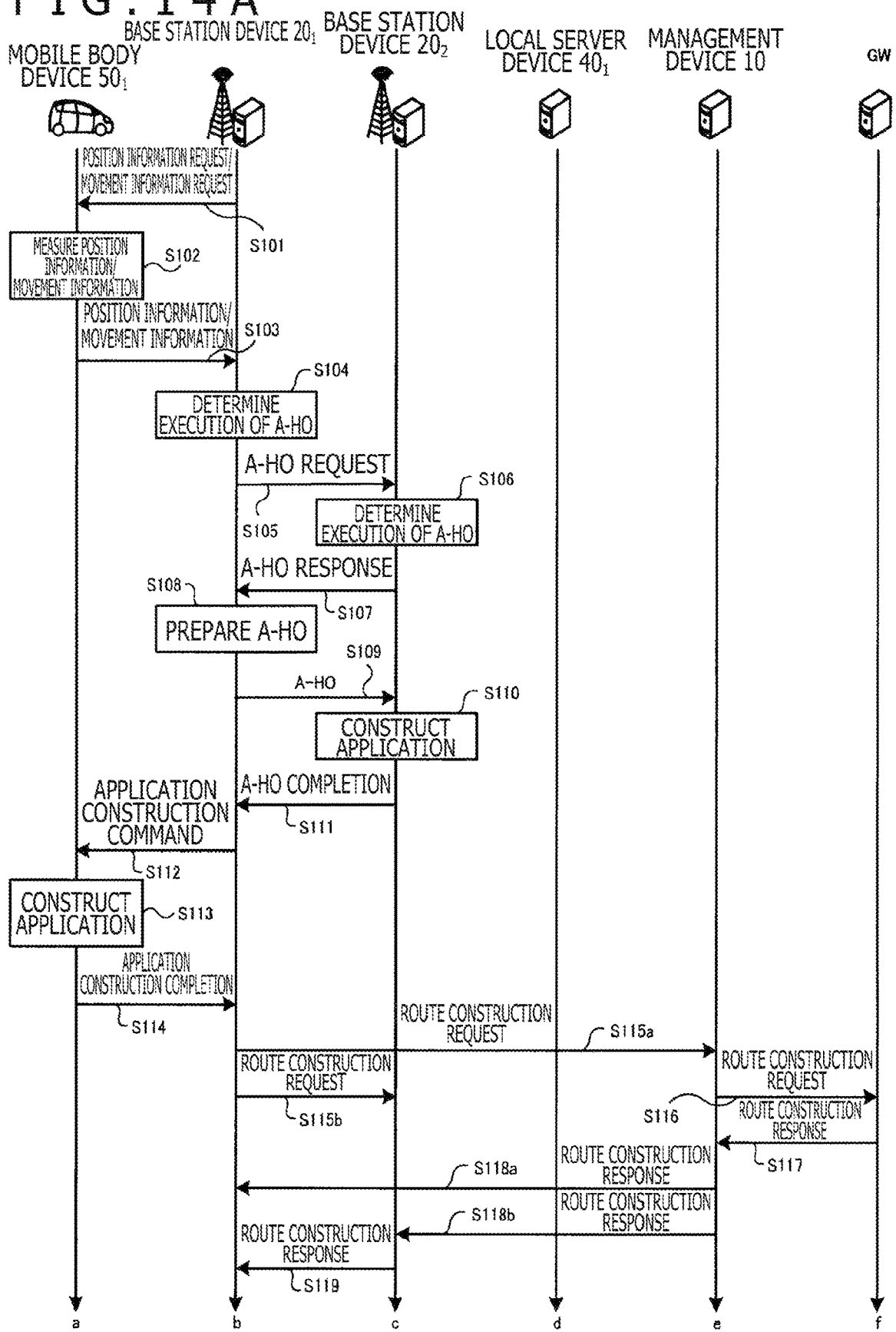
FIG. 14A is a sequence diagram presenting an example of an application handover procedure.

FIG. 14A is a sequence diagram presenting an example of an application handover procedure. FIG. 14A is an example of an application handover in accordance with a moving state of the mobile body device 50. According to the example of FIG. 14A, the base station device 20 starts a process of an application handover on the basis of a criterion different from a starting criterion of a wireless handover.

While the local server device 401 is presented as the local server device 40 in the example of FIG. 14A, the local server device 40 is not limited to the local server device 401. Moreover, while the base station devices $20_1$ and $20_2$ are presented as the base station devices 20 in the example of FIG. 14A, the base station devices 20 are not limited to the base station devices $20_1$ and $20_2$. Furthermore, while the mobile body device 501 is presented as the mobile body device 50 in the example of FIG. 14A, the mobile body device 50 is not limited to the mobile body device 501.

It is assumed that the mobile body device 501 is currently connected to the base station device $20_1$, and will be subsequently connected to the base station device $20_2$ in the following description. In the example of FIG. 14A, it is assumed that each of the base station device $20_1$ and the base station device $20_2$ has the edge function. It is assumed that the base station device $20_1$ to which the mobile body device 501 is currently connected acquires position information (or movement information) associated with the mobile body device 501, and triggers execution of the application handover on the basis of this information. It is preferable that (the trigger of) the application handover is executed prior to the wireless handover to avoid disconnection at the application level. Moreover, it is preferable that each of the application handover and the wireless handover is individually determined and executed for each of the mobile body devices 50.

Initially, the base station device 20₁ to which the mobile body device 501 is currently connected sends a request for feedback of position information and movement information to the mobile body device 501 (step S101). The base station device 20₁ may send the request to the mobile body device 50 for each case, or may input a setting (Configuration or Pre-configuration) beforehand to the mobile body device 50 such that feedback of position information or movement information is regularly given.

The mobile body device 501 having received this request measures position information or movement information associated with the mobile body device 501 (step S102). Thereafter, the mobile body device 501 notifies (give feedback to) the base station device 20₁ of a measured result (step S103).

The base station device 20₁ determines whether or not the application handover is necessary on the basis of the measured result given as notification (step S104). "A-HO" in the figure represents an application handover. When it is determined that the application handover is necessary, the base station device 20₁ issues a notification of a request for an application handover to the base station device 20₂ which is a new application handover destination candidate for the handover of the target mobile body device 501 (step S105).

The base station device 20₂ corresponding to the handover destination candidate determines whether or not the request for the application handover is receivable (step S106). In a case of determination that the request is receivable, the base station device 20₂ gives a response that the request is receivable (step S107).

The base station device 20₁ corresponding to the handover source and given the notification that the request is receivable prepares an application handover associated with the mobile body device 501 (step S108), and executes the application handover to the base station device 20₂ corresponding to the handover destination (step S109). A specific example of information transferred by the application handover will be described below.

The base station device 20₂ having received application information from the base station device 20₁ corresponding to the handover source constructs (or reconstructs) an application of the target mobile body device 501 (step S110). The application information is information necessary for continuing an application process. Examples of the application information include a user ID, a device ID, a port, a cache, a cookie, a session, time-series information, space information, position information, VM/Container information, and calculation development information. Needless to say, the application information is not limited to these examples. After completion of construction (reconstruction) of the application, the base station device 20₂ notifies the base station device 20₁ corresponding to the handover source of the fact that the construction (reconstruction) has been completed (step S111).

The base station device 20₁ corresponding to the handover source notifies the target mobile body device 501 of the fact that preparation of the application handover has been completed (step S112). Thereafter, the mobile body device 501 executes necessary construction (reconstruction) of the application (step S113). After completion of construction (reconstruction) of the application, the mobile body device 501 notifies the base station device 20₁ corresponding to the handover source of this completion (step S114).

After completion of the preparation of the application by each of the base station device 20₂ and the mobile body device 501, the base station device 20₁ gives a notification requesting formation of a path (route) for data transfer to each of the different devices within the information processing system 1 (e.g., base station device 20₂, management device 10, and gateway device GW) (steps S115 to S119). In a case where a wireless connection between the mobile body device 501 and the base station device 20₂ has been established, the application handover finishes by the above steps.

Figure 14B:
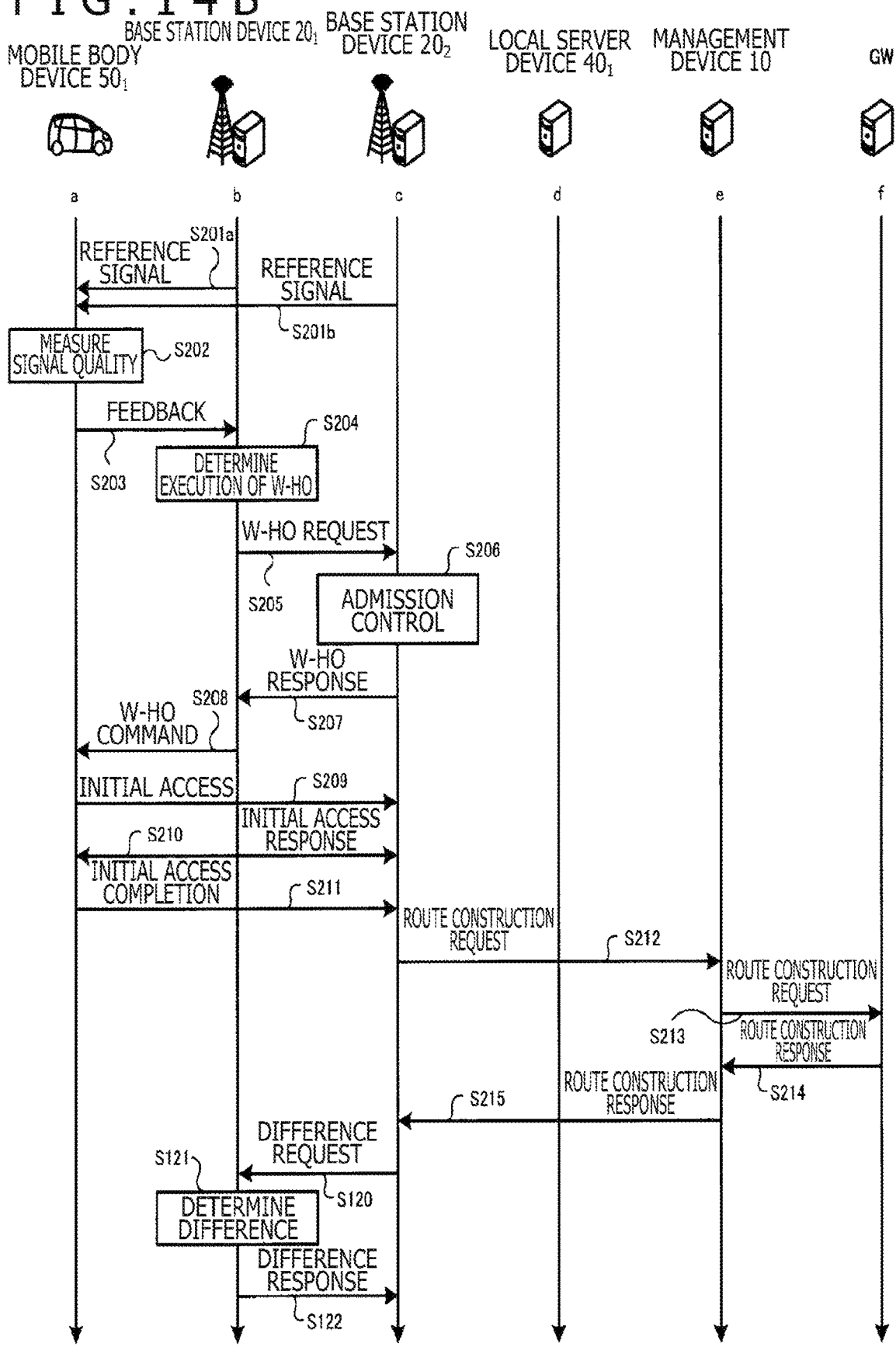
FIG. 14B is a sequence diagram presenting a wireless handover procedure continuously performed after the application handover presented in FIG. 14A.

After completion of the application handover, a process of the wireless handover may be continuously performed after the application handover. FIG. 14B is a sequence diagram presenting an example of a wireless handover procedure continuously performed after the application handover presented in FIG. 14A.

Initially, the mobile body device 501 receives a reference signal for wireless signal quality measurement from each of the base station devices 20 (steps S201a to S201b). Thereafter, the mobile body device 501 measures wireless signal quality of each of the plurality of base station devices 20 (step S202). The mobile body device 501 notifies (give feedback to) the currently connected base station device 20₁ of a measured result (step S203).

The base station device 20₁ determines whether or not the wireless handover is necessary on the basis of the measured result given as notification (step S204). "W—HO" in the figure represents a wireless handover. When it is determined that the wireless handover is necessary, the base station device 20₁ issues a notification of a request for the wireless handover to the base station device 20₂ which is a new wireless handover destination candidate for the handover of the target mobile body device 50₁ (step S205).

The base station device 20₂ corresponding to the handover destination candidate determines whether or not the request for the wireless handover is receivable (step S206). In a case of determination that the request is receivable, the base station device 20₂ gives a response that the request is receivable (step S207). The base station device 20₁ corresponding to the handover source and notified that the request is receivable commands the mobile body device 50₁ to execute the wireless handover to the base station device 20₂ (step S208). In response to the command, each of the mobile body device 50₁ and the base station device 20₂ executes an initial access procedure (e.g., random access procedure) (steps S209 to S211).

After completion of connection of the mobile body device 50₁, the base station device 20₂ gives a notification requesting formation of a path (route) for data transfer to each of different devices within the information processing system 1 (e.g., management device 10 and gateway device GW) (steps S212 to S215). The wireless handover finishes by the above steps.

In a case where the wireless connection between the mobile body device 50₁ and the base station device 20₂ is not established at the time of completion of the application handover, the wireless handover described above establishes the wireless connection between the mobile body device 50₁ and the base station device 20₂. In this case, not the base station device 20₂ but the base station device 20₁ executes the application process until establishment of the wireless connection is completed. In this case, application information may change during this period as a result of execution of the application process.

Accordingly, the base station device 20₂ corresponding to the application handover destination inquires of the base station device 20₁ corresponding to the application handover source whether a change (difference) of the application information has been produced in a period until the present time after transmission of the application from the base station device $20_1$ (step S120). The base station device $20_1$ determines whether or not a change of the application information has been produced (step S121). In a case of presence of a change, the base station device $20_1$ notifies the base station device $20_2$ of the fact that a change of the application information has been produced together with difference information indicating a difference corresponding to the change (step S122). The application handover also finishes by the above steps.

According to the examples of FIGS. 14A and 14B, the base station device $20_1$ starts the process of the application handover on the basis of a criterion different from a starting criterion of the wireless handover. Accordingly, the base station device $20_1$ is capable of achieving provision of the function of the application process from the optimum processing device for the application process regardless of the wireless connection state with the mobile body device $50_1$.

<5-2. Operation Example of Base Station Device>

Figure 15:
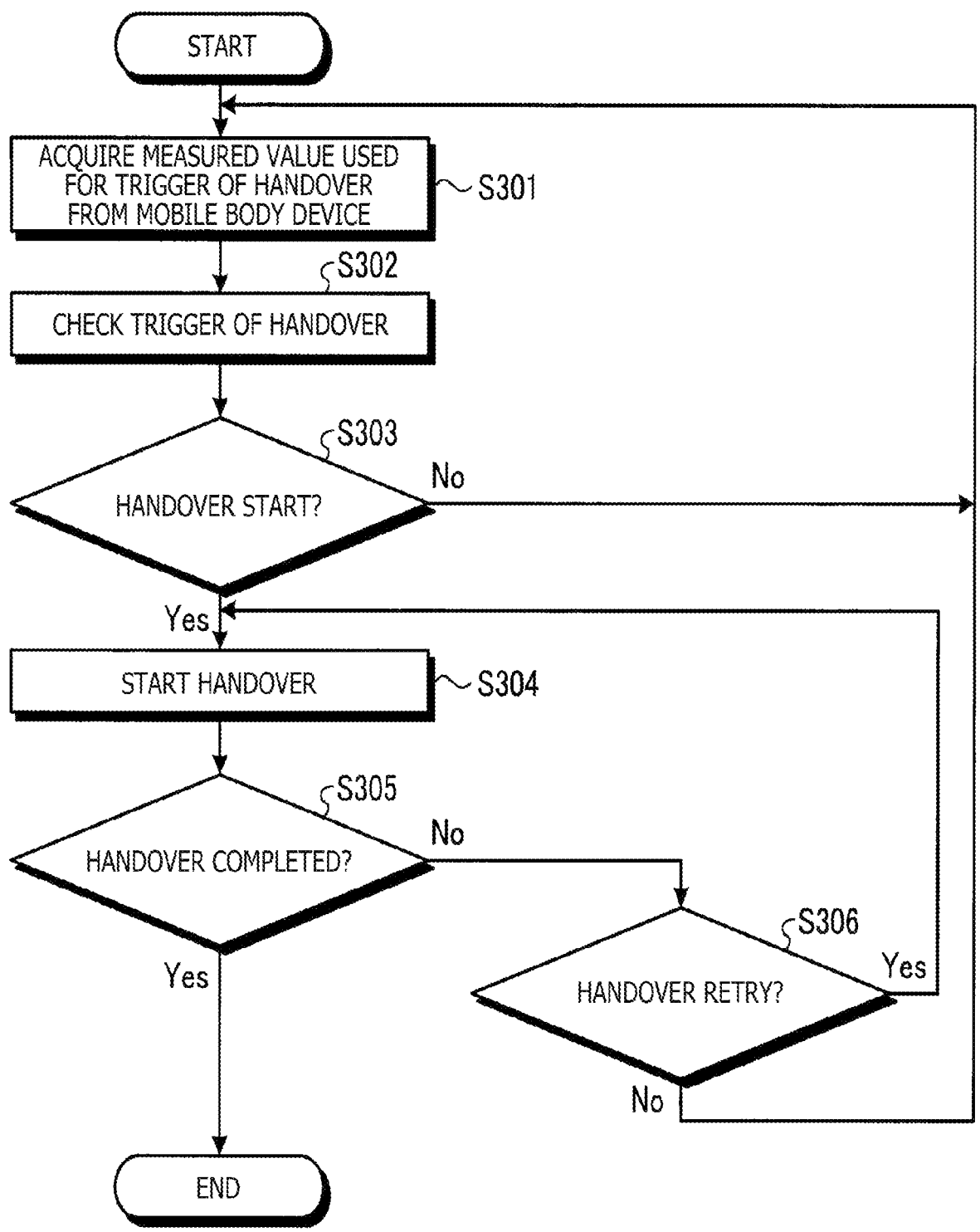
FIG. 15 is a flowchart presenting an operation of the base station device associated with the handovers presented in FIGS. 14A and 14B.

An operation of the base station device 20 will be subsequently described. FIG. 15 is a flowchart presenting an operation of the base station device 20 associated with the handovers presented in FIGS. 14A and 14B. The handover presented in FIG. 15 may be either an application handover or a wireless handover. The handover presented in FIG. 15 may include both an application handover and a wireless handover. For example, the following process is executed by the base station device 20 corresponding to a handover source.

Initially, the acquisition unit 241 of the base station device 20 acquires a measured value used for a trigger (determination) of a handover from the mobile body device 50 wirelessly connected (step S301). Thereafter, the handover processing unit 242 of the base station device 20 checks the trigger of the handover (step S302). In a case where a starting criterion for the handover is not met (step S303: No), the handover processing unit 242 returns the process to step S301 without executing the handover.

In a case where the starting criterion for the handover is met (step S303: Yes), the handover processing unit 242 starts a process of the handover (step S304). Thereafter, the handover processing unit 242 determines whether the handover has been completed (step S305). In a case where the handover has been completed (step S305: Yes), the handover processing unit 242 ends the process.

In a case where the handover has not been completed (step S305: No), the handover processing unit 242 determines whether or not to retry the handover (step S306). In a case of retry (step S306: Yes), the handover processing unit 242 returns the process to step S304. In a case of no retry (step S306: No), the handover processing unit 242 returns the process to step S301.

<5-3. Operation Example of Mobile Body Device>

Figure 16:
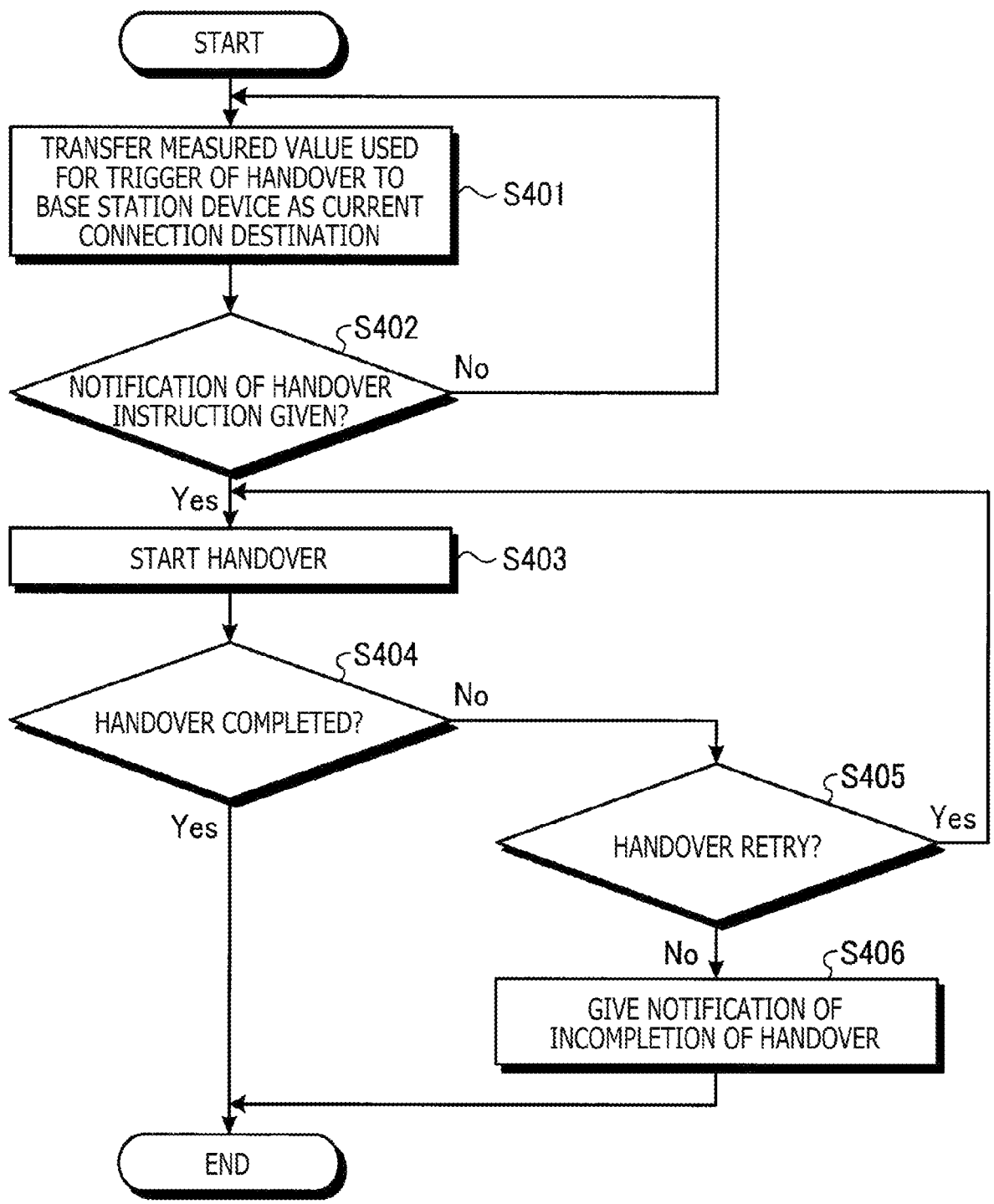
FIG. 16 is a flowchart presenting an operation performed by the mobile body device and associated with the handovers presented in FIGS. 14A and 14B.

An operation of the mobile body device 50 will be subsequently described. FIG. 16 is a flowchart presenting an operation of the mobile body device 50 associated with the handovers presented in FIGS. 14A and 14B. The handover presented in FIG. 16 may be either an application handover or a wireless handover. The handover presented in FIG. 16 may include both an application handover and a wireless handover. For example, the following process is executed by the mobile body device 50.

Initially, the transmission unit 553 of the mobile body device 50 transmits a measured value used for a trigger (determination) of the handover to the base station device 20 wirelessly connected at present (step S401). Thereafter, the acquisition unit 551 of the mobile body device 50 determines whether a notification of a handover instruction has been given from the base station device 20 (step S402). In a case where the notification of the handover instruction is not given (step S402: No), the handover processing unit 552 of the mobile body device 50 returns the process to step S401 without executing the handover.

In a case where the notification of the handover instruction has been given (step S402: Yes), the handover processing unit 552 starts the process of the handover (step S403). Thereafter, the handover processing unit 552 determines whether the handover has been completed (step S404). In a case where the handover has been completed (step S404: Yes), the handover processing unit 552 ends the process.

In a case where the handover has not been completed (step S404: No), the handover processing unit 552 determines whether or not to retry the handover (step S405). In a case of retry (step S405: Yes), the handover processing unit 552 returns the process to step S403. In a case of no retry (step S405: No), the transmission unit 553 of the mobile body device 50 notifies the base station device 20 of the fact that the handover has not been completed (step S406), and ends the process.

<5-4. Handover Destination Selection Process>

Figure 17:
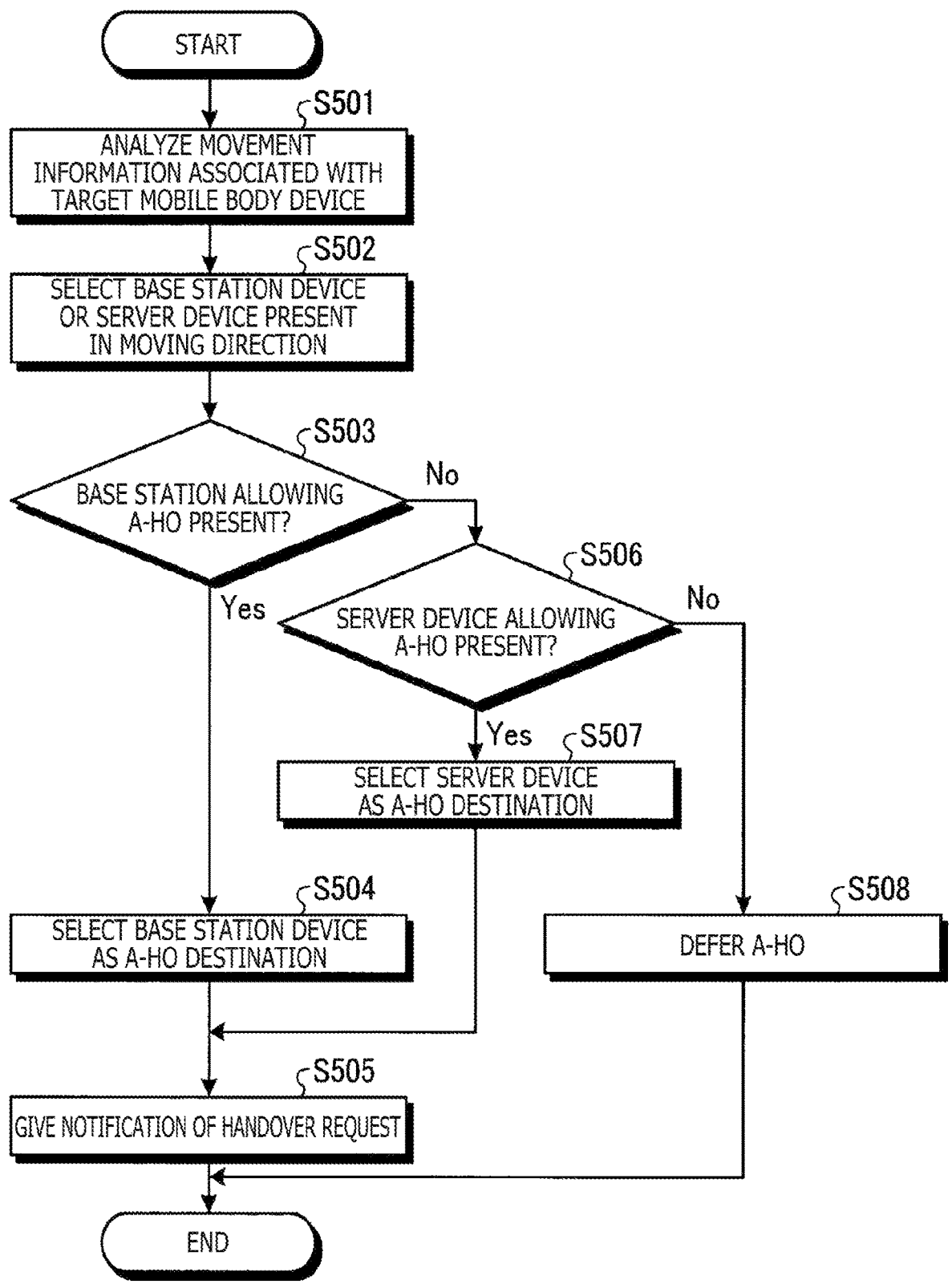
FIG. 17 is a flowchart presenting a selection example of the base station device corresponding to a handover destination.

As presented in step S104 in FIG. 14A by way of example, it is preferable that the base station device corresponding to the handover source of the application handover selects the base station device corresponding to the handover destination. FIG. 17 is a flowchart presenting a selection example of the base station device corresponding to the handover destination. For example, the following process is executed by the base station device 20 corresponding to the handover source.

Initially, the acquisition unit 241 of the base station device 20 acquires, from the mobile body device 50 wirelessly connected at present, information associated with a moving state of the mobile body device 50. For example, the acquisition unit 241 acquires movement information (e.g., moving speed and moving direction) associated with the mobile body device 50, and information indicating a current position of the mobile body device 50.

After acquiring information indicating the moving state, the handover processing unit 242 of the base station device 20 analyzes the moving state of the mobile body device 50 on the basis of the acquired information (step S501). At this time, the handover processing unit 242 may identify, as the moving state of the mobile body device 50, a moving destination assumed on the basis of information indicating at least one of the current position, the moving speed, and the moving direction of the mobile body device 50. The information indicating the moving destination may be information such as latitude and longitude, or identification information indicating cells formed by the base station device.

The handover processing unit 242 selects the base station devices existing at the assumed moving destination as handover destination candidates of the application handover (step S502). In this case, there may be a case where the base station device 20 having the edge function is not included in the selected base station devices 20. Accordingly, the handover processing unit 242 may select server devices such as the local server devices 40 as handover destination candidates of the application handover. In this case, it is assumed that information associated with the base station devices 20 and 30 has been shared beforehand as described above.

The handover processing unit 242 determines whether or not the base station devices allowing the application handover (e.g., the base station device 20 having the edge function) are included in the selected base station devices (step S503). When the base station devices allowing the application handover are included (step S503: Yes), the base station device 20 corresponding to the handover destination is selected from these base station devices (step S504). In a case where a plurality of candidates is present, the base station device 20 corresponding to the handover destination may be selected on the basis of a predetermined condition. For example, following (B1) to (B3) are assumed as the predetermined condition.

(B1) A condition in accordance with a communication delay or a distance
(B2) A condition in accordance with wireless signal quality
(B3) A condition in accordance with device performance For example, the condition in accordance with the communication delay and the distance in (B1) is met by the base station device 20 located at a shortest physical distance from the target mobile body device 50, the base station device 20 producing the smallest number of hops on a route, or the base station device 20 producing the shortest communication delay.

For example, the condition in accordance with the wireless signal quality in (B2) is met by the base station device 20 capable of providing the highest wireless signal quality, the base station device 20 producing the highest throughput, the base station device 20 producing the smallest number of packet losses, or the base station device 20 having the lowest packet loss rate.

For example, the condition in accordance with the device performance in (B3) is met by the base station device 20 having the highest calculation processing ability, the base station device 20 having the largest number of operable CPUs, GPUs, threads, or the like, the base station device 20 having the largest number of applications allowed to be handled, or the base station device 20 supporting a predetermined application.

Thereafter, the handover processing unit 242 issues a request for the application handover to the base station device 20 selected in step S504 (step S505).

On the other hand, in a case where the base station device 20 allowing the application handover is not included in the base station devices selected in step S502 (step S503: No), the handover processing unit 242 determines whether or not the local server device 40 allowing the application handover is included in the selected server devices (step S506).

When the local server devices 40 allowing the application handover are included (step S506: Yes), the handover processing unit 242 selects the local server device 40 corresponding to the handover destination from these local server devices 40 (step S507). In a case where a plurality of candidates is present, the handover processing unit 242 may select the base station device 20 corresponding to the handover destination on the basis of a predetermined condition. For example, (B1) and (B3) described above are assumed as the predetermined condition.

Thereafter, the handover processing unit 242 issues a request for the application handover to the local server device 40 selected in step S506 (step S505). In this case, the handover destination of the wireless handover and the handover destination of the application handover are devices different from each other if the wireless handover is simultaneously executed.

On the other hand, in a case where the local server device 40 allowing the application handover is not included in the selected server devices (step S507: No), the handover processing unit 242 defers the application handover (step S508). In this case, the application processing unit 244 of the base station device 20 corresponding to the handover source may maintain the application process.

After the notification of the request for the application handover is given, or the application handover is deferred, the handover processing unit 242 ends the process.

<5-5. Application Configuration Change Process>

For example, an application configuration (reconfiguration) process executed by the mobile body device 50 (e.g., step S113 in FIG. 14A) is adjustment of a buffer size of an application executed by the mobile body device 50. There is a possibility that a change is produced in a delay time of communication between devices as a result of a connection destination change produced by a handover. According to the present embodiment, the buffer size is adjusted to absorb an effect of the change and avoid problems caused in the mobile body device 50 and end user experiences.

(Process on Base Station Device Side)

An example of the application configuration (reconfiguration) process is a process where the base station device 20 issues a command of application configuration (reconfiguration) to the mobile body device 50. It is preferable that the application configuration (e.g., change of the buffer size) is evaluated by the base station device 20 corresponding to the handover destination.

Figure 18:
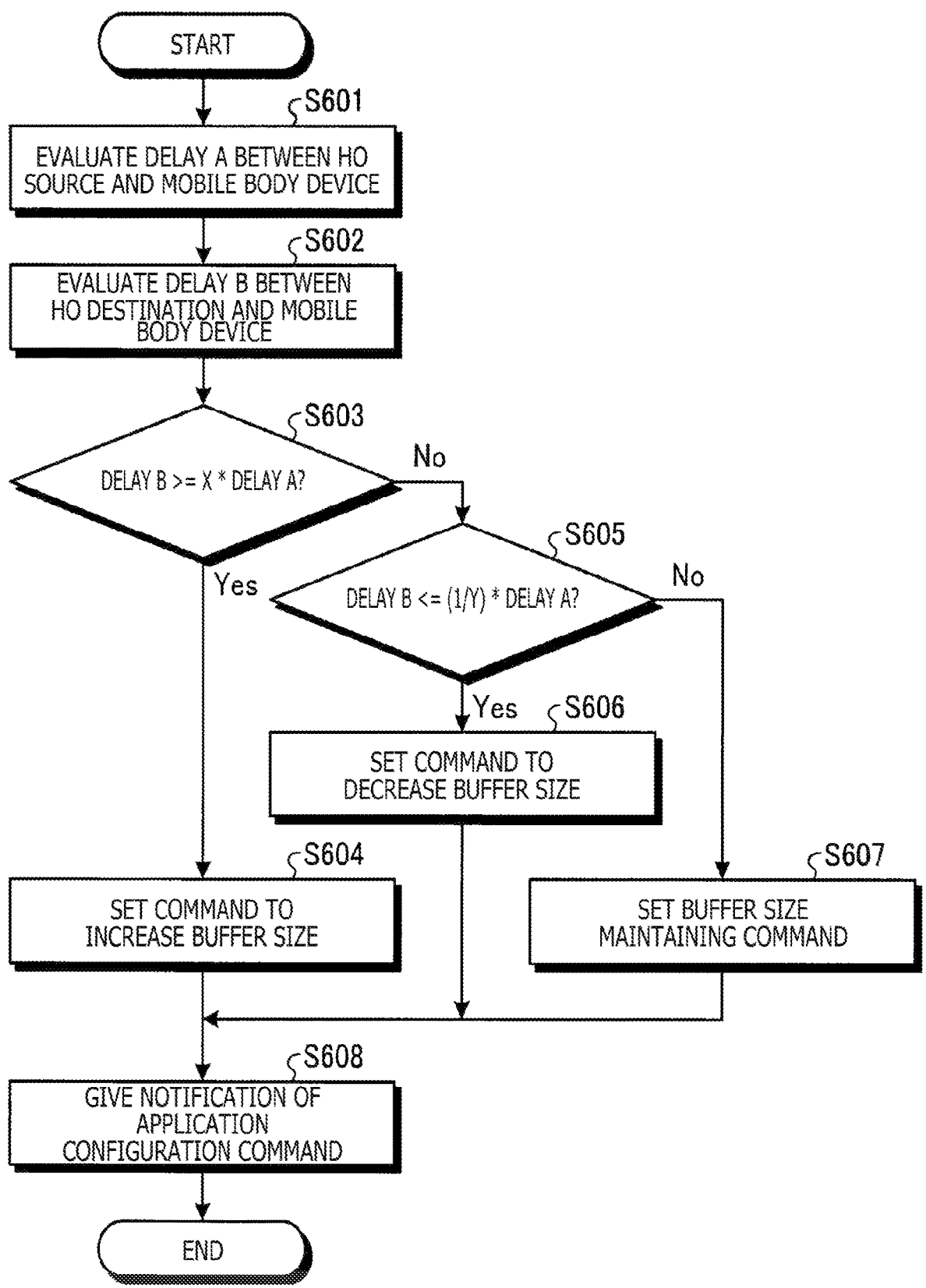
FIG. 18 is a flowchart presenting an example of an application configuration change determination process performed by the mobile body device.

FIG. 18 is a flowchart presenting an example of an application configuration change determination process performed by the mobile body device 50. In addition, it is assumed that the base station device 20 executes the following process in the description presented below. However, the following process may be executed by other devices such as the base station device 30 and the local server device 40. Moreover, the device executing the following process may be a device corresponding to a handover destination, or may be a device corresponding to a handover source.

Initially, the handover processing unit 242 of the base station device 20 evaluates a communication delay (delay A in the figure) between the base station device 20 (or local server device 40) corresponding to the handover source of the target mobile body device 50 and the mobile body device 50 (step S601). Note that examples of the case where the device corresponding to the handover source is the local server device 40 include a case where the base station device 20 corresponding to the handover source does not have the edge function as described below.

Moreover, the handover processing unit 242 evaluates a communication delay (delay B in the figure) between the base station device 20 (or local server device 40) corresponding to the handover destination of the mobile body device 50 and the mobile body device 50 (step S602). Note that examples of the case where the device corresponding to the handover destination is the local server device 40 include a case where the base station device 20 corresponding to a wireless handover destination does not have the edge function as described below.

Thereafter, the handover processing unit 242 determines what buffer size of the target mobile body device is to be selected on the basis of a length comparison between the delay A and the delay B. Concerning the buffer size, it is preferable that the buffer size is made larger at the time of a long delay, and is made smaller at the time of a short delay.

In the example in FIG. 18, the handover processing unit 242 determines whether or not a relationship "delay B>=X*delay A" holds on an assumption that X (X>=1.0) is a coefficient for determination (step S603). In a case where this relationship holds (step S603: Yes), the handover processing unit 242 sets a command for increasing the buffer size of the application (step S604).

In a case where this relationship does not hold (step S603: N), the handover processing unit 242 determines whether or not a relationship "delay B<=(1/Y) delay A" holds on an assumption that Y (Y>=1.0) is another coefficient for determination (step S605). In a case where this relationship holds (step S605: Yes), the handover processing unit 242 sets a command for decreasing the buffer size of the application (step S606). In a case where this relationship does not hold (step S605: No), the handover processing unit 242 sets a command for maintaining the current buffer size of the application (step S607).

In addition, in a case of determination that the buffer size is to be changed, the handover processing unit 242 may also add an amount of this change (an amount of increase or decrease) to the command. The transmission unit 243 of the base station device 20 notifies the mobile body device 50 of the set command (application configuration command) (step S608).

After acquiring an application configuration change completion notification from the mobile body device 50, the application processing unit 244 of the base station device 20 executes the application process of the mobile body device 50 on the premise of the new application configuration.

(Process on Mobile Body Device Side)

Figure 19:
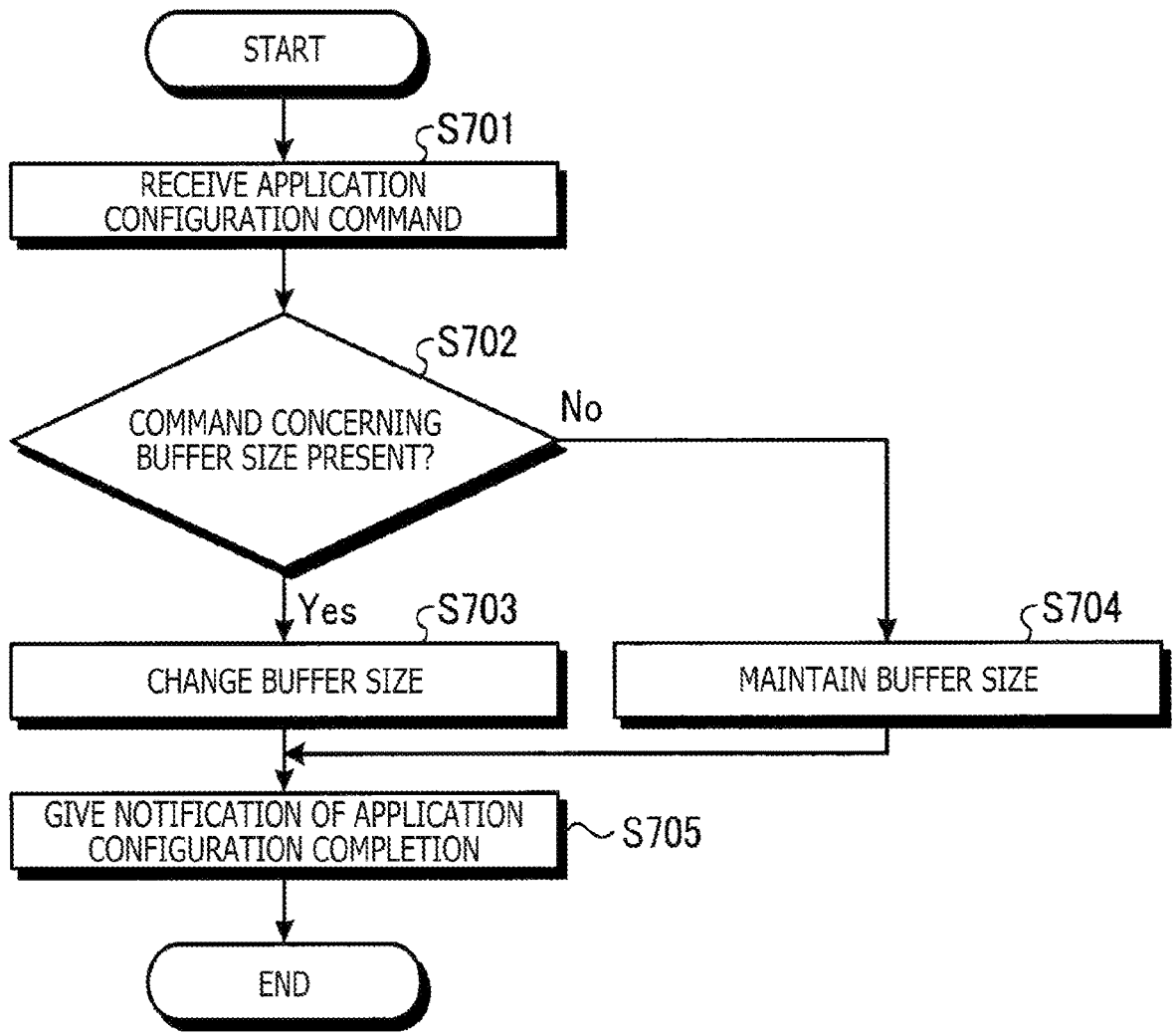
FIG. 19 is a flowchart presenting an example of an application configuration change process.

FIG. 19 is a flowchart presenting an example of an application configuration change process. For example, the following process is executed by the mobile body device 50.

The acquisition unit 551 of the mobile body device 50 receives an application configuration (reconfiguration) command (step S701). Thereafter, the application configuration change unit 555 of the mobile body device 50 determines whether or not a command associated with the buffer size is contained in the application configuration (reconfiguration) command (step S702).

In a case where a command associated with the buffer size is contained (step S702: Yes), the application configuration change unit 555 changes a configuration of a parameter (the buffer size of the application in the example in FIG. 19) in accordance with contents of the command (step S703). In addition, if a change amount of the buffer size is contained in the command in the case of change of the buffer size, this amount is adopted. In a case where the change amount is not specified in the command, it is preferable that the buffer size is increased or decreased by a predetermined amount.

Note that the minimum value of the buffer size is zero, and is not allowed to be set to a value smaller than zero. The maximum value of the buffer size as an upper limit is determined in accordance with performance of the mobile body device 50. Accordingly, the buffer size is not allowed to be set to a value larger than the maximum value as well. In this case, the application configuration change unit 555 may set the buffer size using an upper limit or a lower limit determined beforehand for each of the mobile body devices 50.

On the other hand, in a case where a command associated with the buffer size is not contained (step S702: No), the application configuration change unit 555 maintains the parameter (the buffer size of the application in the example in FIG. 19) (step S704).

After completion of the change or maintenance of the current state, the transmission unit 553 of the mobile body device 50 returns a notification of completion of the application configuration (reconfiguration) (step S705). After completion of the notification, the mobile body device 50 ends the application configuration change process.

The application processing unit 554 of the mobile body device 50 continues the application process with the application configuration changed or maintained.

Note that the mobile body device 50 itself may determine the application configuration (reconfiguration) during the handover or after the handover unlike the cases of FIGS. 18 and 19.

Figure 20:
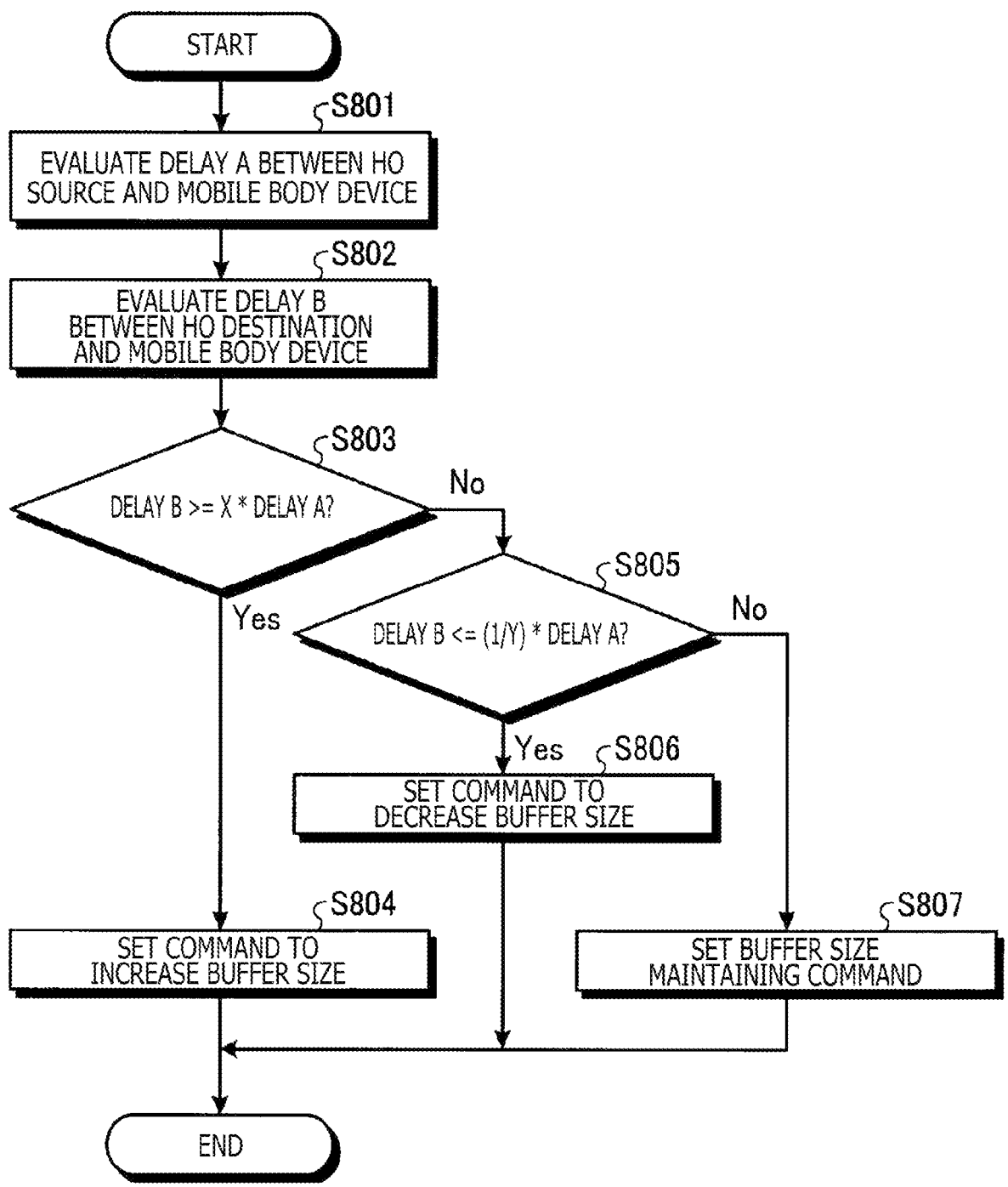
FIG. 20 is a flowchart presenting an example of an application configuration change process in a case where an application configuration (reconfiguration) is determined by the mobile body device itself.

FIG. 20 is a flowchart presenting an example of an application configuration change process in a case where the application configuration (reconfiguration) is determined by the mobile body device 50 itself. In the example in FIG. 20, the mobile body device 50 itself changes the buffer size in accordance with a delay between the mobile body device 50 and the base station device 20 (or local server device 40).

Initially, the application configuration change unit 555 of the mobile body device 50 evaluates a communication delay (delay A in the figure) between the base station device 20 (or local server device 40) corresponding to the handover source and the mobile body device 50 (step S801). Moreover, the application configuration change unit 555 evaluates a communication delay (delay B in the figure) between the base station device 20 (or local server device 40) corresponding to the handover destination and the mobile body device 50 (step S802).

Thereafter, the application configuration change unit 555 determines whether or not a relationship "delay B>=X*delay A" holds on an assumption that X (X>=1.0) is a coefficient for determination (step S803). In a case where this relationship holds (step S803: Yes), the application configuration change unit 555 increases the buffer size of the application (step S804).

In a case where this relationship does not hold (step S803: No), the application configuration change unit 555 determines whether or not a relationship "delay B<=(1/Y) delay A" holds on an assumption that Y (Y>=1.0) is another coefficient for determination (step S805). In a case where this relationship holds (step S805: Yes), the application configuration change unit 555 decreases the buffer size of the application (step S806). In a case where this relationship does not hold (step S805: No), the application configuration change unit 555 maintains the current buffer size of the application (step S807).

The application processing unit 554 of the mobile body device 50 continues the application process with the application configuration changed or maintained.

(Evaluation of Delay)

An evaluation device (e.g., base station device 20, base station device 30, local server device 40, or mobile body device 50) may directly evaluate a delay time of communication between the devices. Moreover, the evaluation device may indirectly evaluate the delay time using an index associated with a delay time instead of direct evaluation of the delay time.

For example, the evaluation device may designate a physical distance between the devices as an index instead of the delay time. For example, the evaluation device may evaluate the delay time on an assumption that the delay time increases as the distance becomes longer. According to the present embodiment, the physical distance can be calculated by the evaluation device or the like which has already acquired position information at the time of management of the base station device 20, the base station device 30, and the local server device 40.

Moreover, the evaluation device may designate the number of hops on the communication paths between the devices as an index. For example, the evaluation device may evaluate the delay time on an assumption that the delay time increases as the number of hops becomes larger. For example, the number of hops can be acquired from a command such as a tracert and a traceroute, or a protocol such as an RIP (Routing Information Protocol).

Moreover, the evaluation device may designate a through-put value of each of the devices as an index. For example, the evaluation device may evaluate the delay time on an assumption that the delay time increases in accordance with a decrease in a throughput. Moreover, the evaluation device may designate a packet loss of each of the devices as an index. For example, the evaluation device may evaluate the delay time on an assumption that the delay time increases in accordance with an increase in a packet loss rate. These indexes can be acquired by direct measurement from a network interface.

(Parameter Example of Application Configuration (Reconfiguration))

Examples of the parameter associated with the application configuration (reconfiguration) other than the buffer size includes an application change produced between the base station device 20 (or local server device 40) corresponding to the handover source and the base station device 20 (or local server device 40) corresponding to the handover destination.

For example, in a case where the handover destination handles a new application not handled before, it is considered that the mobile body device 50 starts this application. Moreover, in a case where the handover destination does not handle an application previously handled, it is considered that the mobile body device 50 stops (or temporarily stops) this application. The start of the new application and the stop of the application are included in the change of the application configuration.

For the application configuration (reconfiguration) other than the buffer size as described above, a case of a configuration change in accordance with command contents determined by the base station device 20, and a case of determination of a configuration change by the mobile body device 50 are both considered similarly to the cases in FIGS. 18, 19, and 20.

6. HANDOVER PROCESS (CASE (2) WHERE BOTH HAVE EDGE FUNCTION)

Subsequently described will be another example of the handover process performed in the case where the mobile body device 50 moves between base station devices each having the edge function. The handover process described herein is an example of an application handover in accordance with quality of signals acquired by the mobile body device 50 from the base station device. The base station device 20 executes a process of a wireless handover after execution of a part or all of a process of the application handover such that the base station device 20 corresponding to the connection destination can execute an application process immediately after switching of a wireless connection.

<6-1. Handover Procedure>

Figure 21:
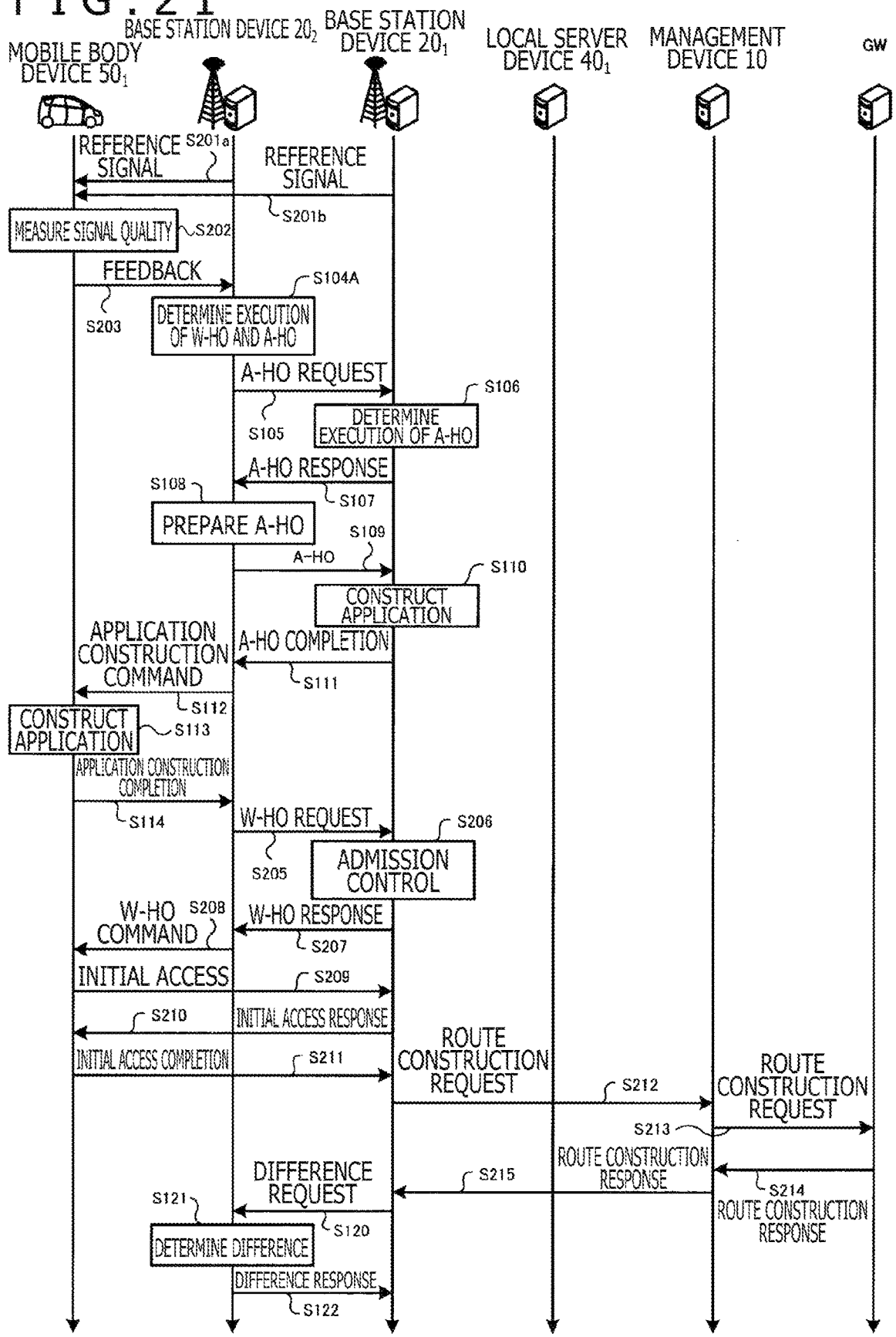
FIG. 21 is a sequence diagram presenting an example of an application handover procedure.

FIG. 21 is a sequence diagram presenting an example of an application handover procedure. FIG. 21 is an example of an application handover in accordance with signal quality of the base station device 20. According to the example of FIG. 21, the base station device 20 starts a process of the application handover on the basis of the same criterion as a starting criterion of a wireless handover. Moreover, according to the example of FIG. 21, the base station device 20 executes the application handover while designating, as the handover destination, the same base station device as the base station device corresponding to the handover destination of the wireless handover.

While the local server device $40_1$ is presented as the local server device 40 in the example of FIG. 21, the local server device 40 is not limited to the local server device $40_1$ similarly to the cases of FIGS. 14A and 14B. Moreover, while the base station devices $20_1$ and $20_2$ are presented as the base station devices 20 in the example of FIG. 21, the base station devices 20 are not limited to the base station devices $20_1$ and $20_2$. Furthermore, while the mobile body device $50_1$ is presented as the mobile body device 50 in the example of FIG. 21, the mobile body device 50 is not limited to the mobile body device $50_1$.

It is assumed in the following description that the mobile body device $50_1$ is currently connected to the base station device $20_1$, and will be subsequently connected to the base station device $20_2$. In the example of FIG. 21, it is assumed that each of the base station device $20_1$ and the base station device $20_2$ has an edge function similarly to the cases of FIGS. 14A and 14B. It is assumed that the base station device $20_1$ to which the mobile body device $50_1$ is currently connected acquires a measured result of wireless signal quality of the mobile body device $50_1$, and triggers execution of the application handover on the basis of the measured result. It is preferable that the application handover is individually determined and executed for each of the mobile body devices 50.

Generally, wireless signal quality is used as a determining criterion or a trigger for a handover of a wireless link. According to the present embodiment, this wireless signal quality is used not only for a handover of a wireless link, but also for a trigger (determination) of an application handover. In other words, a wireless handover and an application handover are linked to the same trigger in the present embodiment.

The wireless signal quality is not completely proportional to, but is often relevant to a positional relationship between a mobile body device and a base station device. Accordingly, it is considered that the wireless signal quality is suited for not only a trigger (determination) for a wireless handover, but also a trigger (determination) for an application handover. By using a common determining material for a wireless handover and an application handover, reduction and optimization of the measurement items, and an application handover in a stable state of a wireless link (or stabilization-expected state) are achievable.

Initially, the mobile body device $50_1$ receives a reference signal for wireless signal quality measurement from each of the base station devices 20 (steps S201a to S201b). Thereafter, the mobile body device $50_1$ measures wireless signal quality of each of the plurality of base station devices 20 (step S202). The mobile body device $50_1$ notifies (give feedback to) the currently connected base station device $20_1$ of a measured result (step S203).

The base station device $20_1$ determines whether or not a wireless handover and an application handover are necessary on the basis of the measured result given as notification (step S104A). "A-HO" in the figure represents an application handover. Moreover, "W—HO" in the figure represents a wireless handover. When it is determined that the handover (wireless handover and/or application handover) is necessary, the base station device $20_1$ issues a notification of a request for an application handover of the target mobile body device $50_1$ to the base station device $20_2$ corresponding to a new application handover destination candidate for the handover of the mobile body device $50_1$ (step S105).

The base station device $20_2$ corresponding to the handover destination candidate determines whether or not the request for the application handover is receivable (step S106). In a case of determination that the request is receivable, the base station device $20_2$ gives a response that the request is receivable (step S107). The base station device $20_1$ corresponding to the handover source and notified that the request is receivable executes a process for allowing the base station device $20_2$ corresponding to the handover destination to obtain current copy information indicating application information. Specifically, the base station device $20_1$ prepares an application handover associated with the mobile body device $50_1$ (step S108), and executes the application handover to the base station device $20_2$ (step S109).

The base station device $20_2$ having received application information from the base station device $20_1$ corresponding to the handover source constructs (or reconstructs) an application of the target mobile body device $50_1$ (step S110). After completion of construction (reconstruction) of the application, the base station device $20_2$ notifies the base station device $20_1$ corresponding to the handover source of the fact that the construction (reconstruction) has been completed (step S111).

The base station device $20_1$ corresponding to the handover source notifies the target mobile body device $50_1$ of the fact that preparation of the application handover has been completed (step S112). Thereafter, the mobile body device $50_1$ executes construction (reconstruction) of a necessary application (step S113). After completion of construction (reconstruction) of the application, the mobile body device $50_1$ notifies the base station device $20_1$ corresponding to the handover source of the fact that the application of construction (reconstruction) has been completed (step S114).

In a case where a wireless connection between the mobile body device $50_1$ and the base station device $20_2$ has been already established, the application handover finishes by the above steps. Examples of the case where the wireless connection between the mobile body device $50_1$ and the base station device $20_2$ has been established includes a case where the mobile body device $50_1$ is connected to not only the base station device $20_1$ but also the base station device $20_2$ in a state where the wireless communication unit 21 of the mobile body device $50_1$ is configured to be connectable to a plurality of base station devices.

In a case where a wireless connection between the mobile body device $50_1$ and the base station device $20_2$ is not established, a wireless handover process subsequently starts. Each of the mobile body device $50_1$, the base station device $20_1$, and the base station device $20_2$ executes a wireless handover (steps S205 to S215). Processing from step S205 to step S215 is similar to the processing from step S205 to step S215 presented in FIG. 14B. The wireless handover finishes by giving a route construction response (step S215).

During the wireless handover, not the base station device $20_2$ but the base station device $20_1$ executes the application process. In this case, application information may change during this period. Accordingly, the base station device $20_2$ corresponding to the application handover destination inquires of the base station device $20_1$ corresponding to the application handover source whether a change (difference) of the application information has been produced in a period until the present time after transmission of the application information from the base station device $20_1$ (step S120).

The base station device $20_1$ determines whether or not a change of the application information has been produced (step S121). In a case where a change has been produced, the base station device $20_1$ executes a process for allowing the base station device $20_2$ to obtain difference information between the copy information transmitted in step S109 and the current application information. Specifically, the base station device $20_1$ transmits the difference information to the base station device $20_2$, and notifies the base station device $20_2$ of the fact that a change of the application information has been produced (step S122). The application handover finishes by the above steps.

According to the example of FIG. 21, the base station device $20_1$ executes the process of the wireless handover after transmitting the current copy information indicating the application information to the base station device $20_2$. Thereafter, in a case where additional application information is added by the application process performed after transmission of the copy information, the added application information is transmitted to the base station device $20_2$. Accordingly, in a case where no application process is added at least after transmission of the copy information, the base station device $20_1$ achieves provision of the application process for the mobile body device $50_1$ from the base station device $20_2$ without producing a long delay during the wireless handover.

Moreover, the information transmitted from the base station device $20_1$ to the base station device $20_2$ is copy information. In this case, original information remains in the base station device $20_1$. Accordingly, at the time of a failure of a handover such as a wireless handover, the base station device $20_1$ is capable of continuing the application process on the basis of the original information. As a result, the base station device $20_1$ is capable of providing the application process for the mobile body device $50_1$ without producing a long delay even at the time of a handover failure.

Furthermore, in a case where no application information is added, the base station device $20_1$ transmits difference information between the copy information and the current application information to the base station device $20_2$. Because the transmitted information is difference information, the base station device $20_1$ is capable of reducing a delay even in a state where application information has been added.

Moreover, the base station device $20_1$ executes the application handover while designating, as the handover destination, the same base station device 20 as the base station device 20 corresponding to the handover destination of the wireless handover. Accordingly, the base station device $20_1$ achieves provision of the function of the application process from the device located closest to the mobile body device $50_1$ (wirelessly connected base station device 20). As a result, a short-delay process is achievable.

<6-2. Operation Example of Base Station Device>

Figure 22:
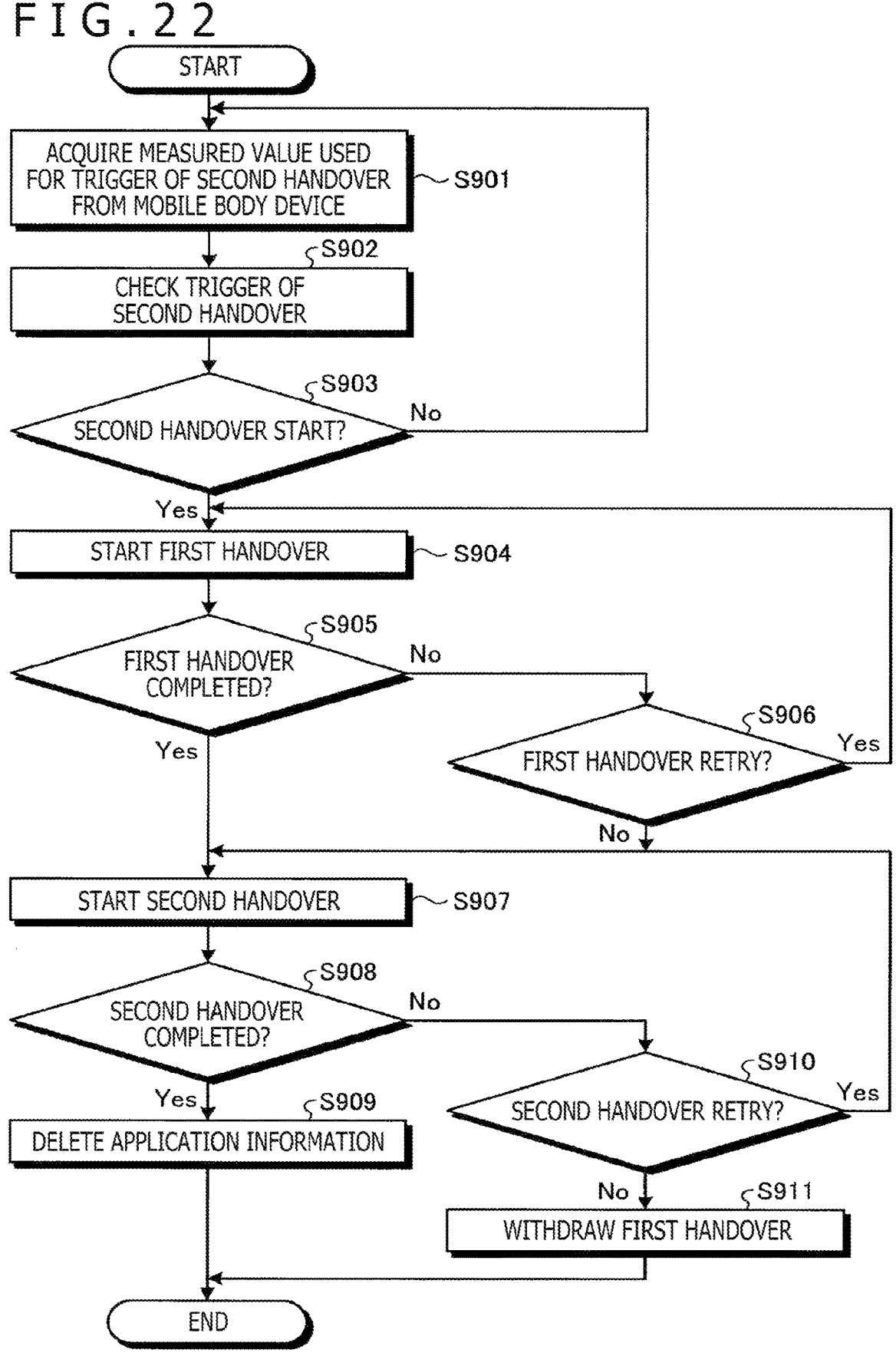
FIG. 22 is a flowchart presenting an operation performed by the base station device and associated with the handover presented in FIG. 21.

An operation of the base station device 20 will be subsequently described. FIG. 22 is a flowchart presenting an operation of the base station device 20 associated with the handover presented in FIG. 21. A first handover presented in FIG. 22 is an application handover, while a second handover is a wireless handover.

In a case where the first handover and the second handover are linked with each other, it is preferable that a measured value used for a trigger of the second handover is adopted as a trigger of the first handover. According to the example of FIG. 22, the base station device 20 executes the first handover first on the basis of a received measured result used for the second handover. Needless to say, the base station device 20 may execute the first handover prior to the second handover on the basis of a received measured result used for the first handover. For example, the following process is executed by the base station device 20 corresponding to the handover source.

Initially, the acquisition unit 241 of the base station device 20 acquires a measured value used for a trigger (determination) of the second handover from the mobile body device 50 wirelessly connected (step S901). Thereafter, the handover processing unit 242 of the base station device 20 checks the trigger of the second handover (step S902). In a case where a starting criterion for the second handover is not met (step S903: No), the handover processing unit 242 returns the process to step S901.

On the other hand, in a case where the starting criterion for the second handover is met (step S903: Yes), the handover processing unit 242 initially starts a process not of the second handover but of the first handover (step S904). For example, the handover processing unit 242 executes a process for allowing the device corresponding to the handover destination to receive copy information indicating application information. Thereafter, the handover processing unit 242 determines whether the first handover has been completed (step S905). In a case where the first handover has been completed (step S905: Yes), the handover processing unit 242 shifts the process to the second handover (step S907 and the following steps).

On the other hand, in a case where the first handover has not been completed (step S905: No), the handover processing unit 242 determines whether or not to retry the first handover (step S906). In a case of retry (step S906: Yes), the handover processing unit 242 returns the process to step S904. In a case of no retry (step S906: No), the handover processing unit 242 shifts the process to the second handover while giving up the first handover (step S907 and the following steps).

Subsequently, the handover processing unit 242 starts a process of the second handover (step S907). Thereafter, the handover processing unit 242 determines whether the second handover has been completed (step S908). In a case where the second handover has been completed (step S908: Yes), the handover processing unit 242 deletes application information retained by the handover processing unit 242 (step S909), and ends the process.

In a case where the second handover has not been completed (step S908: No), the handover processing unit 242 of the base station device 20 determines whether or not to retry the handover (step S910). In a case of retry (step S910: Yes), the handover processing unit 242 returns the process to step S907.

In a case of no retry (step S907: No), the handover processing unit 242 withdraws the first handover (step S911). Note that the handover processing unit 242 is not necessarily required to execute the process of withdrawing the first handover in a case of determination that step S906 is No (i.e., in a case where the handover processing unit 242 gives up the first handover).

<6-3. Operation Example of Mobile Body Device>

Figure 23A:
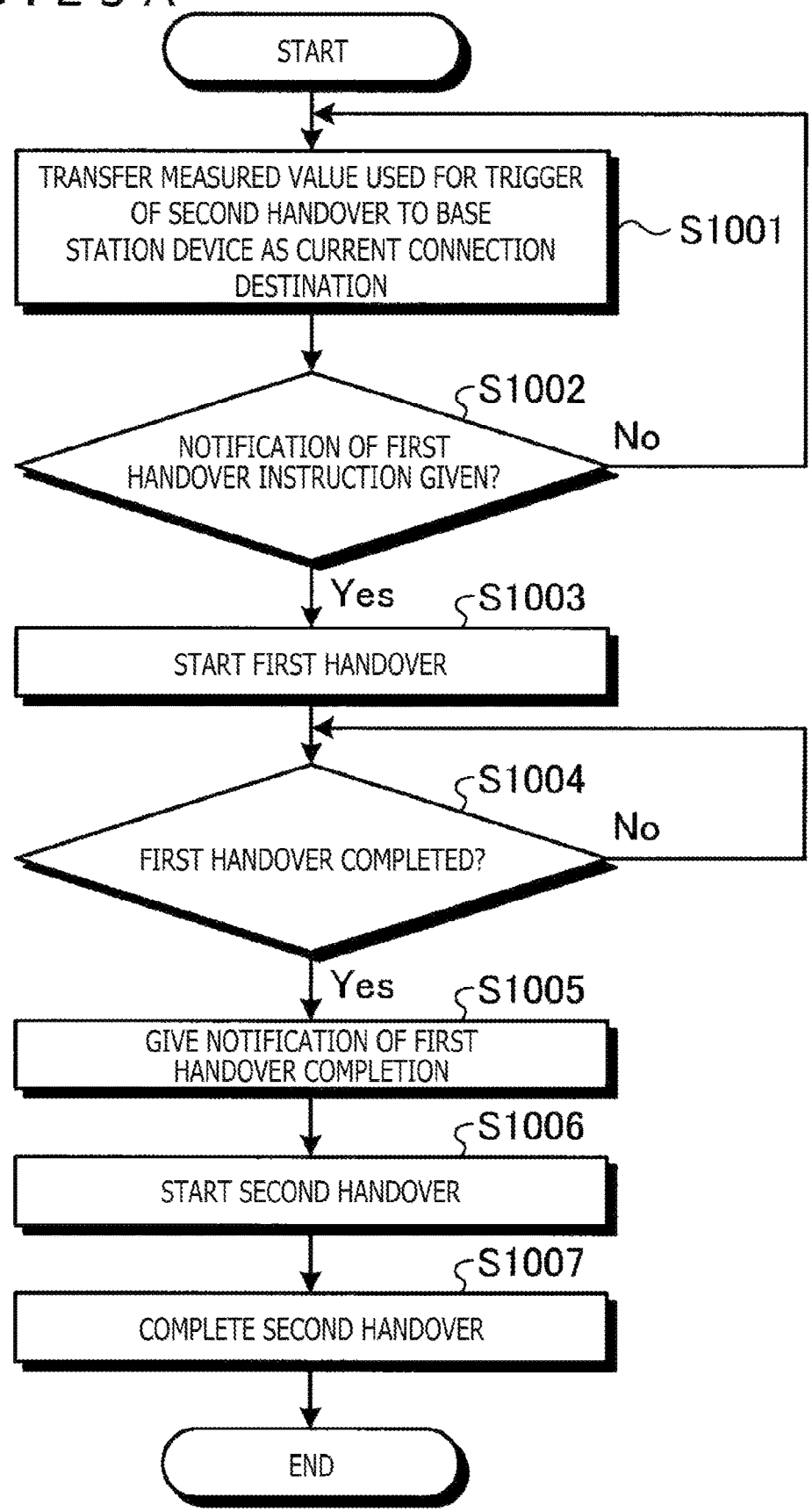
FIG. 23A is a flowchart presenting an operation performed by the mobile body device and associated with the handover presented in FIG. 21.

An operation of the mobile body device 50 will be subsequently described. FIG. 23A is a flowchart presenting an operation of the mobile body device 50 associated with the handover presented in FIG. 21. Similarly to the example of FIG. 22, a first handover presented in FIG. 23A is an application handover, while a second handover is a wireless handover. For example, the following process is executed by the mobile body device 50.

Initially, the transmission unit 553 of the mobile body device 50 transmits a measured value used for a trigger (determination) of the handover to the base station device 20 wirelessly connected at present (step S1001). Thereafter, the acquisition unit 551 of the mobile body device 50 determines whether a notification of a second handover instruction has been given from the base station device 20 (step S1002). In a case where the notification of the first handover instruction has not been given (step S1002: No), the handover processing unit 552 of the mobile body device 50 returns the process to step S1001 without executing the first handover.

In a case where the notification of the first handover instruction has been given (step S1002: Yes), the handover processing unit 552 starts a process of the first handover (step S1003). Thereafter, the handover processing unit 552 determines whether the first handover has been completed (step S1004). In a case where the first handover is not completed (step S1004: No), the handover processing unit 552 repeats step S1004 until completion of the first handover. In a case where the first handover has been completed (step S1004: Yes), the transmission unit 553 of the mobile body device 50 notifies the base station device 20 of the fact that the first handover has been completed (step S1005).

Subsequently, the handover processing unit 552 starts a process of the second handover (step S1006). After completion of the second handover (step S1007), the mobile body device 50 ends the process.

While the second handover (wireless handover) has been completed without a failure of this handover in the example of FIG. 23A, there is still a possibility of a failure or a withdrawal of the second handover. In this case, it is assumed that the first handover (application handover) is also withdrawn. In a case where the application configuration has been changed on the mobile body device 50 side in association with the first handover in this condition, the mobile body device 50 is required to return the application configuration to the configuration prior to the application configuration change.

Figure 23B:
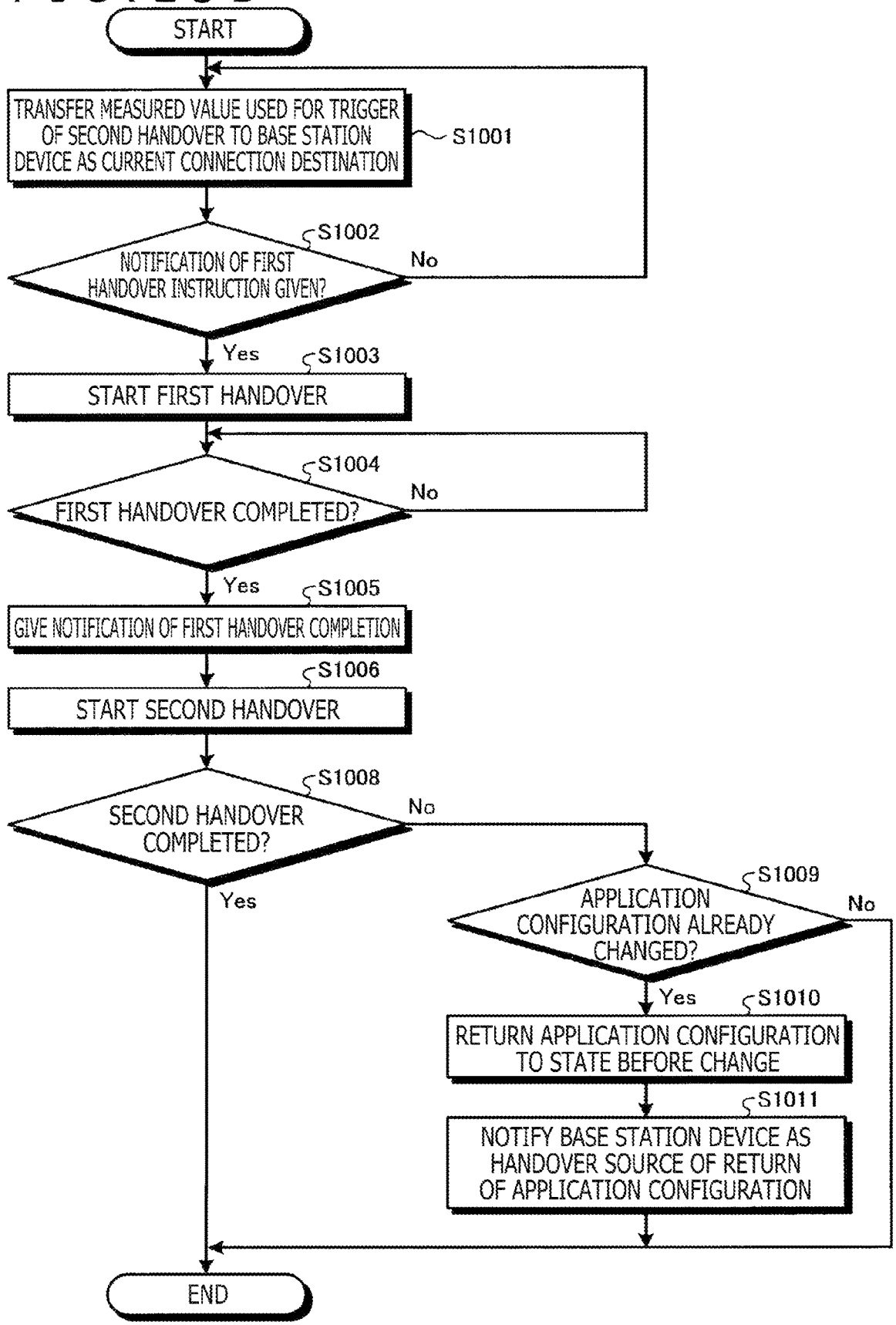
FIG. 23B is a flowchart presenting another example of the operation performed by the mobile body device and associated with the handover presented in FIG. 21.

Described hereinafter will be an operation of the mobile body device 50 performed in cases including a failure or a withdrawal of the second handover and a withdrawal of the first handover. FIG. 23B is a flowchart presenting another example of the operation of the mobile body device 50 associated with the handover presented in FIG. 21. Similarly to the example of FIG. 22, a first handover presented in FIG. 23B is an application handover, while a second handover is a wireless handover. For example, the following process is executed by the mobile body device 50.

Initially, the transmission unit 553 of the mobile body device 50 transmits a measured value used for a trigger (determination) of the handover to the base station device 20 wirelessly connected at present (step S1001). Thereafter, the acquisition unit 551 of the mobile body device 50 determines whether a notification of a second handover instruction has been given from the base station device 20 (step S1002). In a case where the notification of the first handover instruction has not been given (step S1002: No), the handover processing unit 552 of the mobile body device 50 returns the process to step S1001 without executing the first handover.

In a case where the notification of the first handover instruction has been given (step S1002: Yes), the handover processing unit 552 starts a process of the first handover (step S1003). Thereafter, the handover processing unit 552 determines whether the first handover has been completed (step S1004). In a case where the first handover has not been completed (step S1004: No), the handover processing unit 552 repeats step S1004 until completion of the first handover.

In a case where the first handover has been completed (step S1004: Yes), the transmission unit 553 of the mobile body device 50 notifies the base station device 20 of the fact that the first handover has been completed (step S1005). In addition, in a case where the first handover has been completed without a failure or a withdrawal, the application configuration change unit 555 of the mobile body device 50 may change the application configuration. In this case, the application configuration change unit 555 may change the application configuration after completion of the first handover and before completion of the second handover (or before a start of the second handover). The application is allowed to be continuously executed with substantially no interruption after completion of the second handover.

Subsequently, the handover processing unit 552 starts a process of the second handover (step S1006). Thereafter, the handover processing unit 552 determines whether or not the process of the second handover has been completed (step S1008). If the process of the second handover is completed without a failure or a withdrawal (step S1008: Yes), the mobile body device 50 ends the process.

On the other hand, in a case where the process of the second handover has not been completed, i.e., in a case of a failure or a withdrawal of the process of the second handover (step 1008: No), the application configuration change unit 555 of the mobile body device 50 determines whether the application configuration has been already changed in association with the first handover in step S1003 (step S1009). In a case where the application configuration has not been changed yet (step S1009: No), the mobile body device 50 ends the process.

In a case where the application configuration has been already changed (step S1009: Yes), the application configuration change unit 555 returns the application configuration to the state prior to the change (step S1010). Thereafter, the application configuration change unit 555 notifies the base station device corresponding to the handover source of the fact that the application configuration has been returned to the original state (step S1011). In this manner, the mobile body device 50 is capable of continuing execution of the application by receiving the application process provided from the base station device corresponding to the handover source. After completion of the notification, the mobile body device 50 ends the process.

Note that the handover executed first is the first handover (application handover) in the description presented above. However, the handover executed first may be the second handover (wireless handover). In this case, the measured value used for the trigger of the first handover may be designated as the trigger of the second handover. Thereafter, the base station device 20 may execute the second handover prior to the first handover on the basis of the measured result received as the trigger used for the first handover. Needless to say, the base station device 20 may execute the second handover prior to the first handover on the basis of a received measured result used for the second handover.

<6-4. Difference Information Transmission Process>

In a case of transmission of copy information indicating application information to an application handover destination at the time of an application handover, there is a possibility that the base station device 20 corresponding to a handover source performs additional processing for the application information in a period from completion of the application handover to a start or completion of a wireless handover. In this case, there is a possibility of a mismatch between application information required by the mobile body device 50 and application information retained by the base station device 20 corresponding to a new handover destination at the time of a connection between the mobile body device 50 and the base station device 20 corresponding to the handover destination.

According to the present embodiment, therefore, the added application information (hereinafter referred to as additional information) is transmitted at the time of the start or completion of the wireless handover between the base station device 20 corresponding to the handover source and the base station device 20 corresponding to the handover destination to avoid the foregoing problem. Following (C1) or (C2) is assumed as the additional information. In a case where the additional information is difference information presented in (C1), an information volume required to be transmitted is expected to decrease.

(C1) Information indicating a difference from application information copied during an application handover (difference information)

Figure 24:
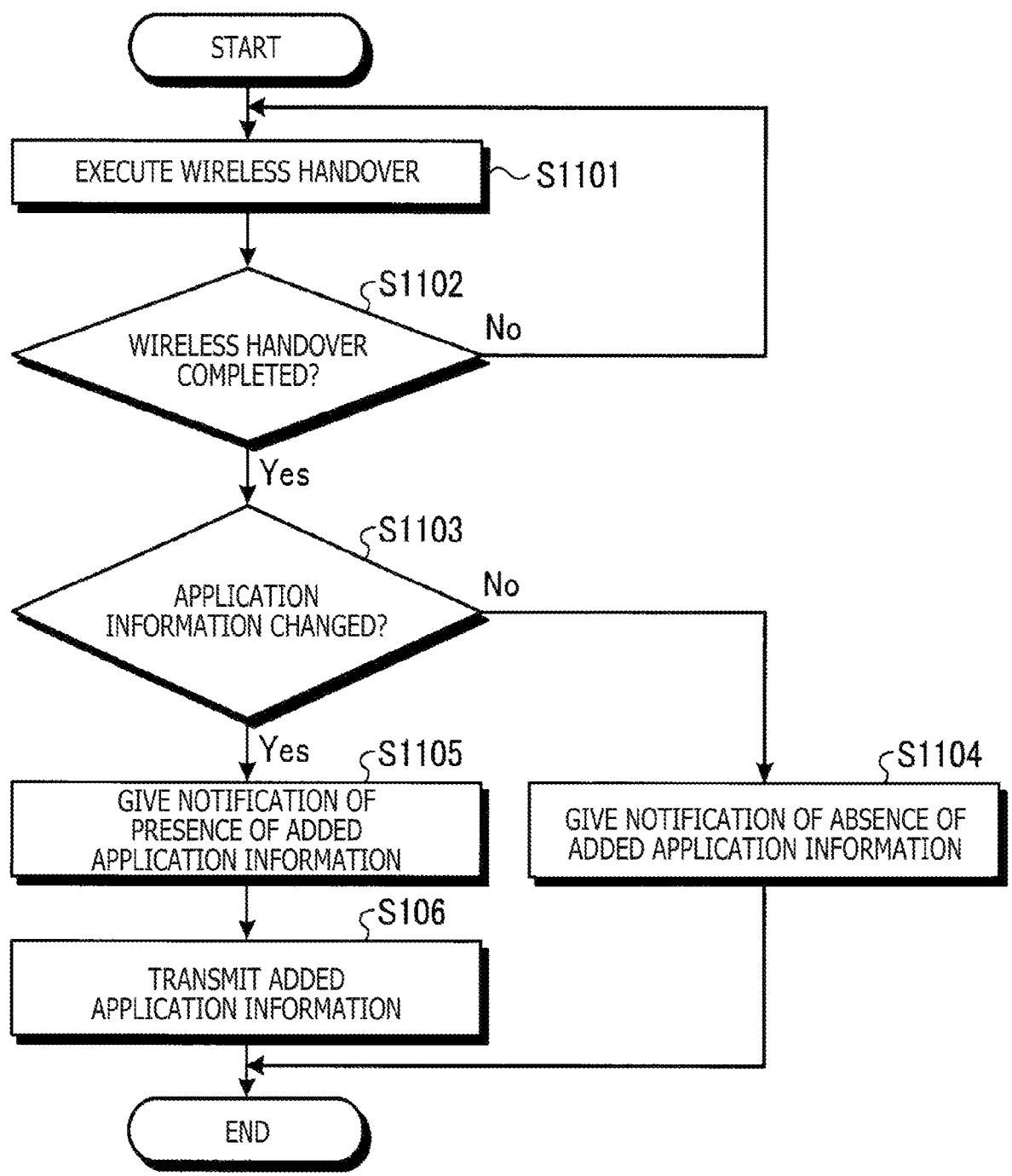
FIG. 24 is a flowchart presenting a transmission process for transmitting additional information.

(C2) Recopy/remove of application information at timing of transmission of additional information FIG. 24 is a flowchart presenting a transmission process of additional information. The process presented in FIG. 24 is executed after execution of an application handover. For example, the process presented in FIG. 24 is executed by the base station device 20 corresponding to a handover source after step S119 in FIG. 14A or after step S114 in FIG. 21.

Note that application information is transmitted from the base station device 20 corresponding to the handover source to the base station corresponding to the handover destination in step S109 in the examples of FIGS. 14A and 21. While the additional information is difference information in the examples of FIGS. 14B and 21 (steps S120 to S122), the additional information may be recopy or remove of information.

Initially, the handover processing unit 342 of the base station device 20 executes a wireless handover (step S1101). For example, step S1101 is processing corresponding to the processing in steps S205 to S215 in the sequence diagram presented in FIG. 21. Thereafter, the handover processing unit 342 determines whether or not the wireless handover has been completed (step S1102). In a case where the wireless handover has not been completed (step S1102: No), the handover processing unit 342 repeats processing in steps S1101 to S1102 until completion of the wireless handover.

On the other hand, in a case where the wireless handover has been completed (step S1102: Yes), the base station device 20 corresponding to the handover source determines whether a change of application information has been produced in a period from transmission of the application information to the base station device 20 corresponding to the handover destination to completion of the wireless handover (step S1103). In a case where no change has been produced (step S1103: No), the transmission unit 243 of the base station device 20 transmits a notification of absence of a change of the application information to the base station device 20 corresponding to the handover destination (step S1104).

On the other hand, in a case of presence of a change of the application information (step S1103: Yes), the transmission unit 243 of the base station device 20 notifies the base station device 20 corresponding to the handover destination of the fact that additional application information (additional information) is present (step S1105). Thereafter, the transmission unit 243 gives a notification of the additional information to the base station device 20 corresponding to the handover destination (step S1106). The additional information may be difference information. After completion of transmission of the additional information, the base station device 20 ends the process.

7. HANDOVER PROCESS (CASE WHERE BASE STATION DEVICE NOT HAVING EDGE FUNCTION IS INCLUDED)

All base station devices in the wireless network are not necessarily constituted by devices having the edge function (application processing function). The present embodiment provides means for avoiding a delay of an application service even in such a case.

Following cases are considered as a case where a base station device not having the edge function is included.
(D1) A case where a base station device corresponding to a wireless handover source does not have the edge function
(D2) A case where a base station device corresponding to a wireless handover destination does not have the edge function
(D3) A case where neither a base station device corresponding to a wireless handover source nor a base station device corresponding to a wireless handover destination has the edge function <7-1. Case where Handover Source does not have Edge Function>

Initially described will be the case (D1) where the base station device corresponding to the wireless handover source does not have the edge function. In a state of the case of (D1), application information associated with the target mobile body device 50 has been already located outside the base station device corresponding to the wireless handover source (e.g., local server device 40).

Figure 25:
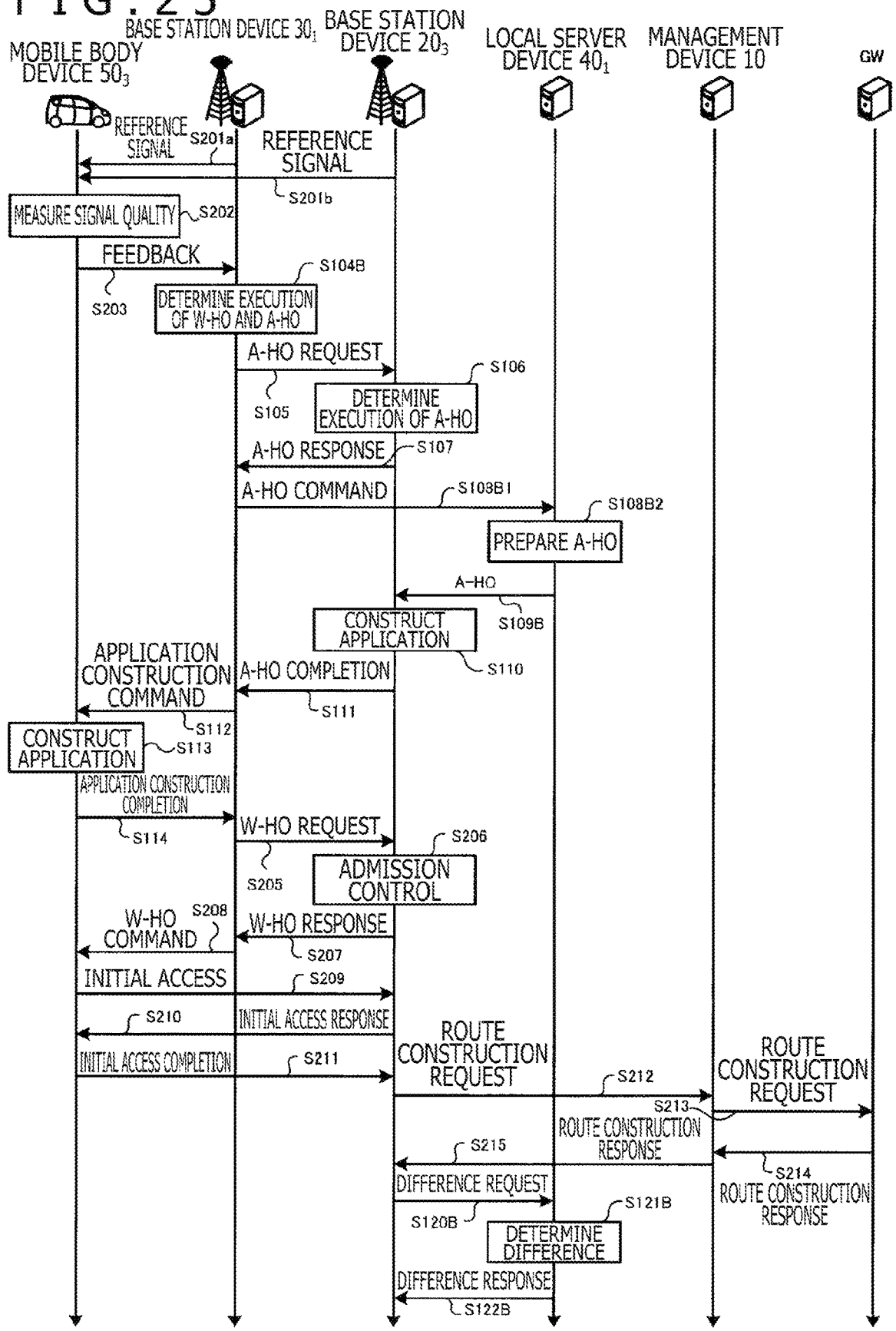
FIG. 25 is a sequence diagram presenting a procedure of a handover in the case where the base station device corresponding to a handover source does not have an edge function.

FIG. 25 is a sequence diagram presenting a procedure of a handover in the case where the base station device corresponding to the wireless handover source does not have the edge function. According to the example of FIG. 25, the base station device 30 corresponding to the wireless handover source starts a process of an application handover on the basis of the same criterion as a starting criterion of the wireless handover. Moreover, moreover, according to the example of FIG. 25, the base station device 30 corresponding to the wireless handover source executes the application handover while designating, as a handover destination, the same processing device as the base station device corresponding to a handover destination of the wireless handover. However, the processing device corresponding to the wireless handover source is different from the processing device corresponding to the application source.

While the local server device $40_1$ is presented as the local server device 40 in the example of FIG. 25, the local server device 40 is not limited to the local server device $40_1$. Moreover, while the base station device $30_1$ is presented as the base station device 30 in the example of FIG. 25, the base station device 30 is not limited to the base station device $30_1$. Furthermore, while a base station device $20_3$ is presented as the base station device 20 in the example of FIG. 25, the base station device 20 is not limited to the base station device $20_3$. In addition, while a mobile body device $50_3$ is presented as the mobile body device 50 in the example of FIG. 25, the mobile body device 50 is not limited to the mobile body device $50_3$.

It is assumed that the mobile body device $50_3$ is currently connected to the base station device $30_1$, and will be subsequently connected to the base station device $20_3$ in the following description. In the example of FIG. 25, the base station device $30_1$ does not have the edge function, while the base station device $20_3$ has the edge function. Moreover, it is assumed that the mobile body device $50_3$ currently receives the edge function provided by the local server device $40_1$. Note that the handover which is executed by the base station device 30 or the like in the example of FIG. 25 as a handover in accordance with signal quality of the base station device may be a handover in accordance with a moving state (e.g., position information and movement information) of the mobile body device 50.

While the base station device corresponding to the wireless handover source is the base station device 30 not having the edge function in the example of FIG. 25, there may also be considered such a modification where the base station device corresponding to the wireless handover source is the base station device 20 having the edge function.

Initially, the mobile body device $50_3$ receives a reference signal for wireless signal quality measurement from each of the base station devices 20 and 30 (steps S201a to S201b). Thereafter, the mobile body device $50_3$ measures wireless signal quality of each of the plurality of base station devices 20 and (step S202). The mobile body device $50_3$ notifies (give feedback to) the currently connected base station device $30_1$ of a measured result (step S203).

The base station device $30_1$ determines whether or not the wireless handover and the application handover are necessary on the basis of the measured result given as notification (step S104B). When it is determined that the handover (wireless handover and/or application handover) is necessary, the base station device $30_1$ issues a notification of a request for the application handover of the mobile body device $50_3$ to the base station device $20_3$ which is a new application handover destination candidate for the handover of the mobile body device $50_3$ (step S105).

The base station device $20_3$ corresponding to the handover destination candidate determines whether or not the request for the application handover is receivable (step S106). In a case of determination that the request is receivable, the base station device $20_3$ gives a response that the request is receivable (step S107).

The base station device $30_1$ corresponding to the handover source and notified that the request is receivable executes a process for allowing the base station device $20_3$ corresponding to the handover destination to obtain current copy information indicating application information. Specifically, the base station device $30_1$ commands the local server device $40_1$ currently providing the edge function for the mobile body device $50_3$ to execute an application handover which designating the base station device $20_3$ as the handover destination (step S108B1). This command is acquired by the acquisition unit 441 of the local server device $40_1$.

The local server device $40_1$ having received the command prepares an application handover associated with the mobile body device $50_3$ (step S108B2). Thereafter, the local server device $40_1$ executes the application handover to the base station device $20_3$ corresponding to the handover destination (step S109B). For example, the process of the application handover is executed by the handover processing unit 442 of the local server device $40_1$. For example, the process of the application handover may be similar to the foregoing process executed by the handover processing unit 242 of the base station device 20 (e.g., processes presented in FIGS. 15 and 22). The description of the handover processing unit 242 presented in FIGS. 15 and 22 is applied to the handover processing unit 442 as appropriate.

The base station device $20_3$ having received application information from the local server device $40_1$ constructs (or reconstructs) the application of the mobile body device $50_3$ (step S110). After completion of construction (reconstruction) of the application, the base station device $20_2$ notifies the base station device $30_1$ of the fact that the construction (reconstruction has been completed (step S111).

The base station device $30_1$ notifies the mobile body device $50_3$ of the fact that preparation of the application handover has been completed (step S112). Thereafter, the mobile body device $50_3$ executes construction (reconstruction) of the application (step S113). After completion of construction (reconstruction) of the application, the mobile body device $50_3$ notifies the base station device $30_1$ of this completion (step S114). In a case where a wireless connection between the mobile body device $50_3$ and the base station device $20_3$ has been already established, the application handover finishes by the above steps.

In a case where the wireless connection between the mobile body device $50_3$ and the base station device $20_3$ is not established, a wireless handover process subsequently starts. Each of the mobile body device $50_3$, the base station device $30_1$, and the base station device $20_3$ executes a wireless handover (steps S205 to S215). Processing from step S205 to step S215 is similar to the processing from step S205 to step S215 presented in FIG. 14B. In this case, the description of the "base station device $20_1$" is replaced with the "base station device $30_1$," while the "base station device $20_2$" is replaced with the "base station device $20_3$." The wireless handover finishes by giving a route construction response (step S215).

During the wireless handover, not the base station device $20_3$ but the application processing unit 444 of the local server device $40_1$ executes the application process. In this case, application information may change during this period. Accordingly, the base station device $20_3$ corresponding to the application handover destination inquires of the local server device $40_1$ corresponding to the application handover source whether a change (difference) of the application information has been produced in a period until the present time after transmission of the application information from the local server device $40_1$ to the base station device $20_3$ (step S120B). This inquiry may be given under control by the base station device $30_1$, or may be given by the base station device $30_1$. Needless to say, the base station device $20_3$ may directly inquire of the local server device $40_1$.

The local server device $40_1$ determines whether or not a change of the application information has been produced (step S121B). In a case of presence of a change, the local server device $40_1$ notifies the base station device $20_3$ of the fact that a change of the application information has been produced together with additional information (e.g., difference information) (step S122B). The additional information (e.g., difference information) may be transmitted under control by the base station device $30_1$, or may be transmitted via the base station device $30_1$. Needless to say, the local server device $40_1$ may directly transmit the additional information to the base station device $20_3$. Note that the additional information transmitted by the local server device $40_1$ may be copy information or move information. The application handover finishes by the above steps.

According to the example of FIG. 25, the base station device $30_1$ executes the process of the wireless handover after causing transmission of the current copy information indicating the application information from the local server device $40_1$. In addition, in a case where additional application information is added by the application process performed after transmission of the copy information, the base station device $30_1$ causes transmission of the added application information from the local server device $40_1$. Accordingly, in a case where no application process is added at least after transmission of the copy information, the base station device $30_1$ is allowed to cause provision of the application process for the mobile body device $50_1$ from the base station device $20_3$ without producing a long delay during the wireless handover.

Moreover, the information transmitted from the local server device $40_1$ to the base station device $20_3$ is copy information. In this case, original information remains in the local server device $40_1$. Accordingly, at the time of a failure of a handover, the local server device $40_1$ is capable of continuing the application process on the basis of the original information. As a result, the base station device $20_1$ is capable of continuing provision of the application process for the mobile body device $50_1$ without producing a long delay even at the time of a failure of a handover.

Furthermore, in a case where no application information is added, the base station device $30_1$ causes transmission of difference information between the copy information and the current application information from the local server device $40_1$. Because the transmitted information is difference information, the base station device $30_1$ is capable of reducing a delay even in a case where additional application information is added.

<7-2. Case where Handover Destination does not have Edge Function>

Described next will be the case where a base station device corresponding to a wireless handover destination in (D2) does not have the edge function. Following two handlings are further considered for (D2).

(D2-1) An application handover is performed for a device (e.g., local server device 40) different from a base station device corresponding to a wireless handover destination.

(D2-1) An application handover is not performed.

Figure 26:
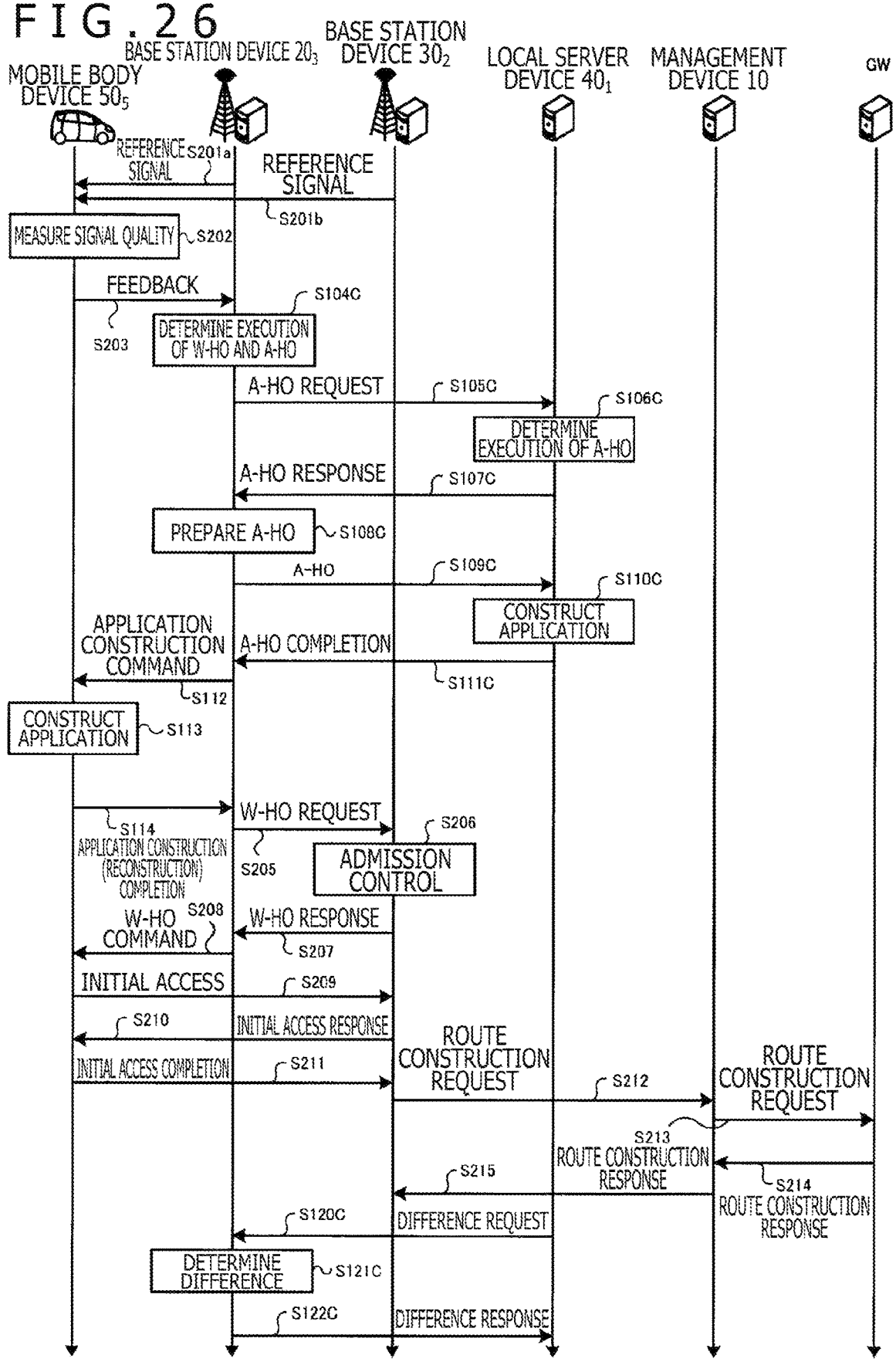
FIG. 26 is a sequence diagram presenting a procedure of a handover in a case where the base station device corresponding to the handover destination does not have the edge function.

The case (D2-1) will be hereinafter described. FIG. 26 is a sequence diagram presenting a handover procedure in a case where a base station device corresponding to a wireless handover destination does not have the edge function. According to the example of FIG. 26, the base station device 20 corresponding to the wireless handover source starts a process of an application handover on the basis of the same criterion as a starting criterion of the wireless handover. Moreover, according to the example of FIG. 26, the base station device 20 corresponding to the wireless handover source executes an application handover while designating, as a handover destination, a processing device different from the base station device corresponding to the handover destination of the wireless handover.

While the local server device $40_1$ is presented as the local server device 40 in the example of FIG. 26, the local server device 40 is not limited to the local server device $40_1$. Moreover, while the base station device $20_3$ is presented as the base station device 20 in the example of FIG. 26, the base station device 20 is not limited to the base station device $20_3$. Furthermore, while the base station device $30_2$ is presented as the base station device 30 in the example of FIG. 26, the base station devices 30 is not limited to the base station device $30_2$. In addition, while a mobile body device $50_5$ is presented as the mobile body device 50 in the example of FIG. 26, the mobile body device 50 is not limited to the mobile body device $50_5$.

While the base station device corresponding to the wireless handover destination is the base station device 30 not having the edge function in the example of FIG. 26, there may also be considered such a modification where the base station device corresponding to the wireless handover destination is the base station device 20 having the edge function.

It is assumed that the mobile body device $50_5$ is currently connected to the base station device $20_3$, and will be subsequently connected to the base station device $30_2$ in the following description. In the example of FIG. 26, the base station device $20_3$ has the edge function, while the base station device $30_2$ does not have the edge function. Moreover, it is assumed that the mobile body device $50_5$ currently receives the edge function provided by the base station device $20_3$. Note that the handover which is executed by the base station device 20 or the like in the example of FIG. 26 as a handover in accordance with signal quality of the base station device may be a handover in accordance with a moving state (e.g., position information and movement information) of the mobile body device 50.

Initially, the mobile body device $50_5$ receives a reference signal for wireless signal quality measurement from each of the base station devices 20 and 30 (steps S201a to S201b). Thereafter, the mobile body device $50_5$ measures wireless signal quality of each of the plurality of base station devices 20 and (step S202). The mobile body device $50_5$ notifies (give feedback to) the currently connected base station device $20_3$ of a measured result (step S203).

The base station device $20_3$ determines whether or not the wireless handover and the application handover are necessary on the basis of the measured result given as notification (step S104C). When it is determined that the handover (wireless handover and/or application handover) is necessary, the base station device $20_3$ issues a notification of a request for an application handover of the mobile body device $50_5$ to the local server device $40_1$ which is a new application handover destination candidate for the handover of the mobile body device $50_5$ (step S105C). For example, this notification is acquired by the acquisition unit 441 of the local server device $40_1$.

The local server device $40_1$ as the handover destination candidate determines whether or not the request for the application handover is receivable (step S106C). Thereafter, in a case of determination that the request is receivable, the local server device $40_1$ gives a response indicating reception of the request (step S107C).

The base station device 203 corresponding to the handover source and notified that the request is receivable executes a process for allowing the local server device 401 corresponding to the application handover destination to obtain current copy information indicating application information. Specifically, the base station device 203 prepares an application handover associated with the mobile body device 505 (step S108C), and executes the application handover to the local server device 401 corresponding to the handover destination (step S109C). For example, the process of this application handover is executed by the handover processing unit 242 of the base station device 203. In this case, the application handover destination of the processes presented in FIGS. 15, 23A, and 23B are not the base station device 20 but the local server device 40.

The local server device $40_1$ having received the application information from the base station device $20_3$ constructs (or reconstructs) the application of the mobile body device $50_5$ (step S110C). After completion of construction (reconstruction) of the application, the local server device $40_1$ notifies the base station device $20_3$ of the fact that the construction (reconstruction) has been completed (step S111C).

The base station device $20_3$ notifies the mobile body device $50_5$ of the fact that preparation of the application handover has been completed (step S112). Thereafter, the mobile body device $50_5$ executes construction (reconstruction) of the application (step S113). After completion of construction (reconstruction) of the application, the mobile body device $50_5$ notifies the base station device $20_3$ of this completion (step S114). In a case where a wireless connection between the mobile body device $50_5$ and the local server device $40_1$ has been already established, the application handover finishes by the above steps.

In a case where a wireless connection between the mobile body device $50_5$ and the local server device $40_1$ is not established, a wireless handover process subsequently starts. Each of the mobile body device $50_5$, the base station device $20_3$, and the base station device $30_2$ executes a wireless handover (steps S205 to S215). Processing from step S205 to step S215 is similar to the processing from step S205 to step S215 presented in FIG. 14B. At this time, the description of the "base station device $20_1$" is replaced with the "base station device $20_3$," while the "base station device $20_2$" is replaced with the "base station device $30_2$." The wireless handover finishes by giving a route construction response (step S215).

During the wireless handover, not the local server device $40_1$ but the base station device $20_3$ executes the application process. In this case, the application information may change during this period. Accordingly, the local server device $40_1$ corresponding to the application handover destination inquires of the base station device $20_3$ corresponding to the application handover source whether a change (difference) of the application information has been produced in a period until the present time after transmission of the application information (step S120C).

The base station device $20_3$ determines whether or not a change of the application information has been produced (step S121C). In a case where a change has been produced, the base station device $20_3$ executes a process for allowing the local server device $40_1$ to obtain difference information between the copy information transmitted in step S109C and the current application information. Specifically, the base station device $20_3$ notifies the local server device $40_1$ of the fact that a change of the application information has been produced together with additional information (e.g., difference information) (step S122B). Note that the additional information transmitted by the base station device $20_3$ may be copy information or move information. The application handover finishes by the above steps.

According to the example of FIG. 26, the base station device $20_3$ executes the process of the wireless handover after transmitting the current copy information indicating the application information to the local server device $40_1$. Thereafter, in a case where additional application information is added by the application process performed after transmission of the copy information, the base station device $20_3$ transmits the added application information to the local server device $40_1$. Accordingly, in a case where no application process is added at least after transmission of the copy information, the base station device $20_3$ is allowed to cause transmission of the application process for the mobile body device $50_1$ from the local server device $40_1$ without producing a long delay during the wireless handover.

Moreover, the information transmitted from the base station device $20_3$ to the local server device $40_1$ is copy information. In this case, original information remains in the base station device $20_3$. Accordingly, at the time of a handover failure, the base station device $20_3$ is capable of continuing the application process on the basis of the original information. As a result, the base station device $20_1$ is capable of continuing provision of the application process for the mobile body device $50_1$ without producing a long delay even at the time of a handover failure.

Furthermore, in a case where no application information is added, the base station device $20_3$ transmits difference information between the copy information and the current application information to the local server device $40_1$. Because the transmitted information is difference information, the base station device $20_3$ is capable of reducing a delay even in a state where application information has been added.

<7-3. Case where Neither has Edge Function>

Described next will be the process of (D3) in a case where neither a base station device corresponding to a wireless handover source nor a base station device corresponding to a wireless handover destination has the edge function. In the case of (D3), an application handover is executed between the devices (e.g., local server devices 40) different from the base station devices. In this manner, the edge function can be provided even in a case where the mobile body device 50 moves between the base station devices 30 each of which does not have the edge function.

Figure 27:
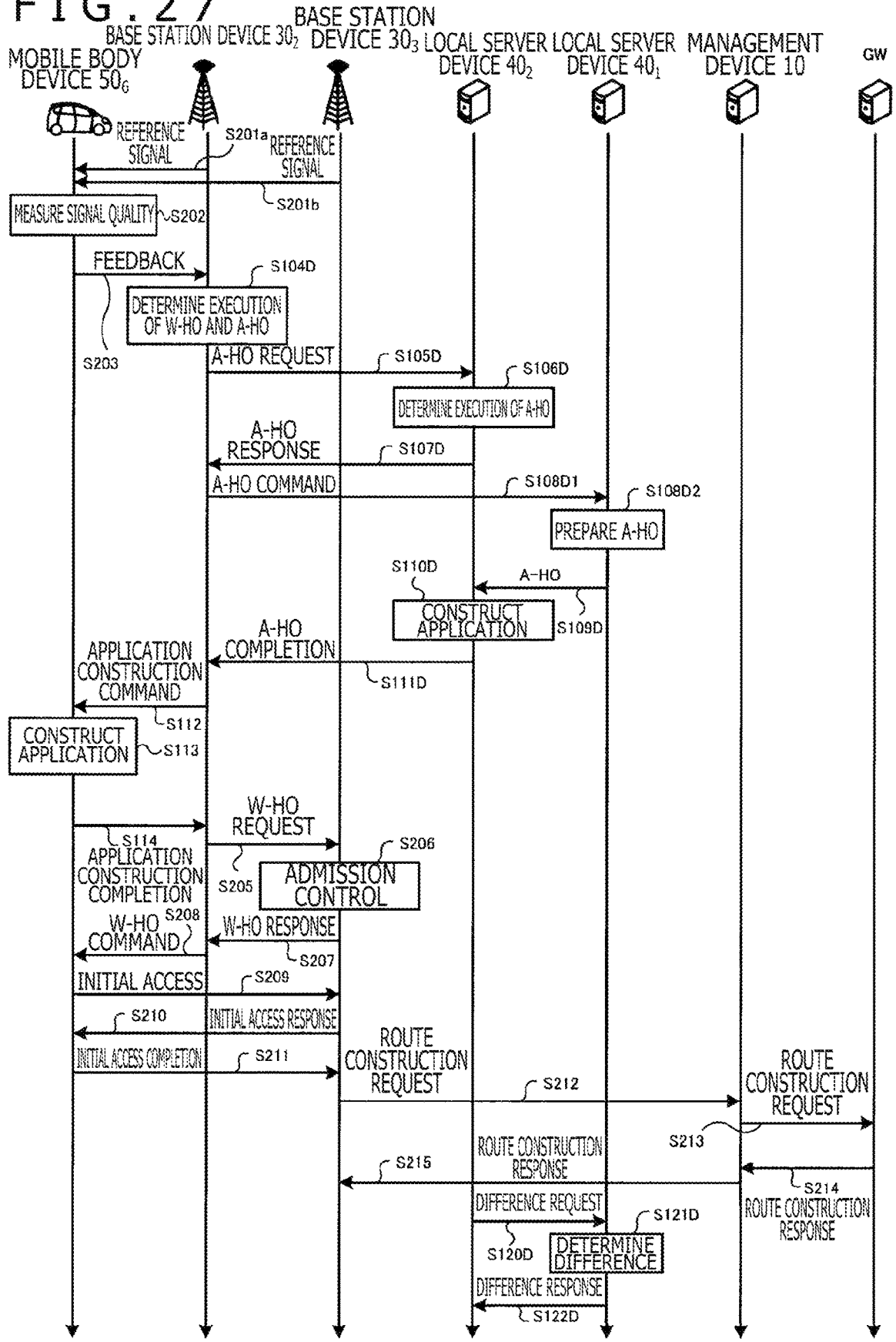
FIG. 27 is a sequence diagram presenting a procedure of a handover in a case where neither a handover source nor a handover destination has the edge function.

FIG. 27 is a sequence diagram presenting a procedure of a handover in a case where neither a handover source nor a handover destination has the edge function. According to the example of FIG. 27, the base station device 30 corresponding to a wireless handover source starts a process of an application handover on the basis of the same criterion as a starting criterion of a wireless handover. Moreover, according to the example of FIG. 27, the base station device 30 corresponding to a wireless handover source executes the application handover while designating, as a handover destination, a processing device different from the base station device corresponding to a handover destination of the wireless handover. The processing device corresponding to the wireless handover source is also different from the processing device corresponding to the application source.

While the local server device $40_1$ is presented as the local server device 40 in the example of FIG. 27, the local server device 40 is not limited to the local server device $40_1$. Moreover, while the base station devices $30_2$ and $30_3$ are presented as the base station devices 30 in the example of FIG. 27, the base station devices 30 are not limited to the base station devices $30_2$ and $30_3$. Furthermore, while a mobile body device $50_6$ is presented as the mobile body device 50 in the example of FIG. 27, the mobile body device 50 is not limited to the mobile body device $50_6$.

It is assumed that the mobile body device $50_6$ is currently connected to the base station device $30_2$, and will be subsequently connected to the base station device $30_3$ in the following description. In the example of FIG. 27, it is assumed that neither the base station device $30_2$ nor $30_3$ has the edge function, while both the local server devices $40_1$ and $40_2$ have the edge function. Moreover, it is assumed that the mobile body device $50_6$ currently receives the edge function provided by the local server device $40_1$. Note that the handover which is executed by the base station device 20 or the like in the example of FIG. 27 as a handover in accordance with signal quality of the base station device may be a handover in accordance with a moving state (e.g., position information and movement information) of the mobile body device 50.

While neither the base station device corresponding to the wireless handover source nor the base station device corresponding to the wireless handover destination is constituted by the base station device 30 not having the edge function in the example of FIG. 27, there may be considered such a modification where one or both of the base station device corresponding to the wireless handover source and the base station device corresponding to the wireless handover destination are constituted by the base station devices 20 having the edge function.

Initially, the mobile body device $50_6$ receives a reference signal for wireless signal quality measurement from each of the base station devices 20 and 30 (steps S201a to S201b). Thereafter, the mobile body device $50_6$ measures wireless signal quality of each of the plurality of base station devices 20 and (step S202). The mobile body device $50_6$ notifies (give feedback to) the currently connected base station device $30_2$ of a measured result (step S203).

The base station device $30_2$ determines whether or not the wireless handover and the application handover are necessary on the basis of the measured result given as notification (step S104D). When it is determined that the handover (wireless handover and/or application handover) is necessary, the base station device $30_2$ issues a notification of a request for an application handover of the mobile body device $50_6$ to the local server device $40_2$ which is a new application handover destination candidate for the handover of the mobile body device $50_6$ (step S105D).

The local server device $40_2$ corresponding to the handover destination candidate determines whether or not the request for the application handover is receivable (step S106D). In a case of determination that the request is receivable, the local server device $40_2$ gives a response that the request is receivable (step S107D).

The base station device $30_2$ corresponding to the handover source and notified that the request is receivable executes a process for allowing the local server device $40_2$ corresponding to the application handover destination to obtain current copy information indicating application information. Specifically, the base station device $30_2$ commands the local server device $40_1$ currently providing the edge function for the mobile body device $50_6$ to execute an application handover which designates the local server device $40_2$ as the handover destination (step S108D1).

The local server device 401 having received the command prepares an application handover associated with the mobile body device 506 (step S108D2), and executes the application handover to the local server device 402 corresponding to the handover destination (step S109D). For example, the process of the application handover is executed by the handover processing unit 442 of the local server device 401. The description of the handover processing unit 242 presented in FIGS. 15 and 22 is applied to the handover processing unit 442 as appropriate. Note that the application handover destination of the processes presented in FIGS. 15, 23A, and 23B in this case is not the base station device 20 but the local server device 402.

The local server device $40_2$ having received application information from the local server device $40_1$ constructs (or reconstructs) the application of the mobile body device $50_6$ (step S110D). After completion of construction (reconstruction) of the application, the local server device $40_2$ notifies the base station device $30_2$ of the fact that the construction (reconstruction) has been completed (step S111D).

The base station device $30_2$ notifies the mobile body device $50_6$ of the fact that preparation of the application handover has been completed (step S112). Thereafter, the mobile body device $50_6$ executes construction (reconstruction) of the application (step S113). After completion of construction (reconstruction) of the application, the mobile body device $50_6$ notifies the base station device $30_2$ of this completion (step S114). In a case where a wireless connection between the mobile body device $50_6$ and the local server device $40_2$ has been already established, the application handover finishes by the above steps.

In a case where the wireless connection between the mobile body device $50_6$ and the local server device $40_2$ is not established, a wireless handover process subsequently starts. Each of the mobile body device $50_6$, the base station device $30_2$, and the base station device $30_3$ executes a wireless handover (steps S205 to S215). Processing from step S205 to step S215 is similar to the processing from step S205 to step S215 presented in FIG. 14B. At this time, the description of the "base station device $20_1$" is replaced with the "base station device $30_2$," while the "base station device $20_2$" is replaced with the "base station device $30_3$." The wireless handover finishes by giving a route construction response (step S215).

During the wireless handover, not the local server device $40_2$ but the local server device $40_1$ executes the application process. In this case, application information may change during this period. Accordingly, the local server device $40_2$ corresponding to the application handover destination inquires of the local server device $40_1$ corresponding to the application handover source whether a change (difference) of the application information has been produced in a period until the present time after transmission of the application information from the local server device $40_1$ (step S120D). This inquiry may be given under control by the base station device $30_2$, or may be given by the base station device $30_2$. Needless to say, the local server device $40_2$ may directly inquire of the local server device $40_1$.

The local server device $40_1$ determines whether or not a change has been produced in the application information (step S121D). In a case of presence of a change, the local server device $40_1$ notifies the local server device $40_2$ of the fact that a change of the application information has been produced together with additional information (e.g., difference information) (step S122D). The additional information (e.g., difference information) may be transmitted under control by the base station device $30_2$, or may be transmitted via the base station device $30_2$. Needless to say, the local server device $40_1$ may directly transmit the additional information to the local server device $40_2$. Note that the additional information transmitted by the local server device $40_1$ may be copy information or move information. The application handover finishes by the above steps.

According to the example of FIG. 27, the base station device $30_2$ executes the process of the wireless handover after causing transmission of the current copy information indicating the application information from the local server device $40_1$. In addition, in a case where additional application information is added by the application process performed after transmission of the copy information, the base station device $30_2$ causes transmission of the added application information from the local server device $40_1$. Accordingly, in a case where no application process is added at least after transmission of the copy information, the base station device $30_2$ is allowed to cause provision of the application process for the mobile body device $50_1$ from the local server device $40_2$ without producing a long delay during the wireless handover.

Moreover, the information transmitted from the local server device $40_1$ to the local server device $40_2$ is copy information. In this case, original information remains in the local server device $40_1$. Accordingly, at the time of a failure of a handover, the local server device $40_1$ is capable of continuing the application process on the basis of the original information. As a result, the base station device $20_1$ is capable of continuing provision of the application process for the mobile body device $50_1$ without producing a long delay even at the time of a failure of a handover.

Furthermore, in a case where no application information is added, the base station device $30_2$ causes transmission of difference information between the copy information and the current application information from the local server device $40_1$. Because the transmitted information is difference information, the base station device $20_1$ is capable of reducing a delay even in a state where application information has been added.

8. MODIFICATIONS

The embodiment described above is presented by way of example, and various modifications and applications may be made.

<8-1. Modification of Handover Process Procedure>

For example, the processing device corresponding to the handover destination candidate is one device in the embodiment described above. However, a plurality of devices may be designated as the device of the handover destination candidate. In this case, the base station device corresponding to the wireless handover source may execute a process for allowing a plurality of processing devices each corresponding to an application handover destination candidate or a wireless handover destination candidate to obtain current copy information indicating application information. In addition, the base station device corresponding to the wireless handover source may execute a process of the wireless handover while designating, as the application handover destination, one processing device determined as the application handover destination or the wireless handover destination included in the plurality of processing devices. Thereafter, the base station device corresponding to the wireless handover source may execute a process for allowing the processing device determined as the application handover destination to obtain difference information between the copy information and the current application information.

In this manner, a part of the process of the application handover (transmission of copy information) can be executed in advance at timing earlier than the timing of determination of the wireless handover destination. Accordingly, the base station device can rapidly complete the handover after the starting criterion for the wireless handover is met. As a result, reduction of a delay is achievable.

Moreover, according to the embodiment described above, the information processing device (or processing device) such as the base station device 20 executes an application handover together with a wireless handover. However, the information processing device (or processing device) is not required to simultaneously execute an application handover together with a wireless handover.

For example, the base station device 20 executes an application handover as well as a wireless handover in a case where signal quality associated with wireless communication of the mobile body device 50 meets a predetermined criterion. On the other hand, the base station device 20 executes only a wireless handover without executing an application handover in a case where signal quality does not meet the predetermined criterion.

In this manner, the base station device 20 can continuously provide an application process without cutting off wireless connection between the base station device and the mobile body device 50 even in a case where an application handover is difficult to execute in addition to a wireless handover, such as a case where wireless connection is almost cut off due to poor wireless signal quality between the base station device 20 and the mobile body device 50.

Alternatively, the base station device 20 executes an application handover as well as a wireless handover in a case where a moving state of the mobile body device 50 specified on the basis of at least one piece of information indicating one of a moving speed and a moving direction of the mobile body device 50 meets a predetermined criterion. On the other hand, the base station device 20 executes only a wireless handover without executing an application handover in a case where the moving state does not meet the predetermined criterion.

In this manner, the base station device 20 can continuously provide an application process without cutting off wireless connection between the base station device and the mobile body device 50 even in a case where an application handover is difficult to execute in addition to a wireless handover, such as a case where wireless connection is almost cut off during high-speed movement of the mobile body device 50.

<8-2. Application Handover for Each Application>

According to the embodiment described above, the application handover destination is the one base station device 20 or the one local server device 40. Specifically, in the embodiment described above, the one mobile body device 50 is in a state connected to the one base station device 20 or the one local server device 40 in view of an application.

However, the one mobile body device 50 may be connected to a plurality of the base station devices 20 or a plurality of the local server devices 40 in view of an application. In this case, the base station device corresponding to a handover source selects the base station device 20 or the local server device 40 to be connected for each application. Thereafter, the base station device corresponding to the handover source may perform an application handover for each application.

Figure 28:
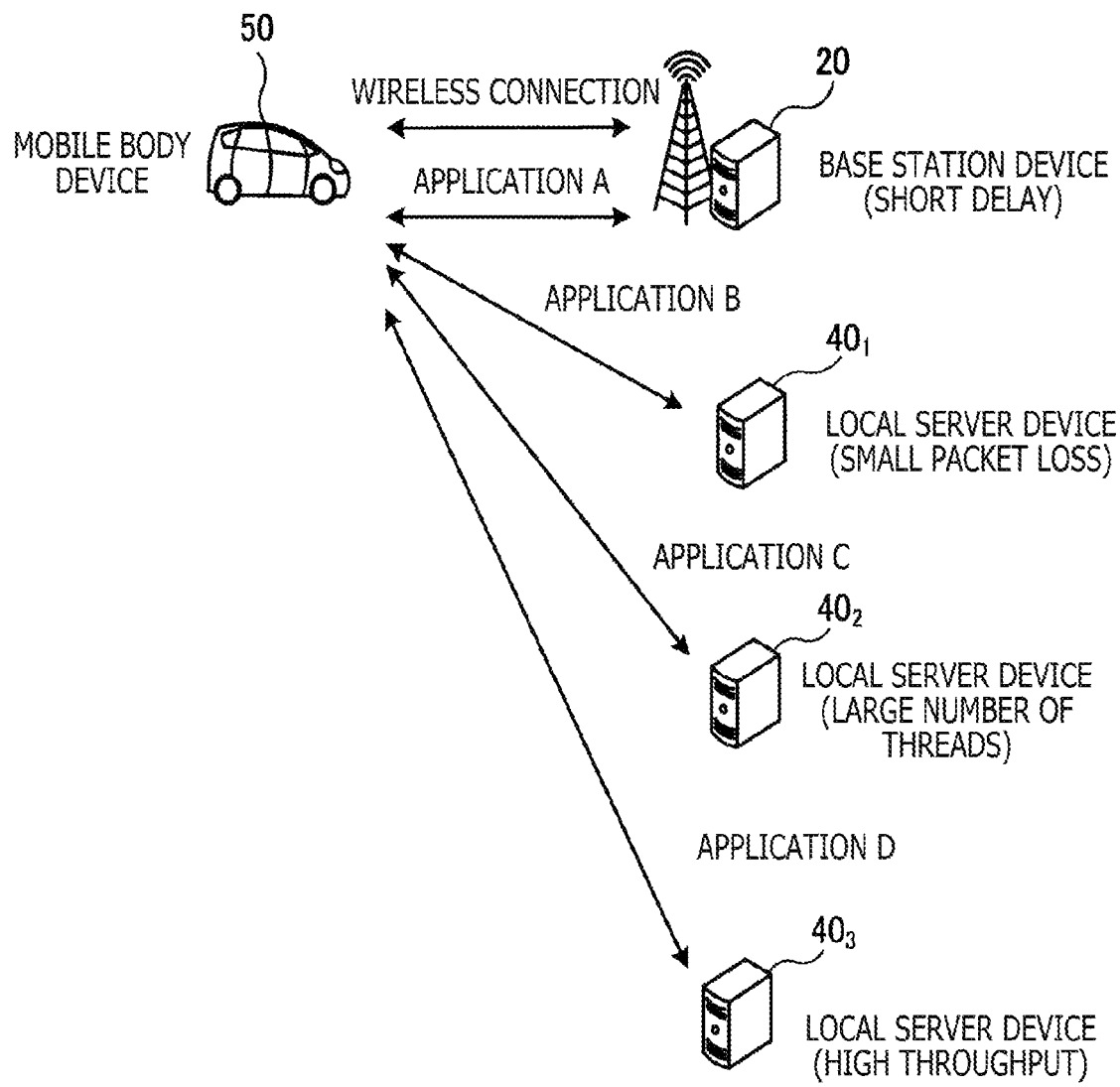
FIG. 28 is a diagram depicting a state where a plurality of devices is designated as a handover destination.

For example, the base station device corresponding to the handover source independently performs a flow for selecting the base station device 20 or the local server device 40 corresponding to the application handover destination (e.g., the process presented in FIG. 19) for each application. At this time, an index or a criterion different for each application may be adopted as an index or a criterion for selection. As a result, a plurality of the base station devices 20 or a plurality of the local server devices 40 can be designated as the application handover destination. FIG. 28 is a diagram depicting a state where a plurality of devices is designated as the handover destination. According to the example of FIG. 28, a device providing an application process for the mobile body device 50 is constituted by not only the base station device 20 wirelessly connected, but also the local server device $40_1$, the local server device $40_2$, and a local server device 40$_3$.

In this case, the device corresponding to the handover destination or the handover source sets a command for the mobile body device 50 for each application (each processing device corresponding to the connection destination) to perform application configuration (reconfiguration). Moreover, the mobile body device 50 sets or changes parameters for each application (each processing device corresponding to connection destination).

According to the example of FIG. 28, note that application processes of applications provided for the mobile body device 50 by the base station device 20, the local server device $40_1$, the local server device $40_2$, and the local server device 40$_3$ differ from each other. In this case, the base station device corresponding to the handover source may allocate an application to the device corresponding to the handover destination such that the application matches the characteristic of the device corresponding to the handover destination.

For example, the base station device corresponding to the handover source allocates an application process of an application requiring reduction of a delay time to the base station device 20, and allocates an application process of an application requiring reduction of a packet loss to the local server device $40_1$ producing a small packet loss. Moreover, the base station device corresponding to the handover source allocates an application process of an application requiring a multi-thread to the local server device $40_2$ capable of handling a process including a large number of threads, and allocates an application process of an application requiring a high throughput to the local server device 40$_3$ expected to produce a high throughput.

<8-3. Specific Examples of Application>

Described next will be examples of possible targets for an application handover according to the present embodiment. Initially, it is preferable that an application according to the present embodiment is a stateful application. For example, this application is an application using a cache, a cookie, a session, or the like, an application retaining using time-series information or space information (position information), an application including calculation necessary for the application and performing calculation by the edge function, an application starting a virtual machine (VM), a container, or the like in association with the application, or others.

Figure 29:
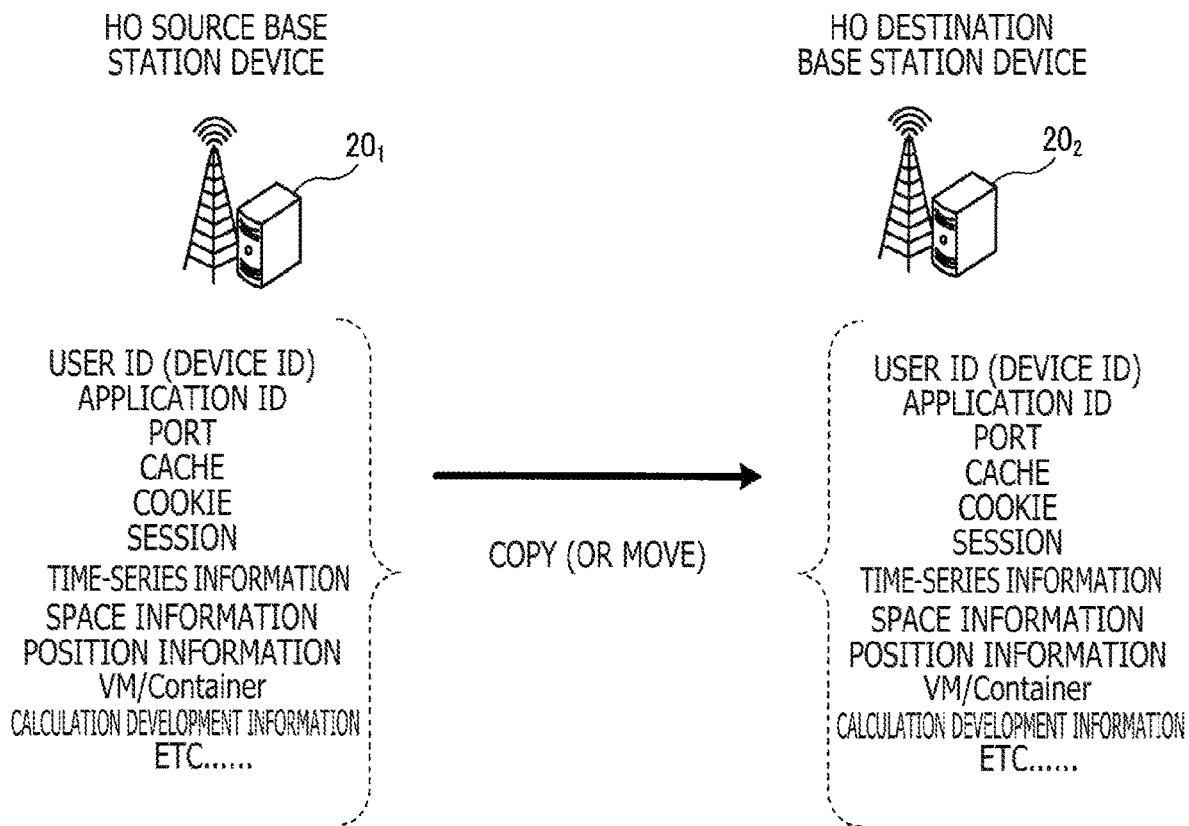
FIG. 29 is a diagram depicting an example of information (application information) handled from a device corresponding to a handover source to a device corresponding to a handover destination during an application handover.

FIG. 29 is a diagram depicting an example of information (application information) handled from a device corresponding to a handover source to a device corresponding to a handover destination during an application handover. According to the example presented in FIG. 29, application information is transmitted from the base station device $20_1$ corresponding to a handover source to the base station device $20_2$ corresponding to a handover destination during an application handover. For example, the application information is information necessary for providing an application process, such as a user ID, a device ID, a port, a cache, a cookie, a session, time-series information, space information, position information, VM/Container information, and calculation development information. Needless to say, the application information is not limited to these examples.

Exchange of the application information is achievable by a copy or a move of application information. In the case of the copy of the application information, the application information remains in the device corresponding to the handover source. However, in the case of the move of the application information, the application information does not remain in the device corresponding to the handover source.

It is preferable to use the copy particularly in the present embodiment. This is because cancellation or withdrawal of an application handover is necessary in a case of incompletion of the handover which can occur as described above. In the case of cancellation of the application handover, it is preferable to continue provision of an application service for the target mobile body device 50 on the basis of information remaining in the device corresponding to the handover source.

For example, an application according to the present embodiment and suited for a system associated with the mobile body device 50 is dynamic map information (Dynamic Map). For example, the dynamic map is utilized for supporting recognition of an ambient environment in autonomous driving (movement based on not operation by a human but a program and sensing data) of the mobile body device 50. The dynamic map is map information including information indicating a relatively small change with time (or no change with time), such as a road itself and a building (static objects), and information indicating a relatively large change with time (or information containing a change with time) such as information associated with surroundings of the target mobile body device 50 (e.g., the other mobile body devices 50 located nearby, a human, an animal, and traffic information), and the weather (sunlight, rain, wind, and temperature) (dynamic objects). (The objects may be classified not only into two levels of static and dynamic levels, but also three levels. For example, the objects may be classified into four levels (a static object), a semi-static object producing a change approximately by hour (Semi-Static Object), a semi-dynamic object producing a change approximately by minute, and a dynamic object producing a change approximately by second). Furthermore, the dynamic map includes settings peculiar to the mobile body device 50 (settings and preferences, such as priority given to arrival time, use of a highway, use of a toll road, and a must-pass point).

The static object information included in these types of information does not change with time. Accordingly, this information is preferably provided by a network cloud or a server device on a cloud (e.g., cloud server device CS), for example. This is because information containing no or a small change with time is not required to be frequently updated, and allows a certain delay produced in communication for acquisition or update. Accordingly, the frequency of access from the mobile body device 50 to an associated cloud or server device for acquiring static object information is modest. Alternatively, the static object information is preferably written to or stored in a recording region of the mobile body device 50 itself in advance (e.g., during manufacture) (so as to avoid execution of unnecessary download).

On the other hand, the dynamic object information is preferably followed according to movement of the target mobile body device 50. Accordingly, it is preferable that a device located at a relatively short distance (physical distance) from the mobile body device 50, and having the edge function or a map data (application data) storage retaining function (e.g., base station device 20 and local server device 40) arranges and provides the dynamic object information as described above in the present embodiment. Moreover, in a case where map update or the like is processed by the base station device (e.g., base station device 20) or the network device (e.g., local server device 40) side, it is preferable that setting information for each of the mobile body devices 50 is also followed according to the target mobile body device 50.

According to the present embodiment, a load or a permissible delay quantity for a whole application can be moderated by providing respective data constituting the dynamic map while distributing the data to a plurality of different positions (logical positions) in consideration of characteristics of the data to provide the dynamic map as described above.

Other examples of the application according to the present embodiment and suited for a system associated with the mobile body device 50 include distribution and material transfer of moving images, voices, or the like (hereinafter referred to as moving images). In this application, coding, decoding, editing, or the like of moving images is required to be performed with appropriate codec, format, band (data rate, bit rate), quality, or the like of moving images. Conventionally, coding and decoding of moving images are performed by an application server device on the cloud side (e.g., cloud server device CS), and the mobile body device 50 (terminal device) (what is called End-to-End) on the user side. However, for achieving short-delay distribution and material transfer, detailed control such as consideration of communication quality of wireless or wired network within the communication network route or the like is required. Accordingly, in the present embodiment, coding, decoding, editing, or the like is provided as the edge function.

For download from the network to the mobile body device 50, a device having the edge function performs coding and decoding while controlling the band of moving images in consideration of a state of the wireless network between the base station (e.g., base station device 20 or 30) and the mobile body device 50, transmits only a necessary portion within the moving images to the mobile body device 50 while discarding an unnecessary portion, and changes parameters of coding or the like according to necessity or unnecessity of each portion (e.g., performs a high quality coding process for a necessary portion, and performs a lower quality coding process than the coding process of the necessary portion for an unnecessary portion), for example. In addition, a notification of parameters indicating results of the controlled band, codec, format, coding method, or the like is given to the mobile body device 50 as application information. The mobile body device 50 performs decoding of the moving images in accordance with the parameters given as the notification.

Concerning material upload from the mobile body device 50 to the network and the server device, the mobile body device 50 similarly gives a notification and designation of parameters indicating the band, codec, format, coding method, or the like to be used by the mobile body device 50 while considering a state of the wireless network. The mobile body device 50 codes moving image to be uploaded, for example, on the basis of the parameters given as the notification or designation.

Particularly in the case of material upload, it is preferable to use codec allowing non-compression or lossless compression to cope with a case where a purpose of use of moving images is determined after material collection.

At the time of a handover performed by the mobile body device 50 moving between base station devices, smooth distribution and material collection of moving images are achieved before and after the handover by shifting (copying/moving) parameters or materials of the moving images used for control as application information even between devices each having the edge function.

<8-4. Other Modifications>

A control device controlling the management device 10, the base station devices 20, the base station devices 30, the local server devices 40, or the mobile body devices 50 may be implemented by a dedicated computer system, or by a general-purpose computer system.

For example, a program for executing the operations described above is stored in a computer-readable recording medium such as an optical disk, a semiconductor memory, a magnetic tape, and a flexible disk, and distributed in this form. Thereafter, the control device is constructed by installing the program installed in a computer, for example, and executing the processes described above. In this case, the control device may be an external device (e.g., personal computer) outside the management device 10, the base station devices 20, the base station devices 30, the local server devices 40, or the mobile body devices 50. Moreover, the control device may be an internal device of the management device 10, the base station devices 20, the base station devices 30, the local server devices 40, or the mobile body devices 50 (e.g., control unit 13, control unit 24, control unit 34, control unit 44, or control unit 55).

Furthermore, the communication program described above may be stored in a disk device included in a server device on a network such as the Internet, and downloaded to a computer. In addition, the functions described above may be achieved in cooperation with an OS (Operating System) and application software. In this case, a portion other than the OS may be stored in a medium and distributed in this form, or may be stored in a server device and downloaded to a computer.

Besides, all or a part of processes included in the respective processes of the above embodiment and described as automatically performed processes may be manually performed, or all or a part of processes described as manually performed processes may be automatically performed by using a known method. Moreover, information including processing procedures, specific names, various types of data and parameters presented in the above document and the drawings may be changed in any manners unless otherwise specified. For example, various types of information presented in the respective figures is not limited to the information included in the figures.

Furthermore, the respective constituent elements of the respective devices depicted in the figures are functional concepts, and are not necessarily required to be physically configured in the manner depicted in the figures. Specifically, specific modes of distribution and integration of the respective devices are not limited to those depicted in the figures, and all or a part thereof may be configured while functionally or physically distributed or integrated in any units in accordance with various loads and use states.

In addition, respective processing contents of the embodiment described above may be appropriately combined within a range where no inconsistency is produced. Besides, the order of the respective steps presented in the sequence diagrams or the flowcharts in the present embodiment may be changed as appropriate.

9. CONCLUSION

As described above, according to the one embodiment of the present disclosure, the information processing device (e.g., base station device 20) is connected to the network N1 to which at least one processing device (e.g., base station device 20 and local server device 40) that provides a function of an application process for the mobile body device 50 via wireless communication is connected. The information processing device executes a process of an application handover for transferring an application process executed by a predetermined processing device connected to the network N1 or the information processing device itself to a different processing device connected to the network N1.

In this manner, the application process is sequentially transferred to processing devices (e.g., base station devices 20) located near the mobile body device 50 on the network N1. This transfer of the application process reduces an increase in a distance between the processing apparatus which executes the application process and the mobile body device 50 on the network according to movement of the mobile body device 50. As a result, the application process is executed at a position near the mobile body device 50 on the network in many cases. Accordingly, a short-delay process is achievable.

While the respective embodiments of the present disclosure have been described above, the technical scope of the present disclosure is not strictly limited to the respective embodiments described above. Various modifications may be made without departing from the subject matters of the present disclosure. Moreover, constituent elements of different embodiments and modifications may be combined as appropriate.

Furthermore, advantageous effects produced by the respective embodiments described in the present description are presented only by way of example, and other advantageous effects may be produced.

Note that the present technology may have following configurations.

(1)

An information processing device including:
- a network communication unit connected to a predetermined network to which at least one processing device that provides a function of an application process for a mobile body device via wireless communication is connected; and
- a handover processing unit that executes a process of a first handover for transferring the application process executed by a predetermined processing device connected to the predetermined network or by the information processing device itself to a different processing device connected to the predetermined network.

(2)

The information processing device according to (1) described above, in which
- the predetermined network is a wireless network including a predetermined wireless access network,
- each of the information processing device and the different processing device is a base station device connected to the wireless network, and wirelessly connectable to the mobile body device, and
- the handover processing unit executes a process of a second handover for switching wireless connection between the mobile body device and the base station device to wireless connection between the mobile body device and a different base station device in addition to the process of the first handover.

(3)

The information processing device according to (2) described above, in which the handover processing unit executes the process of the second handover after execution of a part or all of the process of the first handover.

(4)

The information processing device according to (3) described above, in which
- the process of the first handover includes a process for allowing the different processing device to obtain application information that includes information necessary for continuation of the application process, and
- the handover processing unit executes the process of the second handover after execution of a process for allowing the different processing device to obtain current copy information indicating the application information, and executes a process for allowing the different processing device to obtain additional application information in a case where the additional application information is added by the application process performed after the process for allowing the different processing device to obtain the copy information.

(5)

The information processing device according to (3) described above, in which
- the process of the first handover includes a process for allowing the different processing device to obtain application information that includes information necessary for continuation of the application process, and
- the handover processing unit executes the process of the second handover after execution of a process for allowing the different processing device to obtain current copy information indicating the application information, and then executes a process for allowing the different processing device to obtain difference information between the copy information and the current application information.

(6)

The information processing device according to (3) described above, in which
- the process of the first handover includes a process for allowing a processing device corresponding to a handover destination candidate to obtain application information that includes information necessary for continuation of the application process, and
- the handover processing unit executes a process for allowing a plurality of processing devices corresponding to handover destination candidates to obtain current copy information indicating the application information, then executes the process of the second handover while designating, as a handover destination, the different processing device included in the plurality of processing devices and determined as the handover destination, and then executes a process for allowing the different processing device to obtain difference information between the copy information and the current application information.

(7)

The information processing device according to any one of (2) to (6) described above, in which the handover processing unit executes the process of the first handover while designating, as a handover destination, a processing device identical to a processing device corresponding to a handover destination of the second handover.

(8)

The information processing device according to any one of (2) to (6) described above, in which the handover processing unit executes the process of the first handover while designating, as a handover destination, a processing device different from a processing device corresponding to a handover destination of the second handover.

(9)

The information processing device according to any one of (2) to (8) described above, in which the handover processing unit starts the process of the first handover on the basis of a criterion identical to a starting criterion of the second handover.

(10)

The information processing device according to any one of (2) to (8) described above, in which the handover processing unit starts the process of the first handover on the basis of a criterion different from a starting criterion of the second handover.

(11)

The information processing device according to any one of (2) to (8) described above, in which the handover processing unit executes the first handover together with the second handover in a case where signal quality associated with wireless communication of the mobile body device meets a predetermined criterion, and executes the second handover without executing the first handover in a case where the signal quality does not meet the predetermined criterion.

(12)

The information processing device according to any one of (2) to (8) described above, in which the handover processing unit executes the first handover together with the second handover in a case where a moving state of the mobile body device meets a predetermined criterion, and executes the second handover without executing the first handover in a case where the moving state does not meet the predetermined criterion.

(13)

The information processing device according to (12) described above, in which the handover processing unit executes the first handover together with the second handover in a case where a moving state of the mobile body device as a state specified on the basis of information indicating at least one of a current position, a moving speed, and a moving direction of the mobile body device meets a predetermined criterion, and executes the second handover without executing the first handover in a case where the moving state of the mobile body device as the state specified on the basis of information indicating at least one of the current position, the moving speed, and the moving direction of the mobile body device does not meet the predetermined criterion.

(14)

The information processing device according to any one of (1) to (13) described above, in which the handover processing unit selects a processing device corresponding to a handover destination of the first handover on the basis of information associated with a moving state of the mobile body device.

(15)

The information processing device according to any one of (1) to (14) described above, in which the handover processing unit selects a processing device corresponding to a handover destination of the first handover on the basis of information indicating at least one of a current position, a moving speed, and a moving direction of the mobile body device.

(16)

The information processing device according to any one of (1) to (15) described above, including
- an application processing unit that executes the application process, in which
- the handover processing unit executes, as the process of the first handover, a process for transferring the application process executed by the application processing unit to the different processing device.

(17)

The information processing device according to any one of (1) to (15) described above, in which the handover processing unit executes, as the process of the first handover, a process for transferring the application process executed by the predetermined processing device different from the information processing device to the different processing device different from each of the information processing device and the predetermined processing device.

(18)

A mobile body device including:
- a wireless communication unit connected to an information processing device via wireless communication, the information processing device including a network communication unit connected to a predetermined network to which at least one processing device that provides a function of an application process for the mobile body device via the wireless communication is connected, and a handover processing unit that executes a process of a first handover for transferring the application process executed by a predetermined processing device connected to the predetermined network or by the information processing device itself to a different processing device connected to the predetermined network; and an application configuration change unit that changes an application configuration associated with an application that receives provision of the function of the application process and executes a process in a case of execution of the first handover.

(19)
The mobile body device according to (18) described above, including
an acquisition unit that acquires an application configuration change command, in which
the application configuration change unit changes an application configuration in accordance with the application configuration change command.

(20)
The mobile body device according to (19) described above, in which the acquisition unit acquires the application configuration change command from the different processing device.

(21)
The mobile body device according to (19) or (20) described above, in which
the acquisition unit acquires a command for changing a buffer size of the application as the application configuration change command, and
the application configuration change unit changes the buffer size of the application in accordance with the command for changing the buffer size.

(22)
The mobile body device according to (18) described above, in which the application configuration change unit sets the application configuration to a configuration determined by the application configuration change unit itself.

(23)
The mobile body device according to (22) described above, in which
the change of the application configuration includes a change of a buffer size of the application, and
the application configuration change unit changes the buffer size on the basis of a communication delay assumed to be produced in communication with the different processing device.

(24)
The mobile body device according to (18) described above, in which
the predetermined network is a wireless network that includes a predetermined wireless access network,
each of the information processing device and the different processing device is a base station device connected to the wireless network, and wirelessly connectable to the mobile body device, and
the mobile body device includes a handover processing unit that executes a process of a second handover for switching wireless connection between the mobile body device and the base station device to wireless connection between the mobile body device and a different base station device in addition to the process of the first handover.

(25)
The mobile body device according to (24) described above, in which the handover processing unit executes the process of the second handover after execution of a part or all of the process of the first handover.

(26)
The mobile body device according to (25) described above, in which the application configuration change unit changes the application configuration after execution of a part or all of the process of the first handover and before completion of the process of the second handover.

(27)
The mobile body device according to (26) described above, in which, in a case of a failure of the second handover or a withdrawal of the second handover, the application configuration change unit returns the application configuration to a state prior to the change.

(28)
An information processing method including:
connecting to a predetermined network to which at least one processing device that provides a function of an application process for a mobile body device via wireless communication is connected; and
executing a process of a first handover for transferring the application process executed by a predetermined processing device connected to the predetermined network or by an information processing device itself to a different processing device connected to the predetermined network.

(29)
An information processing program for causing a computer to function as:
a network communication unit connected to a predetermined network to which at least one processing device that provides a function of an application process for a mobile body device via wireless communication is connected; and
a handover processing unit that executes a process of a first handover for transferring the application process executed by a predetermined processing device connected to the predetermined network or by the computer itself to a different processing device connected to the predetermined network.

REFERENCE SIGNS LIST

1: Information processing system
10: Management device
20, 30: Base station device
40: Local server device
50: Mobile body device
11, 23, 33, 43, 53: Network communication unit
12, 22, 32, 42, 52: Storage unit
13, 24, 34, 44, 55: Control unit
21, 31, 41, 51: Wireless communication unit
54: Input/output unit
211, 311, 511: Reception processing unit
212, 312, 512: Transmission processing unit
213, 313, 513: Antenna
241, 341, 441, 551: Acquisition unit
242, 342, 442, 552: Handover processing unit
243, 343, 443, 553: Transmission unit
244, 444, 554: Application processing unit
555: Application configuration change unit

The invention claimed is:

1. An information processing device, comprising:
a communication interface connected to a network, wherein
a plurality of processing devices, including a first processing device and a second processing device, is connected to the network via a wireless communication, and
each of the information processing device and the first processing device executes a function of an application process for a mobile body device; and
circuitry configured to execute a process of a first handover to transfer the application process, wherein the application process is transferred to the second processing device.

2. The information processing device according to claim 1, wherein
the network is a wireless network that includes a wireless access network,
the information processing device corresponds a first base station device,
the second processing device corresponds to a second base station device,
the first base station device and the second base station device are connected to the wireless network,
each of the first base station device and the second base station device is wirelessly connectable to the mobile body device,
the circuitry is further configured to execute a process of a second handover based on the execution of the process of the first handover,
the process of the second handover is executed to switch from a first wireless connection to a second wireless connection,
the first wireless connection is between the mobile body device and the first base station device, and
the second wireless connection is between the mobile body device and the second base station device.

3. The information processing device according to claim 2, wherein the circuitry is further configured to execute the process of the second handover after the execution of at least a part of the process of the first handover.

4. The information processing device according to claim 3, wherein
the process of the first handover includes at least one of:
a first process to allow the second processing device to obtain application information, wherein the application information includes information associated with continuation of the application process,
a second process to allow the second processing device to obtain current copy information, wherein the current copy information indicates the application information, or
a third process to allow the second processing device to obtain additional application information, and
the circuitry is further configured to:
execute the second process of the process of the first handover;
execute the process of the second handover after the execution of the second process; and
execute the third process in a case where the application process adds, after the execution of the second process, the additional application information to the application information.

5. The information processing device according to claim 3, wherein
the process of the first handover includes at least one of:
a first process to allow the second processing device to obtain first application information, wherein the first application information includes information associated with continuation of the application process,
a second process to allow the second processing device to obtain current copy information, wherein the current copy information indicates the first application information, or
a third process to allow the second processing device to obtain difference information between the current copy information and second application information, and
the circuitry is further configured to:
execute the second process of the process of the first handover;
execute the process of the second handover after the execution of the second process; and
execute the third a process.

6. The information processing device according to claim 3, wherein
the process of the first handover includes at least one of:
a first process to allow the second processing device to obtain first application information, wherein
the first application information includes information associated with continuation of the application process, and
the second processing device corresponds to a handover destination,
a second process to allow the plurality of processing devices to obtain current copy information, wherein
the current copy information indicates the first application information, and
the plurality of processing devices corresponds to a plurality of handover destinations, or
a third process to allow the second processing device to obtain difference information between the current copy information and second application information,
the circuitry is further configured to:
execute the second process of the process of the first handover;
determine the second processing device as the handover destination;
execute the process of the second handover in concurrence with the determination of the second processing device as the handover destination; and
execute the third process.

7. The information processing device according to claim 2, wherein
the second processing device corresponds to a first handover destination of the second handover, and
the circuitry is further configured to:
determine a third processing device of the plurality of processing devices as a second handover destination of the second handover, wherein the third processing device is identical to the second processing device; and
execute the process of the first handover in concurrence with the determination of the third processing device as the second handover destination of the second handover.

8. The information processing device according to claim 2, wherein
the second processing device corresponds to a first handover destination of the second handover, and
the circuitry is further configured to:
determine a third processing device of the plurality of processing devices as a second handover destination of the second handover, wherein the third processing device is different from the second processing device; and
execute the process of the first handover in concurrence with the determination of the third processing device as the second handover destination of the second handover.

9. The information processing device according to claim 2, wherein the circuitry is further configured to start the process of the first handover based on a criterion identical to a starting criterion of the second handover.

10. The information processing device according to claim 2, wherein the circuitry is further configured to start the process of the first handover based on a criterion different from a starting criterion of the second handover.

11. The information processing device according to claim 2, wherein the circuitry is further configured to:
execute the process of the first handover in concurrence with the process of the second handover in a case where a signal quality associated with a wireless communication of the mobile body device meets a criterion; and
execute the process of the second handover independent of the process of the first handover in a case where the signal quality fails to meet the criterion.

12. The information processing device according to claim 2, wherein the circuitry is further configured to:
execute the process of the first handover in concurrence with the process of the second handover in a case where a moving state of the mobile body device meets a criterion; and
execute the process of the second handover independent of the process of the first handover in a case where the moving state of the mobile body device fails to meet the criterion.

13. The information processing device according to claim 12, wherein the circuitry is further configured to:
receive, from the mobile body device, information indicating at least one of:
a current position of the mobile body device,
a moving speed of the mobile body device, or
a moving direction of the mobile body device; and
determine the moving state of the mobile body device based on the received information.

14. The information processing device according to claim 1, wherein the circuitry is further configured to select the second processing device as a handover destination of the first handover based on information associated with a moving state of the mobile body device.

15. The information processing device according to claim 1, wherein the circuitry is further configured to select the second processing device as a handover destination of the first handover based on information indicating at least one of:
a current position of the mobile body device,
a moving speed of the mobile body device, or
a moving direction of the mobile body device.

16. The information processing device according to claim 1, wherein the circuitry is further configured to execute the application process.

17. The information processing device according to claim 1, wherein
the first processing device is different from the information processing device, and
the second processing device is different from each of the information processing device and the first processing device.

18. A mobile body device, comprising:
a wireless communication interface connected to an information processing device via a wireless communication, wherein
the information processing device including comprises:
a communication interface connected to a network, wherein
a plurality of processing devices, including a first processing device and a second processing device, is connected to the network via the wireless communication, and
each of the information processing device and the first processing device executes that provides a function of an application process for the mobile body device; and
first circuitry that executes a first process of a first handover to transfer the application process, and
the application process is transferred to the second processing device; and
second circuitry configured to:
change an application configuration associated with an application, wherein the application receives provision of the function of the application process; and
execute a second process based on the execution of the first process of the first handover.

19. An information processing method, comprising:
connecting, by an information processing device, to a network, wherein
a plurality of processing devices, including a first processing device and a second processing device, is connected to the network via a wireless communication, and
each of the information processing device and the first processing device executes a function of an application process for a mobile body device; and
executing, by the information processing device, a process of a first handover to transfer the application process, wherein the application process is transferred to the second processing device.

20. A non-transitory computer-readable medium having stored thereon computer-executable instructions that, when executed by a processor of an information processing device, cause the processor to perform operations, the operations comprising:
connecting, by the information processing device, to a network, wherein
a plurality of processing devices, including a first processing device and a second processing device, is connected to the network via a wireless communication, and
each of the information processing device and the first processing device executes a function of an application process for a mobile body device; and
executing, by the information processing device, a process of a first handover to transfer the application process, wherein the application process is transferred to the second processing device.

* * * * *